US010459485B2

(12) United States Patent
Inagaki et al.

(10) Patent No.: US 10,459,485 B2
(45) Date of Patent: Oct. 29, 2019

(54) ATTACHABLE ARTICLE WITH SIGNALING, SPLIT DISPLAY AND MESSAGING FEATURES

(71) Applicant: FLEXTERRA, INC., Skokie, IL (US)

(72) Inventors: Philippe Inagaki, Skokie, IL (US); Justin Baum, Skokie, IL (US)

(73) Assignee: FLEXTERRA, INC., Skokie, IL (US)

( * ) Notice: Subject to any disclaimer, the term of this patent is extended or adjusted under 35 U.S.C. 154(b) by 0 days.

(21) Appl. No.: 15/066,534

(22) Filed: Mar. 10, 2016

(65) Prior Publication Data
US 2016/0299526 A1 Oct. 13, 2016

Related U.S. Application Data

(63) Continuation of application No. PCT/US2014/055043, filed on Sep. 10, 2014.
(Continued)

(51) Int. Cl.
G06F 3/01 (2006.01)
G06F 1/16 (2006.01)
(Continued)

(52) U.S. Cl.
CPC .............. *G06F 1/163* (2013.01); *A43B 3/001* (2013.01); *A43B 3/0005* (2013.01); *A43B 23/24* (2013.01);
(Continued)

(58) Field of Classification Search
CPC ..... A61B 5/02438; A61B 5/681; G06F 3/016; G06F 3/017; G06F 1/163; G06F 3/014;
(Continued)

(56) References Cited

U.S. PATENT DOCUMENTS 4,834,376 A 5/1989 Steinberg
5,065,376 A 11/1991 Choulat
(Continued)

FOREIGN PATENT DOCUMENTS

CN 1306636 A 8/2001
CN 101180669 A 5/2008
(Continued)

OTHER PUBLICATIONS

"3M Flexible Transparent Touchscreen Concepts" video located on the Internet at <http://www.youtube.com/watch?v=kCZz4jFok_o> (uploaded Jan. 6, 2011).
(Continued)

*Primary Examiner* — Xuemei Zheng
(74) *Attorney, Agent, or Firm* — Marshall, Gerstein & Borun LLP

(57) ABSTRACT

An attachable article or device, such as a wristband, includes a flexible electronic display disposed thereon in a manner that is bendable or conformable to a user's wrist or other curved surface, and that enables various images to be displayed on the electronic display in a manner that is easily viewable to the user. The attachable article implements a messaging routine that enables a user or wearer to receive notifications of incoming messages and to selectively view incoming messages or indications thereof. Upon receipt of a message, the attachable article may activate one or more vibrational or other tactile signal generating element elements disposed at various locations on the article to inform the wearer that a new message exists and may present the contents of a message in a split display screen format or using a natural messaging methodology that waits for the user to take some specific natural action before displaying the message. Different vibrational patterns across the plurality of vibrational elements may signify different types of
(Continued)

messages, and associations between vibrational patterns, message types, and locations on the flexible display at which different message indicators are displayed may be configurable.

19 Claims, 37 Drawing Sheets

Related U.S. Application Data

(60) Provisional application No. 62/019,770, filed on Jul. 1, 2014, provisional application No. 62/001,993, filed on May 22, 2014, provisional application No. 61/938,107, filed on Feb. 10, 2014, provisional application No. 61/876,181, filed on Sep. 10, 2013.

(51) Int. Cl.
*G06F 3/0346* (2013.01)
*G02F 1/1333* (2006.01)
*G06F 3/0488* (2013.01)
*A43B 3/00* (2006.01)
*A43B 23/24* (2006.01)
*G06F 3/041* (2006.01)
*G06F 3/044* (2006.01)
*A47G 19/22* (2006.01)
*A44C 5/00* (2006.01)

(52) U.S. Cl.
CPC ...... *G02F 1/133305* (2013.01); *G06F 1/1652* (2013.01); *G06F 1/1694* (2013.01); *G06F 3/016* (2013.01); *G06F 3/017* (2013.01); *G06F 3/044* (2013.01); *G06F 3/0412* (2013.01); *G06F 3/0416* (2013.01); *G06F 3/04883* (2013.01); *A44C 5/0015* (2013.01); *A44C 5/0053* (2013.01); *A47G 19/2227* (2013.01); *G06F 2203/04102* (2013.01); *G06F 2203/04103* (2013.01)

(58) Field of Classification Search
CPC ................ A44C 5/0015; A44C 5/0053; G02F 1/133305
See application file for complete search history.

(56) References Cited

U.S. PATENT DOCUMENTS

| | | |
|---|---|---|
| 5,162,696 A | 11/1992 | Goodrich |
| 5,438,488 A | 8/1995 | Dion |
| 5,438,851 A | 8/1995 | Geissbuhler |
| 5,644,858 A | 7/1997 | Bemis |
| 5,707,745 A | 1/1998 | Forrest et al. |
| 5,844,363 A | 12/1998 | Gu et al. |
| 5,889,737 A | 3/1999 | Alameh et al. |
| 5,930,026 A | 7/1999 | Jacobson et al. |
| 5,930,921 A | 8/1999 | Sorofman et al. |
| 5,931,764 A | 8/1999 | Freeman et al. |
| 6,011,309 A | 1/2000 | Ahn |
| 6,097,147 A | 8/2000 | Baldo et al. |
| 6,134,965 A | 10/2000 | Somville |
| 6,196,932 B1 | 3/2001 | Marsh et al. |
| 6,212,133 B1 | 4/2001 | McCoy et al. |
| 6,303,238 B1 | 10/2001 | Thompson et al. |
| 6,369,865 B2 | 4/2002 | Hinata |
| 6,503,188 B1 | 1/2003 | August |
| 6,577,496 B1 | 6/2003 | Gioscia et al. |
| 6,585,914 B2 | 7/2003 | Marks et al. |
| 6,608,323 B2 | 8/2003 | Marks et al. |
| 6,750,607 B2 | 6/2004 | Huitema et al. |
| 6,831,769 B2 | 12/2004 | Holman et al. |
| 6,837,590 B2 | 1/2005 | Marston |
| 6,839,158 B2 | 1/2005 | Albert et al. |
| 6,991,749 B2 | 1/2006 | Marks et al. |
| 7,170,670 B2 | 1/2007 | Webber |
| 7,180,665 B2 | 2/2007 | Daniel et al. |
| 7,209,114 B2 | 4/2007 | Radley-Smith |
| 7,278,093 B2 | 10/2007 | Jablonski et al. |
| 7,374,702 B2 | 5/2008 | Marks et al. |
| 7,384,814 B2 | 6/2008 | Huitema et al. |
| 7,446,945 B2 | 11/2008 | Kuiper et al. |
| 7,453,452 B2 | 11/2008 | Huitema et al. |
| 7,528,176 B2 | 5/2009 | Marks et al. |
| 7,564,436 B2 | 7/2009 | Huitema et al. |
| 7,569,693 B2 | 8/2009 | Marks et al. |
| 7,605,225 B2 | 10/2009 | Marks et al. |
| 7,618,260 B2 | 11/2009 | Daniel et al. |
| 7,667,962 B2 | 2/2010 | Mullen |
| 7,671,202 B2 | 3/2010 | Marks et al. |
| 7,710,370 B2 | 5/2010 | Slikkerveer et al. |
| 7,714,801 B2 | 5/2010 | Kimmel |
| 7,755,605 B2 | 7/2010 | Daniel et al. |
| 7,786,951 B2 | 8/2010 | Huitema et al. |
| 7,787,097 B2 | 8/2010 | Satoh |
| 7,787,917 B2 | 8/2010 | Aoki et al. |
| 7,816,480 B2 | 10/2010 | Marks et al. |
| 7,842,198 B2 | 11/2010 | Marks et al. |
| 7,892,454 B2 | 2/2011 | Facchetti et al. |
| 7,893,265 B2 | 2/2011 | Facchetti et al. |
| 7,902,363 B2 | 3/2011 | Facchetti et al. |
| 7,947,837 B2 | 5/2011 | Marks et al. |
| 7,956,820 B2 | 6/2011 | Huitema et al. |
| 7,965,258 B2 | 6/2011 | Aoki |
| 7,982,039 B2 | 7/2011 | Marks et al. |
| 8,017,458 B2 | 9/2011 | Marks et al. |
| 8,022,214 B2 | 9/2011 | Facchetti et al. |
| 8,077,283 B2 | 12/2011 | Van Veenendaal et al. |
| 8,097,877 B2 | 1/2012 | Marks et al. |
| 8,111,465 B2 | 2/2012 | Heikenfeld et al. |
| 8,117,903 B2 | 2/2012 | Golden et al. |
| 8,125,434 B2 | 2/2012 | Huitema et al. |
| 8,151,501 B2 | 4/2012 | Bemelmans et al. |
| 8,199,471 B2 | 6/2012 | Bemelmans et al. |
| 8,237,909 B2 | 8/2012 | Ostreko et al. |
| 8,279,166 B2 | 10/2012 | Huitema et al. |
| 8,325,143 B2 | 12/2012 | Destura et al. |
| 8,329,855 B2 | 12/2012 | Usta et al. |
| 8,334,545 B2 | 12/2012 | Levermore et al. |
| 8,358,275 B2 | 1/2013 | Huitema |
| 8,380,327 B2 | 2/2013 | Park |
| 8,395,150 B2 | 3/2013 | Marks et al. |
| 8,404,844 B2 | 3/2013 | Kastler et al. |
| 8,414,411 B2 | 4/2013 | Stites et al. |
| 8,440,828 B2 | 5/2013 | Quinn et al. |
| 8,446,549 B2 | 5/2013 | Huitema et al. |
| 8,466,851 B2 | 6/2013 | Huitema et al. |
| D686,217 S | 7/2013 | Andre |
| 8,474,146 B2 | 7/2013 | Hartford et al. |
| 8,477,250 B2 | 7/2013 | Schellingerhout et al. |
| 8,482,909 B2 | 7/2013 | Douglas |
| 8,493,714 B2 | 7/2013 | Visser et al. |
| 8,502,788 B2 | 8/2013 | Cho |
| 8,508,468 B2 | 8/2013 | Huitema |
| 8,508,920 B2 | 8/2013 | Huitema et al. |
| 8,514,213 B2 | 8/2013 | van Veenendaal et al. |
| 8,536,579 B2 | 9/2013 | Sele et al. |
| 8,537,104 B2 | 9/2013 | Markvoort et al. |
| 8,547,293 B2 | 10/2013 | Van Lieshout et al. |
| 8,547,325 B2 | 10/2013 | Huitema |
| 8,618,448 B2 | 12/2013 | Alexander |
| 9,030,419 B1 | 5/2015 | Freed |
| 9,176,530 B2 | 11/2015 | Rothkopf et al. |
| 9,223,494 B1 | 12/2015 | DeSalvo et al. |
| 9,510,470 B2 | 11/2016 | Huitema et al. |
| 9,560,751 B2 | 1/2017 | Huitema et al. |
| 9,629,120 B2 | 4/2017 | Ryu et al. |
| 9,642,241 B2 | 5/2017 | Huitema et al. |
| 2001/0004808 A1 | 6/2001 | Hurwitz |
| 2002/0019296 A1 | 2/2002 | Freeman et al. |
| 2002/0027634 A1 | 3/2002 | Kang et al. |
| 2002/0070926 A1 | 6/2002 | Kavanagh |
| 2003/0046849 A1 | 3/2003 | Lin |

(56) References Cited

U.S. PATENT DOCUMENTS

| | | |
|---|---|---|
| 2003/0182924 A1 | 10/2003 | Tsutsumi et al. |
| 2003/0197597 A1 | 10/2003 | Bahl et al. |
| 2004/0052044 A1 | 3/2004 | Mochizuki et al. |
| 2004/0189605 A1 | 9/2004 | Shih |
| 2004/0212968 A1 | 10/2004 | Lin |
| 2004/0266496 A1 | 12/2004 | Kauhaniemi et al. |
| 2005/0110785 A1 | 5/2005 | Ochiai et al. |
| 2006/0020469 A1 | 1/2006 | Rast |
| 2006/0055691 A1 | 3/2006 | Bursett |
| 2006/0077127 A1 | 4/2006 | Sampsell et al. |
| 2006/0096392 A1 | 5/2006 | Inkster et al. |
| 2006/0132025 A1 | 6/2006 | Gao et al. |
| 2006/0202618 A1 | 9/2006 | Ishii et al. |
| 2006/0204675 A1 | 9/2006 | Gao et al. |
| 2006/0209218 A1 | 9/2006 | Lee et al. |
| 2006/0238494 A1 | 10/2006 | Narayanaswami et al. |
| 2006/0262098 A1 | 11/2006 | Okamoto |
| 2006/0273304 A1 | 12/2006 | Cok |
| 2007/0090420 A1 | 4/2007 | Chu et al. |
| 2007/0117600 A1 | 5/2007 | Robertson et al. |
| 2007/0120813 A1 | 5/2007 | Huitema et al. |
| 2007/0195067 A1 | 8/2007 | Zotov et al. |
| 2007/0205997 A1 | 9/2007 | Lieshout et al. |
| 2007/0228952 A1 | 10/2007 | Kwon et al. |
| 2007/0279852 A1 | 12/2007 | Daniel et al. |
| 2008/0018631 A1 | 1/2008 | Hioki et al. |
| 2008/0037374 A1 | 2/2008 | Chu et al. |
| 2008/0094314 A1 | 4/2008 | Huitema et al. |
| 2008/0100636 A1 | 5/2008 | Lai et al. |
| 2008/0150928 A1 | 6/2008 | Van Der Hoef et al. |
| 2008/0198184 A1 | 8/2008 | Schellingerhout et al. |
| 2008/0204367 A1 | 8/2008 | Lafarre et al. |
| 2008/0212271 A1 | 9/2008 | Misawa |
| 2008/0218369 A1 | 9/2008 | Krans et al. |
| 2008/0223746 A1 | 9/2008 | Van Rens et al. |
| 2008/0278472 A1 | 11/2008 | Huitema et al. |
| 2008/0291225 A1 | 11/2008 | Arneson |
| 2008/0316580 A1 | 12/2008 | Gillies et al. |
| 2009/0067123 A1 | 3/2009 | Huitema et al. |
| 2009/0122007 A1 | 5/2009 | Tsuzaki et al. |
| 2009/0189878 A1 | 7/2009 | Goertz et al. |
| 2009/0197749 A1 | 8/2009 | Merkel et al. |
| 2009/0219225 A1 | 9/2009 | Cope |
| 2009/0251888 A1 | 10/2009 | Douglas |
| 2009/0267969 A1 | 10/2009 | Sakamoto |
| 2009/0290117 A1 | 11/2009 | Watanabe et al. |
| 2009/0296249 A1 | 12/2009 | van Lieshout et al. |
| 2010/0033435 A1 | 2/2010 | Huitema |
| 2010/0045705 A1 | 2/2010 | Vertegaal et al. |
| 2010/0050133 A1 | 2/2010 | Nishihara et al. |
| 2010/0117975 A1 | 5/2010 | Cho |
| 2010/0127965 A1 | 5/2010 | Park |
| 2010/0156868 A1 | 6/2010 | Hirayama |
| 2010/0164973 A1 | 7/2010 | Huitema et al. |
| 2010/0194785 A1 | 8/2010 | Huitema et al. |
| 2010/0231544 A1 | 9/2010 | Lu et al. |
| 2010/0238098 A1 | 9/2010 | Watanabe |
| 2010/0238612 A1 | 9/2010 | Hsiao et al. |
| 2010/0252112 A1 | 10/2010 | Watson |
| 2010/0259524 A1 | 10/2010 | Markvoort et al. |
| 2010/0283047 A1 | 11/2010 | Facchetti et al. |
| 2010/0295761 A1 | 11/2010 | van Lieshout et al. |
| 2010/0315225 A1 | 12/2010 | Teague |
| 2010/0320448 A1 | 12/2010 | Sele et al. |
| 2010/0326527 A1 | 12/2010 | Facchetti et al. |
| 2011/0003665 A1 | 1/2011 | Burton et al. |
| 2011/0043976 A1 | 2/2011 | Visser et al. |
| 2011/0048619 A1 | 3/2011 | Meinders et al. |
| 2011/0090155 A1 | 4/2011 | Caskey et al. |
| 2011/0109654 A1 | 5/2011 | Van Veenendaal et al. |
| 2011/0120558 A1 | 5/2011 | Facchetti et al. |
| 2011/0122593 A1 | 5/2011 | van Lieshout et al. |
| 2011/0124375 A1 | 5/2011 | Stuivenwold |
| 2011/0128260 A1 | 6/2011 | Huitema et al. |
| 2011/0128266 A1 | 6/2011 | Chiu et al. |
| 2011/0136333 A1 | 6/2011 | Facchetti et al. |
| 2011/0148797 A1 | 6/2011 | Huitema et al. |
| 2011/0157046 A1* | 6/2011 | Lee .................. G04G 21/08 345/173 |
| 2011/0185612 A1 | 8/2011 | Waggoner |
| 2011/0187681 A1 | 8/2011 | Kim et al. |
| 2011/0227855 A1 | 9/2011 | Kim et al. |
| 2011/0256649 A1 | 10/2011 | Huitema et al. |
| 2011/0279418 A1 | 11/2011 | Han et al. |
| 2011/0279442 A1 | 11/2011 | Hage et al. |
| 2011/0310035 A1 | 12/2011 | Kim et al. |
| 2012/0007796 A1 | 1/2012 | Jokinen et al. |
| 2012/0038861 A1 | 2/2012 | van Lieshout et al. |
| 2012/0080462 A1 | 4/2012 | Hajarian |
| 2012/0083705 A1 | 4/2012 | Yuen et al. |
| 2012/0086691 A1 | 4/2012 | van Lieshout et al. |
| 2012/0105333 A1 | 5/2012 | Maschmeyer et al. |
| 2012/0122519 A1 | 5/2012 | Jochheim |
| 2012/0162088 A1 | 6/2012 | van Lieshout et al. |
| 2012/0162876 A1 | 6/2012 | Kim |
| 2012/0182282 A1 | 7/2012 | van Veenendaal et al. |
| 2012/0182755 A1 | 7/2012 | Wildner |
| 2012/0188750 A1 | 7/2012 | Marston |
| 2012/0194448 A1 | 8/2012 | Rothkopf |
| 2012/0194478 A1 | 8/2012 | Liu et al. |
| 2012/0212433 A1 | 8/2012 | Lee et al. |
| 2012/0223314 A1 | 9/2012 | Marks et al. |
| 2012/0242599 A1 | 9/2012 | Seo et al. |
| 2012/0264489 A1 | 10/2012 | Choi et al. |
| 2012/0283799 A1 | 11/2012 | Fan |
| 2012/0314546 A1 | 12/2012 | Brewer et al. |
| 2012/0327048 A1 | 12/2012 | Ramrattan et al. |
| 2013/0005404 A1 | 1/2013 | Bremer |
| 2013/0010405 A1 | 1/2013 | Rothkopf et al. |
| 2013/0025647 A1 | 1/2013 | Bouten et al. |
| 2013/0027853 A1 | 1/2013 | Chen et al. |
| 2013/0038622 A1 | 2/2013 | Yang |
| 2013/0044215 A1 | 2/2013 | Rothkopf et al. |
| 2013/0054997 A1 | 2/2013 | Wyatt et al. |
| 2013/0058063 A1 | 3/2013 | O'Brien |
| 2013/0062598 A1 | 3/2013 | Usta et al. |
| 2013/0070431 A1 | 3/2013 | Fukuma et al. |
| 2013/0076612 A1 | 3/2013 | Myers |
| 2013/0076649 A1 | 3/2013 | Myers et al. |
| 2013/0083496 A1 | 4/2013 | Franklin et al. |
| 2013/0106603 A1 | 5/2013 | Weast et al. |
| 2013/0113761 A1 | 5/2013 | van Lieshout et al. |
| 2013/0120106 A1 | 5/2013 | Cauwels et al. |
| 2013/0127690 A1 | 5/2013 | Tsai |
| 2013/0127748 A1 | 5/2013 | Vertegaal et al. |
| 2013/0127765 A1 | 5/2013 | Behdasht et al. |
| 2013/0128439 A1 | 5/2013 | Walters et al. |
| 2013/0131887 A1 | 5/2013 | Park |
| 2013/0141405 A1 | 6/2013 | Huitema et al. |
| 2013/0145522 A1 | 6/2013 | da Silva |
| 2013/0145795 A1 | 6/2013 | Asami |
| 2013/0154826 A1* | 6/2013 | Ratajczyk ............ G08B 7/06 340/539.11 |
| 2013/0172068 A1 | 7/2013 | Zhou et al. |
| 2013/0182382 A1* | 7/2013 | Vardi ............... G08B 13/1463 361/679.01 |
| 2013/0191741 A1* | 7/2013 | Dickinson ............ G06F 1/163 715/702 |
| 2013/0197680 A1 | 8/2013 | Cobbett et al. |
| 2013/0219332 A1 | 8/2013 | Woley et al. |
| 2013/0222208 A1 | 8/2013 | Gorilovsky et al. |
| 2013/0222270 A1* | 8/2013 | Winkler ............ H04M 1/0233 345/173 |
| 2013/0222271 A1 | 8/2013 | Alberth et al. |
| 2013/0229373 A1 | 9/2013 | Eriksson et al. |
| 2013/0235008 A1 | 9/2013 | Kwon |
| 2013/0265257 A1 | 10/2013 | Jung et al. |
| 2013/0286466 A1 | 10/2013 | Lieshout et al. |
| 2013/0300779 A1 | 11/2013 | Van Baarsen et al. |
| 2013/0326790 A1 | 12/2013 | Cauwels et al. |
| 2013/0335929 A1 | 12/2013 | Cavallaro |
| 2014/0042406 A1 | 2/2014 | Degner et al. |
| 2014/0049487 A1 | 2/2014 | Konertz et al. |
| 2014/0062892 A1 | 3/2014 | Dickinson et al. |

(56) References Cited

U.S. PATENT DOCUMENTS

| | | | |
|---|---|---|---|
| 2014/0123015 A1* | 5/2014 | Sako | G06F 17/3087 |
| | | | 715/720 |
| 2014/0123436 A1 | 5/2014 | Griffin et al. | |
| 2014/0138637 A1 | 5/2014 | Yang et al. | |
| 2014/0226275 A1 | 8/2014 | Ko et al. | |
| 2014/0257050 A1 | 9/2014 | Kuroda et al. | |
| 2015/0020081 A1* | 1/2015 | Cho | G06F 9/542 |
| | | | 719/318 |
| 2015/0084892 A1 | 3/2015 | Shirota et al. | |
| 2015/0089974 A1 | 4/2015 | Seo et al. | |
| 2015/0124566 A1 | 5/2015 | Lake et al. | |
| 2015/0162751 A1 | 6/2015 | Leabman et al. | |
| 2015/0169011 A1 | 6/2015 | Bibl et al. | |
| 2015/0185766 A1 | 7/2015 | Otsuka et al. | |
| 2015/0185944 A1 | 7/2015 | Magi et al. | |
| 2015/0227245 A1 | 8/2015 | Inagaki et al. | |
| 2015/0333572 A1 | 11/2015 | Leabman | |
| 2015/0334069 A1* | 11/2015 | Winston | H04L 51/04 |
| | | | 709/206 |
| 2015/0378391 A1 | 12/2015 | Huitema et al. | |
| 2015/0381793 A1 | 12/2015 | Cerda et al. | |
| 2016/0014919 A1 | 1/2016 | Huitema et al. | |
| 2016/0019703 A1 | 1/2016 | Tian | |
| 2016/0034742 A1 | 2/2016 | Kim et al. | |
| 2016/0037625 A1 | 2/2016 | Huitema et al. | |
| 2016/0041581 A1 | 2/2016 | Piccionelli et al. | |
| 2016/0041680 A1 | 2/2016 | Chi et al. | |
| 2016/0062410 A1 | 3/2016 | Ko et al. | |
| 2016/0142863 A1 | 5/2016 | Lam | |
| 2016/0212837 A1 | 7/2016 | Kim | |
| 2016/0277891 A1 | 9/2016 | Dvortsov et al. | |
| 2016/0283086 A1 | 9/2016 | Inagaki et al. | |
| 2016/0299570 A1 | 10/2016 | Davydov | |
| 2016/0322745 A1 | 11/2016 | Shedletsky et al. | |
| 2016/0360618 A1 | 12/2016 | Elsherbini et al. | |
| 2016/0379205 A1 | 12/2016 | Margadoudakis | |
| 2017/0046931 A1 | 2/2017 | Hartweg et al. | |
| 2017/0052749 A1 | 2/2017 | Lee | |
| 2017/0235341 A1 | 8/2017 | Huitema et al. | |
| 2017/0236497 A1 | 8/2017 | Huitema et al. | |

FOREIGN PATENT DOCUMENTS

| | | |
|---|---|---|
| CN | 101180864 A | 5/2008 |
| CN | 102486906 A | 6/2012 |
| CN | 103021277 A | 4/2013 |
| DE | 202006012076 U1 | 10/2006 |
| EP | 1599110 A1 | 11/2005 |
| EP | 2551110 A1 | 1/2013 |
| FR | 2284149 A1 | 4/1976 |
| JP | 2003-299238 A | 10/2003 |
| JP | 2010-159803 A | 7/2010 |
| JP | 2010-204377 A | 9/2010 |
| JP | 2013044293 A | 3/2013 |
| JP | 2013044294 A | 3/2013 |
| JP | 2013068292 A | 4/2013 |
| JP | 60-89448 B2 | 3/2017 |
| KR | 2011-0008118 U | 8/2011 |
| KR | 1256109 | 4/2013 |
| KR | 1278604 | 6/2013 |
| KR | 1301561 | 9/2013 |
| KR | 20150035232 A | 4/2015 |
| TW | 504127 U | 9/2002 |
| TW | M258364 U | 3/2005 |
| TW | M265636 U | 5/2005 |
| TW | 200815886 A | 4/2008 |
| TW | 201035934 A | 10/2010 |
| TW | 201301002 A | 1/2013 |
| TW | I383343 B | 1/2013 |
| WO | WO-00/25193 A2 | 5/2000 |
| WO | WO-01/64070 A1 | 9/2001 |
| WO | WO-2004/047059 A1 | 6/2004 |
| WO | WO-2006/027727 A1 | 3/2006 |
| WO | WO-2006/085271 A2 | 8/2006 |
| WO | WO-2007/023406 A2 | 3/2007 |
| WO | WO-2007/042987 A1 | 4/2007 |
| WO | WO-2008/054206 A2 | 5/2008 |
| WO | WO-2012/156804 A1 | 11/2012 |
| WO | WO-2012/167204 A2 | 12/2012 |
| WO | WO-2013/138003 A1 | 9/2013 |
| WO | WO-2015/023804 A1 | 2/2015 |

OTHER PUBLICATIONS

"Amazin Concept Holo Computer Elodie Delassus", Art, Concepts, Design, Gadgets, downloaded from the Internet at: <http://designskings.com/amazin-concept-holo-computer-elodie-delassus/> (Jan. 18, 2012).

"Athletics and their supporters", Enlightened®: Illuminated Clothing by Janet Hansen, downloaded from the Internet at <http://enlighted.com/pages/athletics.shtml> (Aug. 8, 2013).

"E-Clock", Tokyoflash Japn Product Design Studio, downloaded from the Internet at <http://blog.tokyoflash.com/2010/03/e-clock/> (Mar. 10, 2010).

"Features", SEG Sports Entertainment Gear, downloaded from the Internet at <http://www.segshirts.com/features> (Aug. 8, 2013).

"Flex Mobile, a Flexible Phone That Becomes a Bracelet, Some Other Wearable Piece of Gear", Concept Phones, downloaded from the Internet at <http://www.concept-phones.com/tag/carolina-rebelo/> (Apr. 19, 2011).

"Flexible Smart Phone Fluid Presented by Philips", YouTube, downloaded from the Internet at <http://www.youtube.com/watch?v=Wq9montNgbM&feature=player_detailpage> (Apr. 2, 2012).

"iPING Putter App Cradle Attachment Case for iPhone 5", Carlsbad Golf Center, downloaded from the Internet at <https://www.cgcgolfshop.com/p-50-iping-putter-app-cradle-attachment-case-for-iphone-5.aspx> (Aug. 8, 2013).

"Moment Smartwatch: World's First Wrap Around Smart Watch," Momentum Labs LLC, 28 pp. (Jun. 24, 2014).

"outEDGE iPhone 5 External 2800 mAH Battery Extender Case w/ Flip Screen Cover", outEDGEPOWER Products, downloaded from the Internet at <http://www.outedgepower.com/outedge-iphone-5-external-2800-mah-battery-extender-case-w-flip-screen-cover/> (Aug. 8, 2013).

"Philips unveils world's first 'Rollable Display' pocket e-Reader concept Readius", PHYS.org website(Sep. 1, 2005).

"Rohm shows a flexible-OLED wristband", OLED-Info.com, downloaded from the Internet at <http://www.oled-info.com/rohm-shows-flexible-oled-wristband> (Oct. 5, 2009).

"Samsung concept video for wearables and phones", YouTube screenshot, downloaded from the Internet at <http://www.youtube.com/watch?v=ezriwGwJGOs> (Jul. 15, 2013).

"Samsung Galaxy X Concept Packs the Same Specs of teh Galaxy S II Plus a 12 MP Camera", Concept Phones website (May 15, 2011).

"Samsung Smart Watch Trademarks Filed, Wearable Internet Nearing Debut", Fox News Latino, downloaded from the Internet at <http://latino.foxnews.com/latino/money/2013/08/07/samsung-smart-watch-trademarks-filed-wearable-internet-nearing-debut/> (Aug. 7, 2013).

"Sony Smartwatch 2 goes official: water-resistant, open API", phoneArena.com, downloaded from the Internet at <http://www.phonearena.com/news/Sony-Smartwatch-2-goes-official-water-resistant-open-API_id44469> (Jun. 25, 2013).

"Taiwan Company to Begin Production of Large Format Flexible Electronic Paper Display Technology", Over the Wire, downloaded from the Internet at <http://www.naylornetwork.com/ppi-otw/articles/?aid=219054&issueID=29119> (Aug. 8, 2013).

"Thermal Image Athletic Apparel", Trendhunter Lifestyle, downloaded from the Internet at <http://www.trendhunter.com/trends/high-tech-athletic-apparel> (Mar. 16, 2013).

"Wearable Concept Phone is Not Nokia 888", Concept Phones, downloaded from the Internet at <http://www.concept-phones.com/tag/hyun-sung-lee/> (Jul. 18, 2008).

"What Will You Pop?", popSLATE, downloaded from the Internet at <http://www.popslate.com> (2012).

"Yuno Concept", TechPin, downloaded from the Internet at <http://www.techpin.com/yuno-concept/> (May 8, 2008).

(56) References Cited

OTHER PUBLICATIONS

Catacchio, "New OLED panel to bring bendable cell phones closer to reality?", TNW, downloaded from the Internet at <http://thenextweb.com/asia/2010/10/04/new-oled-panel-to-bring-bendable-cell-phones-closer-to-reality/> (Oct. 4, 2010).
Cochrane et al., "Flexible displays for smart clothing: Part I-Overview", Indian Journal of Fibre & Textile Research, 36:422-8 (Dec. 2011).
Cooper, "Hands-on with Polymer Vision's e-ink Readius", engadget, downloaded from the Internet at <http://www.engadget.com/2008/02/14/hands-on-with-polymer-visions-e-ink-readius/> (Feb. 14, 2008).
Crisp, "Rafael Nadal demonstrates Babolat Play & Connect interactive tennis racquet", gizmag, downloaded from the Internet at <http://www.gizmag.com/rafael-nadal-demonstrates-babolat-play--connect-interactive-tennis-racquet/22699/> (May 26, 2012).
Eaton, "Nokia Morph Cellphone Rolls Up, Stretches, Cleans Itself", GIZMODO, downloaded from the Internet at <http://gizmodo.com/360260/nokia-morph-cellphone-rolls-up-stretches-cleans-itself> (Feb. 25, 2008).
Extended European Search Report for Application No. 14874426.1, dated Aug. 11, 2017.
Extended European Search Report for Application No. 14875486.4, dated Sep. 19, 2017.
Fingas, "Tentative Samsung smartwatch design unearthed in Korean patents", engadget, downloaded from the Internet at <http://www.engadget.com/2013/08/03/tentative-samsung-smartwatch-designs-unearthed-in-korean-patents/> (Aug. 3, 2013).
First Chinese Office Action for Application No. 201480058291.8, dated Jul. 31, 2017.
Honig, "Pebble smartwatch review", engadget, downloaded from the Internet at <http://www.engadget.com/2013/01/25/pebble-smartwatch-review/> (Jan. 25, 2013).
Inofuentes, "Officially announced: LG G Flex and a healing factor", ars technica, downloaded from the Internet at <http://arstechnica.com/gadgets/2013/10/officially-announced-lg-g-flex-and-a-healing-factor/> (Oct. 28, 2013).
International Preliminary Report on Patentability for Application No. PCT/US2016/019729, dated Sep. 8, 2017.
International Preliminary Report on Patentability, International Application No. PCT/US14/50972, dated Jan. 19, 2016.
International Preliminary Report on Patentability, International Application No. PCT/US14/52814, dated Mar. 1, 2016.
International Preliminary Report on Patentability, International Application No. PCT/US14/52957, dated Mar. 1, 2016.
International Preliminary Report on Patentability, International Application No. PCT/US14/55043, dated Mar. 15, 2016.
International Search Report and Written Opinion for Application No. PCT/US2016/019729, dated May 17, 2016.
International Search Report and Written Opinion, International Application No. PCT/US14/50972, dated Jan. 14, 2015.
International Search Report and Written Opinion, International Application No. PCT/US14/52814, dated Dec. 11, 2014.
International Search Report and Written Opinion, International Application No. PCT/US14/52957, dated Dec. 9, 2014.
International Search Report and Written Opinion, International Application No. PCT/US14/71859, dated Mar. 20, 2015.
International Search Report and Written Opinion, International Application No. PCT/US14/72172, dated Mar. 18, 2015.
International Search Report and Written Opinion, International Application No. PCT/US2014/055043, dated Jan. 27, 2015.
International Search Report and Written Opinion, International Application No. PCT/US2014/072313, dated Apr. 22, 2015.
International Search Report and Written Opinion, International Application No. PCT/US2014/072328, dated Apr. 22, 2015.
International Search Report and Written Opinion, International Application No. PCT/US2015/014964, dated May 14, 2015.
International Search Report and Written Opinion, International Application No. PCT/US2015/022691, dated Jul. 8, 2015.
International Search Report and Written Opinion, International Application No. PCT/US2015/026163, dated Jul. 20, 2015.
International Search Report and Written Opinion, International Application No. PCT/US2015/030254, dated Aug. 10, 2015.
International Search Report and Written Opinion, International Application No. PCT/US2015/030724, dated Aug. 14, 2015.
International Search Report and Written Opinion, International Application No. PCT/US2015/032799, dated Aug. 31, 2015.
Johan, "ASUS Waveface Ultra", techfresh.net, downloaded from the Internet at <http://www.techfresh.net/asus-waveface-ultra/> (Jan. 19, 2010).
Kahn, "Is Apple's iWatch a slap wrist band with a flexible display?", 9to5Mac Apple Intelligence, downloaded from the Internet at <http://9to5mac.com/2013/02/21/is-apples-iwatch-a-slap-wrist-band-with-a-flexible-display/> (Feb. 21, 2013).
Kaki, "10 Beautiful Nokia Concept Phones for Future Generations", DreamsRain website, downloaded from the Internet at <http://www.dreamsrain.com/2011/09/18/10-beautiful-nokia-concept-phones-for-future-genrations/> (Sep. 18, 2011).
Kelvin, "Apple iBand Envisioned by T3: Health Features, Fitness and Watch Functions (Video)", Concept Phones, downloaded from the Internet at <http://www.concept-phones.com/apple/apple-iband-envisioned-t3-health-features-fitness-watch-functions-video/> (Feb. 18, 2014).
Kelvin, "Apple iWatch 2 Concept by Jermaine Smit Lets You Change the Watch Bracelet Easily (Video)", Concept Phones, downloaded from the Internet at <http://www.concept-phones.com/apple/apple-iwatch-2-concept-jermaine-smit-lets-change-watch-bracelet-easily-video/> (Mar. 5, 2014).
Kelvin, "Apple iWatch Concept Goes Back to Basics, Looks Like Nike Fuelband", Concept Phones, downloaded from the Internet at <http://www.concept-phones.com/apple/apple-iwatch-concept-basics-nike-fuelband/> (Oct. 22, 2013).
Kelvin, "Apple iWatch Glass Hologram is an Overpowered Smartwatch (Video)", Concept Phones, downloaded from the Internet at <http://www.concept-phones.com/apple/apple-iwatch-glass-hologram-overpowered-smartwatch-video/> (Apr. 19, 2014).
Kelvin, "Apple iWatch Goes Back to the Idea of an iPod Nano With a Belt", Concept Phones, downloaded from the Internet at <http://www.concept-phones.com/apple/apple-iwatch-idea-ipod-nano-belt/> (Mar. 2, 2014).
Kelvin, "Finally, a HTC Smartwatch! We Needed Those!", Concept Phones, downloaded from the Internet at <http://www.concept-phones.com/htc/finally-htc-smartwatch-needed/> (Feb. 4, 2014).
Kelvin, "Flexible Screen X Phone Becomes a Bracelet", Concept Phones, downloaded from the Internet at <http://www.concept-phones.com/cool-concepts/flexible-screen-phone-bracelet/> (Oct. 28, 2013).
Kelvin, "HTC One Watch Render Seems Taken out of Tron", Concept Phones, downloaded from the Internet at <http://www.concept-phones.com/htc/htc-watch-render-tron/> (Oct. 14, 2013).
Kelvin, "iPhone 6 and iWatch Pro Get Designed by Dani Yako", Concept Phones, downloaded from the Internet at <http://www.concept-phones.com/apple/iphone-6-iwatch-pro-designed-dani-yako/> (Jun. 6, 2014).
Kelvin, "iWatch Concept is a Curved Bracelet, Runs Flappy Bird", Concept Phones, downloaded from the Internet at <http://www.concept-phones.com/apple/iwatch-concept-curved-bracelet-runs-flappy-bird/> ( Feb. 13, 2014).
Kelvin, "iWatch Goliath is a Giant on Your Wrist (Video)", Concept Phones, downloaded from the Internet at <http://www.concept-phones.com/apple/iwatch-goliath-giant-wrist-video/> (May 23, 2014).
Kelvin, "iWatch Render Goes the Way of the Nike FuelBand", Concept Phones, downloaded from the Internet at <http://www.concept-phones.com/apple/iwatch-render-nike-fuelband/> (Jan. 21, 2014).
Kelvin, "Meizu MWatch Render is Exactly What Smartwatches Need", Concept Phones, downloaded from the Internet at <http://www.concept-phones.com/cool-concepts/meizu-mwatch-render-smartwatches/> (Feb. 12, 2014).
Kelvin, "MWC 2014: Kyocera Showcases Flexible Phone That Turns Into Bracelet", Concept Phones, downloaded from the Internet at <http://www.concept-phones.com/kyocera/mwc-2014-kyocera-showcases-flexible-phone-turns-bracelet/> (Feb. 27, 2014).

(56) References Cited

OTHER PUBLICATIONS

Kelvin, "New Apple iWatch Render Shows us an Ultrathin Bracelet", Concept Phones, downloaded from the Internet at <http://www.concept-phones.com/apple/apple-iwatch-render-shows-ultrathin-bracelet/> (Oct. 16, 2013).
Kelvin, "New iWatch Design Brings Us Back the Basics of a Watch", Concept Phones, downloaded from the Internet at <http://www.concept-phones.com/apple/iwatch-design-brings-basics-watch/> (Apr. 29, 2014).
Kelvin, "Nokia Lumia 101 Smartwatch is a Nice Little, Elegant Bracelet", Concept Phones, downloaded from the Internet at <http://www.concept-phones.com/nokia/nokia-lumia-101-smartwatch-nice-elegant-bracelet/> (Dec. 3, 2013).
Kelvin, "Superb Google Smartwatch Render Created in Cinema 4D", Concept Phones, downloaded from the Internet at <http://www.concept-phones.com/google/superb-google-smartwatch-render-created-cinema-4d/> (Jan. 31, 2014).
Kim, "Analysis of iWatch-related Patents from RitFast", IHS Technology, downloaded from the Internet at <http://www.displaybank.com/letter/letter_contents.php?nm=&email=prakash%40polyera.com&mail_id=8995> (Jul. 19, 2013).
Lilienthal, "Book? Accordian? Nope. Lumino is a Gorgeous LED Lamp the Goes Wherever You Do," Digital Trends, 6 pp. (Apr. 27, 2014).
Non-Final Office Action from U.S. Appl. No. 14/188,440 dated Aug. 14, 2015.
Office Action for U.S. Appl. No. 15/054,725, dated Aug. 23, 2017.
Rastogi, "Nokia Lumia 1080: The Concept Phone", 91 mobiles, downloaded from the Internet at <http://www.91mobiles.com/blog/nokia-lumia-1080-the-concept-phone.html> (Jun. 27, 2013).
Ridden, "Emopulse Smile SmartWatch goes up for pre-order", Gizmag, downloaded from the Internet at <http://www.gizmag.com/emopulse-smile-smartwatch/27984/> (Jun. 19, 2013).
Seth, "In 2020 We Can Wear Sony Computers on Our Wrist", Yanko Design Form Beyond Function, downloaded from the Internet at <http://www.yankodesign.com/2010/05/25/in-2020-we-can-wear-sony-computers-on-our-wrist/> (May 25, 2010).
Seth, "Love This iWatch!", Yanko Design Form Beyond Function, downloaded from the Internet at <http://www.yankodesign.com/2013/07/26/love-this-iwatch/> (Jul. 26, 2013).
Seth, "My Latest Fashion Accessory", Yanko Design Form Beyond Function, downloaded from the Internet at <http://www.yankodesign.com/2009/08/11/my-latest-fashion-accessory/> (Aug. 11, 2009).
Seth, "Super Sexy Roll", Yanko Design Form Beyond Function, downloaded from the Internet at <http://www.yankodesign.com/2011/03/21/super-sexy-roll/> (Mar. 21, 2011).
Smith, "Flexi E Ink screen finds home in curved world time watch", The Register, downloaded from the Internet at <http://www.theregister.co.uk/2010/10/11/phosphor_watches_world_time/> (Oct. 11, 2010).
Smith, "Samsung smartwatch concept shown in patent hints at flexible display use", Android Authority (Aug. 3, 2013).
Smith, "Samsung's curved smartphone is the Galaxy Round, launches in Korea tomorrow (video)", engadget, downloaded from the Internet at <http://www.engadget.com/2013/10/08/samsung-galaxy-round/> (Oct. 8, 2013).
Thrystan, "Apple iWatch 2 Design Appears, More Elegant Than Ever", Concept Phones, downloaded from the Internet at <http://www.concept-phones.com/apple/apple-iwatch-2-design-appears-elegant/> (Feb. 9, 2012).
Thrystan, "BenQ Siemens Snake Concept Phone is Yet Another Bracelet-Handset", Concept Phones, downloaded from the Internet at <http://www.concept-phones.com/benq-siemens/benq-siemens-snake-concept-phone-bracelethandset/> (Feb. 9, 2009).
Thrystan, "Bracelet Phone Concept Incorporates an MP3 Player, Shines Like a Diamond", Concept Phones, downloaded from the Internet at <http://www.concept-phones.com/fashion-phones/bracelet-phone-concept-incorporates-mp3-player-shines-diamond/> (Sep. 8, 2008).
Thrystan, "CEATEC 2010 Hosts TDK's Flexible OLED Displays; Hands-on Photos Here!", Concept Phones, downloaded from the Internet at <http://www.concept-phones.com/news/ceatec-2010-hosts-tdks-flexible-oled-displays-handson-photos/> (Oct. 5, 2010).
Thrystan, "Dyson Concept Phone Charger Turns Temperature Differences Into Electricity", Concept Phones, downloaded from the Internet at <http://www.concept-phones.com/cool-concepts/dyson-concept-phone-charger-turns-temperature-differences-electricity/> (Jul. 24, 2009).
Thrystan, "Email Beeper Watch is Hip, Restarts a Trend", Concept Phones, downloaded from the Internet <http://www.concept-phones.com/cool-concepts/email-beeper-watch-hip-restarts-trend/> (Mar. 3, 2009).
Thrystan, "Flux, Portable and Wearable PC Concept", Concept Phones, downloaded from the Internet at <http://www.concept-phones.com/eco-friendly/flux-portable-and-wearable-pc-concept/> (May 5, 2008).
Thrystan, "Fujitsu Concept Phones Part 2: Judge-Dredd-Like Curvy Handset", Concept Phones, downloaded from the Internet <http://www.concept-phones.com/fujitsu/fujitsu-concept-phones-part-2-judgedreddlike-curvy-handset/> (Oct. 10, 2009).
Thrystan, "iPhone 5 Bracelet Looks Out of this World", Concept Phones, downloaded from the Internet at <http://www.concept-phones.com/apple/iphone-5-bracelet-world/> (Jul. 6, 2012).
Thrystan, "iPhone Holographic Display Concept is Surreal, Could Work", Concept Phones, downloaded from the Internet at <http://www.concept-phones.com/apple/iphone-holographic-display-concept-surreal-work/> (Aug. 22, 2009).
Thrystan, "iWatch Design Created by James Ivaldi is All Metal", Concept Phones, downloaded from the Internet at <http://www.concept-phones.com/apple/iwatch-design-created-james-ivaldi-metal/> (Jul. 29, 2013).
Thrystan, "iWatch Render in the Vision of the Ciccarese Design Team: Simply Stunning (Video)", Concept Phones, downloaded from the Internet at <http://www.concept-phones.com/apple/iwatch-render-vision-ciccarese-design-team-simply-stunning-video/> (Aug. 21, 2013).
Thrystan, "Leaf Phone Features an Organic Structure, is Made of Eco-Friendly Plastic," Concept Phones, downloaded from the Internet at <http://www.concept-phones.com/eco-friendly/leaf-phone-features-organic-structure-ecofriendly-plastic/> (Nov. 4, 2009).
Thrystan, "LG Auki Bracelet Phone Is Colorful and Elegant", Concept Phones, downloaded from the Internet at <http://www.concept-phones.com/lg/lg-auki-bracelet-phone-colorful-elegant/> (Aug. 26, 2011).
Thrystan, "LG Helix Cellphone is Also a Slap Bracelet", Concept Phones, downloaded from the Internet at <http://www.concept-phones.com/lg/lg-helix-cellphone-slap-bracelet/> (Oct. 9, 2009).
Thrystan, "LG Oyster, a Bracelet-Like Mobile Phone Design", Concept Phones, downloaded from the Internet at <http://www.concept-phones.com/lg/lg-oyster-braceletlike-mobile-phone-design/> (Jul. 26, 2009).
Thrystan, "New iWatch Render by Tolga Tuncer is Fancy and Classy", Concept Phones, downloaded from the Internet at <http://www.concept-phones.com/apple/iwatch-render-tolga-tuncer-fancy-classy/> (Mar. 3, 2013).
Thrystan, "Nokia Mixed Reality Concept, Future Technology Demoed at Nokia World (Video)", Concept Phones, downloaded from the Internet at <http://www.concept-phones.com/nokia/nokia-mixed-reality-concept-future-technology-demoed-nokia-world-video/> (Sep. 9, 2009).
Thrystan, "Nokia Open Bracelet Shows Incoming Calls of the Ones You Love", Concept Phones, downloaded from the Internet at <http://www.concept-phones.com/nokia/nokia-open-bracelet-shows-incoming-calls-love/> (Dec. 13, 2008).
Thrystan, "Nokia Smart Watch Concept Looks Interesting", Concept Phones, downloaded from the Internet at <http://www.concept-phones.com/uncategorized/nokia-smart-watch-concept-interesting/> (Oct. 22, 2011).
Thrystan, "Purse Bracelet Fancy Concept Phone, Designed by Yw Li", Concept Phones, downloaded from the Internet at <http://www.concept-phones.com/fashion-phones/purse-bracelet-fancy-concept-phone-designed-yw-li/> (Oct. 19, 2008).
Thrystan, "Quartz Tele Concept Should be in a Final Fantasy Game, Because It's All About Crystals", Concept Phones, downloaded

(56) References Cited

OTHER PUBLICATIONS from the Internet at <http://www.concept-phones.com/fashion-phones/quartz-tele-concept-final-fantasy-game-crystals/> (Sep. 8, 2008).

Thrystan, "Samsung Finger Touching Cellphone Concept Comes in Handy", Concept Phones, downloaded from the Internet at <http://www.concept-phones.com/samsung/samsung-finger-touching-cellphone-concept-handy/> (Jan. 31, 2009).

Thrystan, "Samsung Futuristic Technology Relies on Health and Flexibility (Video)", Concept Phones, downloaded from the Internet at <http://www.concept-phones.com/samsung/samsung-futuristic-technology-relies-health-flexibility-video/> (Jul. 10, 2013).

Thrystan, "Samsung S-Health Bracelet Render is Based on Tizen OS", Concept Phones, downloaded from the Internet at <http://www.concept-phones.com/samsung/samsung-shealth-bracelet-render-based-tizen-os/> (Jun. 17, 2013).

Thrystan, "Sony Ericsson Bracelet Phone, a Design That Won't Make It Into Production", Concept Phones, downloaded from the Internet at <http://www.concept-phones.com/sony-ericsson/sony-ericsson-bracelet-phone-design-production/> (Jun. 19, 2009).

Thrystan, "Sony Ericsson Ring Phone Concept by Tao Ma Will Always Be a Winner", Concept Phones, downloaded from the Internet at <http://www.concept-phones.com/sony-ericsson/sony-ericsson-ring-phone-concept-tao-ma-winner/> (Sep. 15, 2008).

Thrystan, "Speak to Me Concept Watch Phone is Hot, a Must-Have Fashion Accessory", Concept Phones, downloaded from the Internet at <http://www.concept-phones.com/fashion-phones/speak-concept-watch-phone-hot-musthave-fashion-accessory/> (Jan. 27, 2009).

Thrystan, "The Hook Bracelet Phone Concept Runs Windows Phone in a New Format", Concept Phones, downloaded from the Internet at <http://www.concept-phones.com/cool-concepts/hook-bracelet-phone-concept-runs-windows-phone-format/> (Jun. 21, 2013).

Thrystan, "The New iPod is iBangle . . . iLike iT", Concept Phones, downloaded from the Internet at <http://www.concept-phones.com/apple/ipod-ibangle-ilike/> (Oct. 23, 2008).

Thrystan, "Xbox 720 Concept is a Pyramid With Two Kinect "Eyes"", Concept Phones, downloaded from the Internet at <http://www.concept-phones.com/microsoft/xbox-720-concept-pyramid-kinect-eyes/> (Jul. 8, 2013).

Thrystan, "Yuxa is a Wearable Cellphone Made From Eco-Friendly Materials", Concept Phones, downloaded from the Internet at <http://www.concept-phones.com/eco-friendly/yuxa-wearable-cellphone-ecofriendly-materials/> (Jun. 24, 2010).

Thrystan, "ZTE Cube Phone, Another Mobile World Congress Concept", Concept Phones, downloaded from the Internet at <http://www.concept-phones.com/cool-concepts/zte-cube-phone-another-mobile-world-congress-concept/> (Feb. 14, 2008).

Vertegaal et al., "Organic User Interfaces have non-planar displays that may actively or passively change shape via analog physical inputs", Organic User Interfaces—Communications of the ACM (May 31, 2008).

Wei et al., Shape memory materials and hybrid composites for smart systems, Part II: Shape-memory hybrid composites, J. Mater. Sci., 33:3763-83 (1998).

Extended European Search Report for Application No. 14875752.9, dated Aug. 1, 2017.

First Office Action received in corresponding Chinese Application No. 2014/180076308.2 dated Jun. 29, 2018.

First Office Action received in corresponding Chinese Application No. 2014/80076314.8 dated Jun. 28, 2018.

Office Action for Taiwanese Application No. 103129521, dated Apr. 9, 2018.

Office Action for Taiwanese Application No. 103145225, dated Jan. 7, 2019.

Third Chinese Office Action for Application No. 201480058291.8, dated Jan. 14, 2019.

European Office Action for Application No. 14874426.1, dated Mar. 7, 2019.

Notice of Reasons for Rejection for Japanese Application No. 2016-542913, dated Feb. 27, 2019.

Second Chinese Office Action for Application No. 201480076308.2, dated Mar. 11, 2019.

Second Chinese Office Action for Application No. 201480076314.8, dated Mar. 11, 2019.

Office Action for Taiwanese Application No. 103145254, dated Mar. 18, 2019.

European Office Action for Application No. 14875486.4, dated Apr. 25, 2019.

First Chinese Office Action for Application No. 201480056371.X, dated Apr. 3, 2019.

Office Action for Taiwanese Application No. 103127788, dated Mar. 7, 2019.

\* cited by examiner

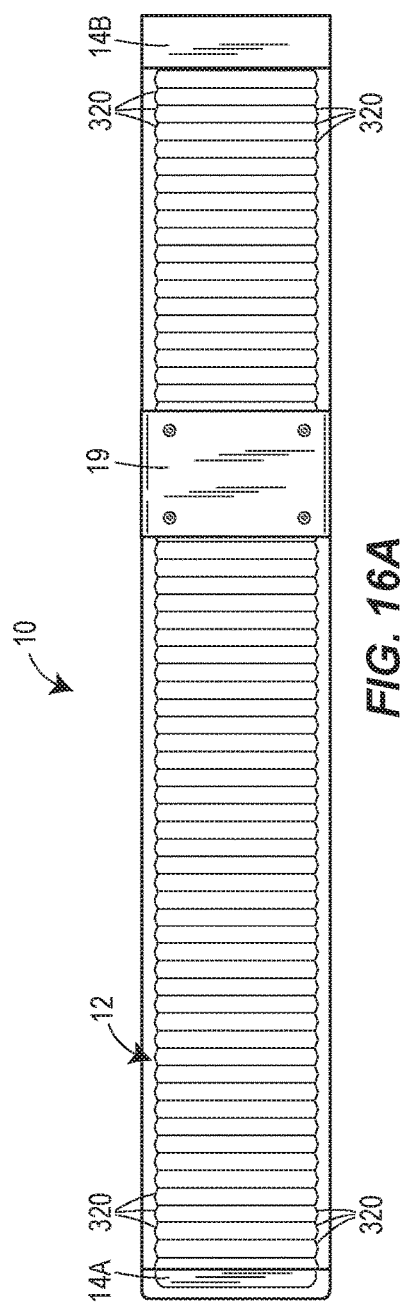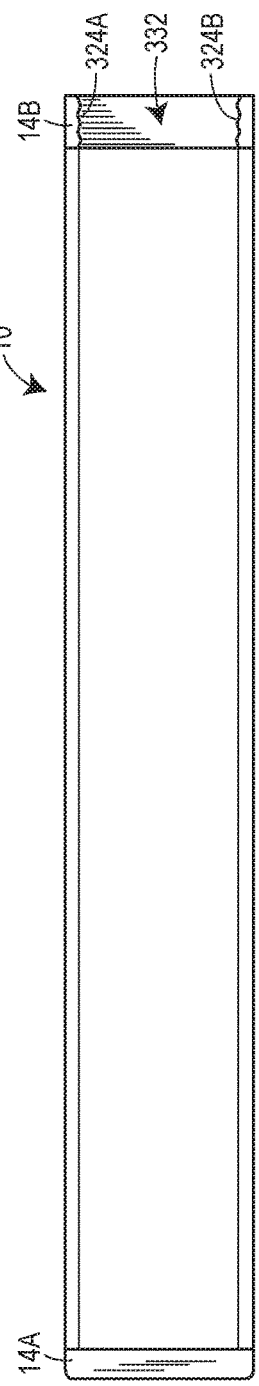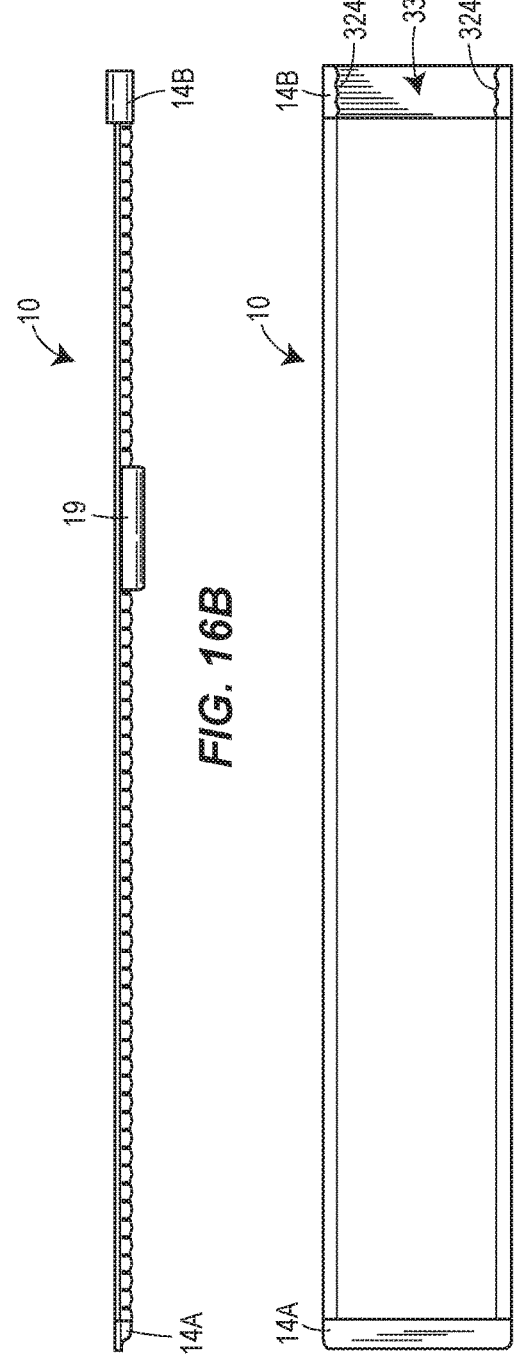
FIG. 16A
FIG. 16B
FIG. 16C

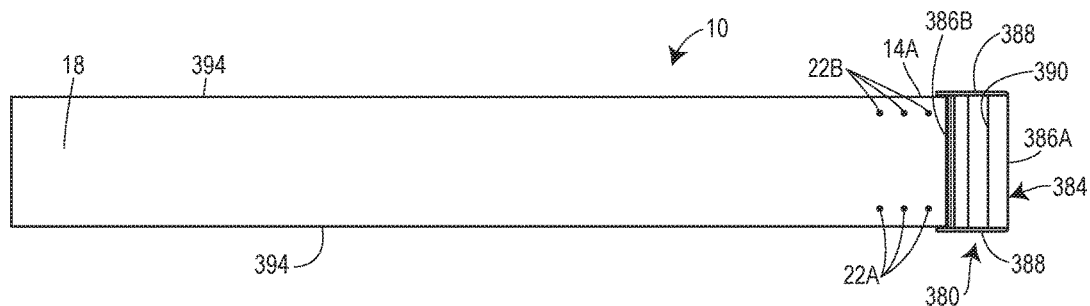
FIG. 24
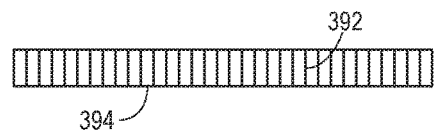
FIG. 25
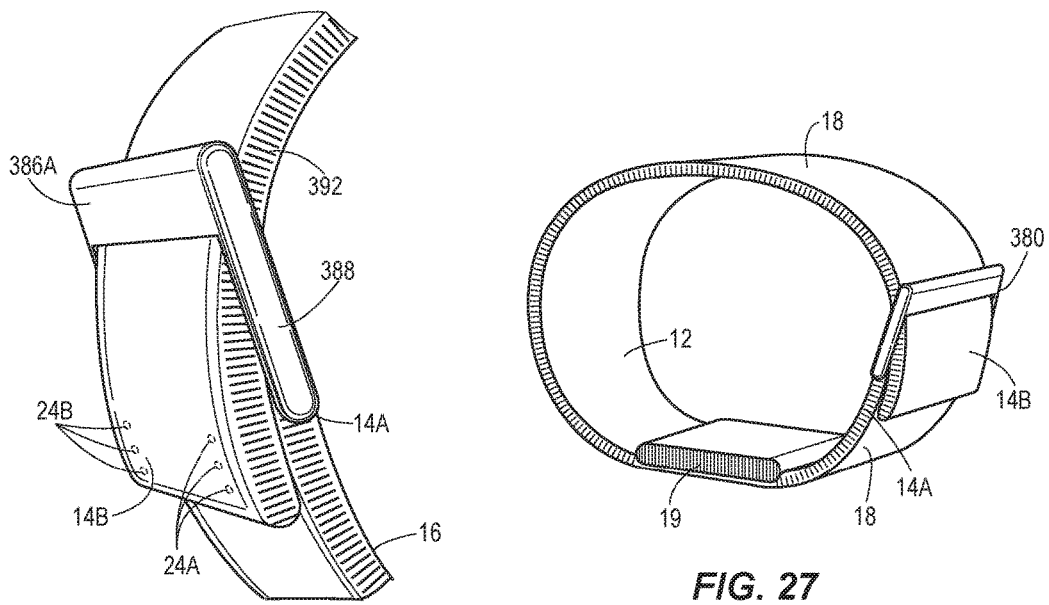
FIG. 26
FIG. 27

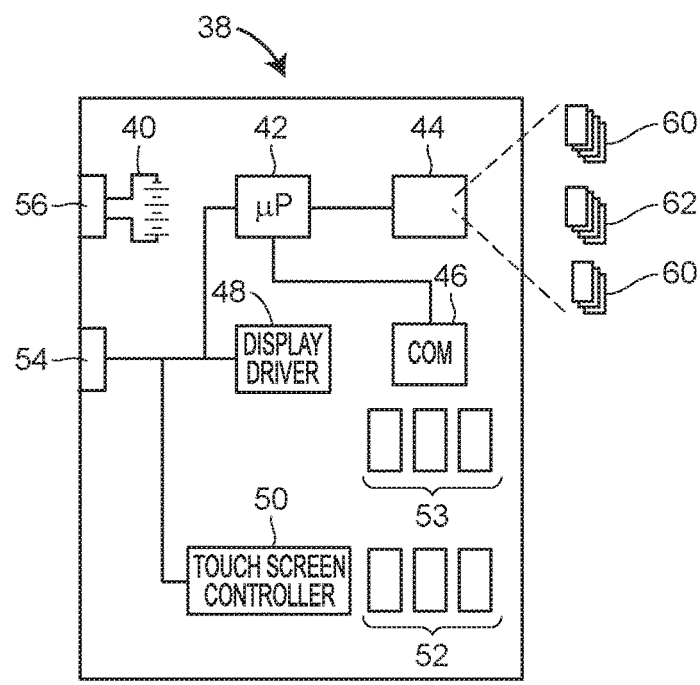
*FIG. 31*
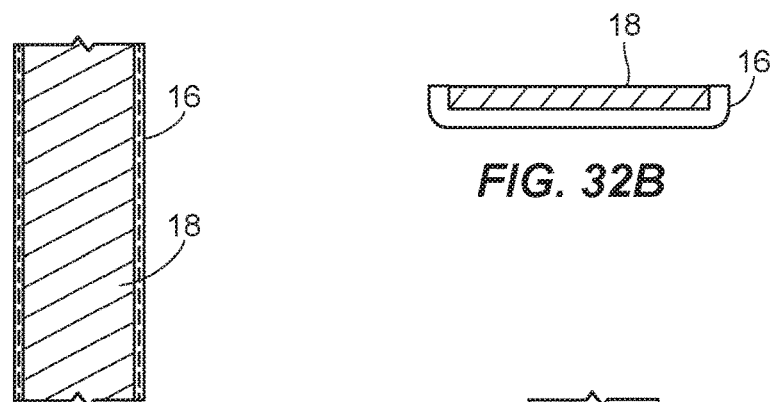
*FIG. 32A*  *FIG. 32B*
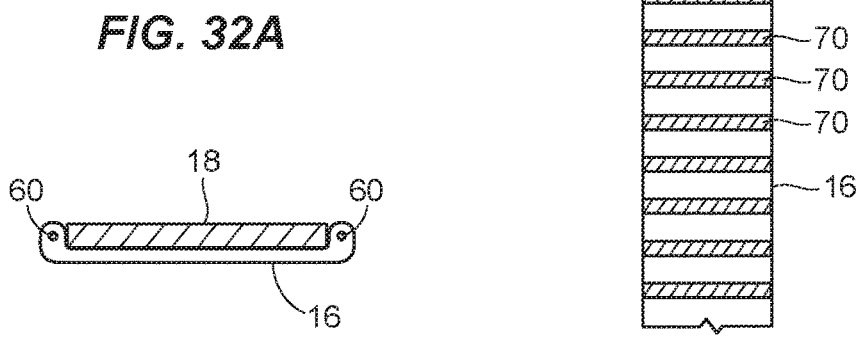
*FIG. 33*  *FIG. 34*

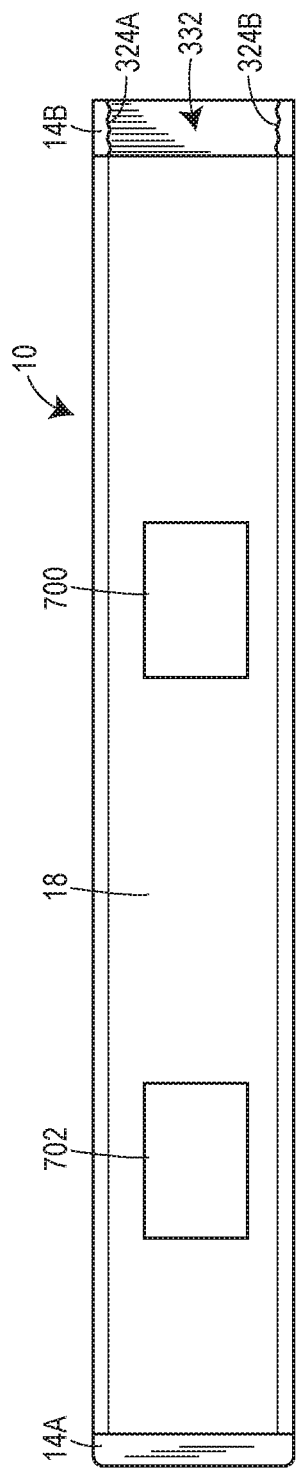
FIG. 51
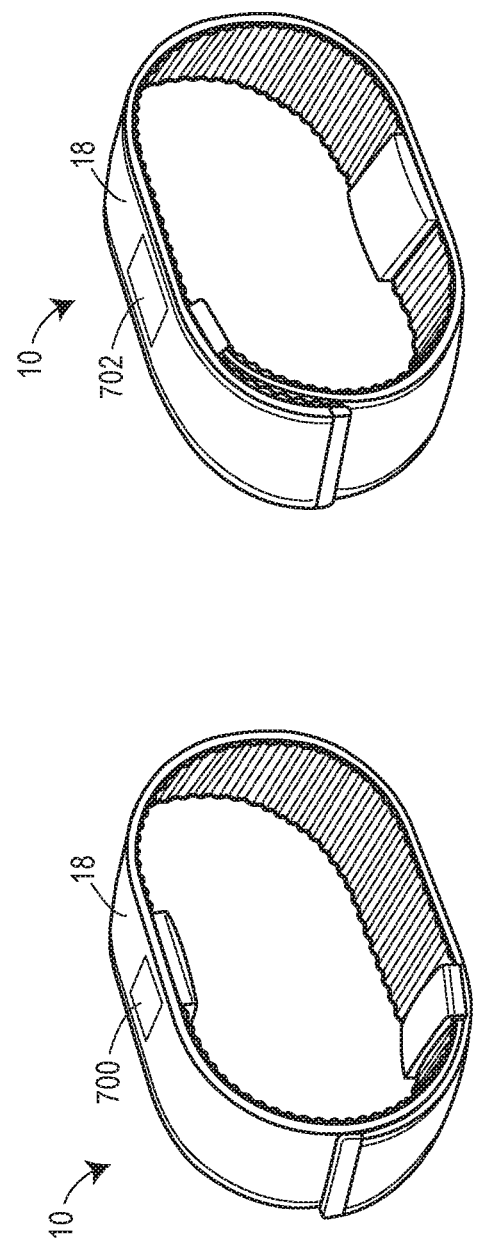
FIG. 52
FIG. 53

ATTACHABLE ARTICLE WITH SIGNALING, SPLIT DISPLAY AND MESSAGING FEATURES

RELATED APPLICATIONS

This application is a continuation application of International Patent Application No. PCT/US 14/55043 filed Sep. 10, 2014, which claims priority to and the benefit of the filing dates of: U.S. Provisional Patent Application Ser. No. 61/876,181, entitled "Attachable Device with an Integral Flexible Display and Natural Messaging Routine" and filed on Sep. 10, 2013; U.S. Provisional Patent Application Ser. No. 61/938,107, entitled "Attachable Device with Flexible Display and Orientation Detection" and filed on Feb. 10, 2014; U.S. Provisional Patent Application Ser. No. 62/001,993, entitled "Display Device with Split Display Features" and filed on May 22, 2014; and U.S. Provisional Patent Application Ser. No. 62/019,770, entitled "Attachable Article with Location Based Vibrational Signaling" and filed on Jul. 1, 2014. The entire disclosure of each of these applications is hereby expressly incorporated by reference herein for all uses and purposes.

TECHNICAL FIELD

This patent application relates generally to attachable articles generally including electronic displays, and more particularly to flexible electronic displays incorporated into or disposed on articles that are easily attachable to other items, such as arms, mugs, shoes, belts, coffee cups, phones, computers, etc. including flexible electronic displays that are used to run microlearning, calendar, messaging and other applications using display screens that are not simultaneously visible to the user.

BACKGROUND

Electronic displays are commonly installed within flat, hard surfaces of electronic devices, such as computer screens, television sets, smart phones, tablet computers, etc., and in many cases are installed on accessories for the electronic devices, such as removable monitors. Many electronic devices having an electronic display are portable, and have thus become very useful in implementing mobile applications. This fact is particularly true with smart phones which have become ubiquitous. However, unfortunately, typical mobile devices such as smart phones have electronic displays that are flat and rigid in nature. Thus, while these displays useful in implementing many different applications, the device on which the display is present must still typically be held in a hand, or must be stored in a pocket, a purse, a briefcase or other container, which makes the electronic device less accessible in many situations, such as when a person is carrying other items, undertaking an athletic activity such as running, walking, etc. Moreover, in many cases these traditional electronic devices require two free hands to hold and operate, making these devices cumbersome or difficult to use or to view in situations in which, for example, a person has only one or no free hands or is otherwise occupied.

While flexible displays are generally known and are starting to come into more common usage, flexible displays have not been widely incorporated into easily portable items such as items of clothing, wristbands, jewelry, etc. or on items that are easily attached to other items, much less in a manner that makes the display more useable and visible to the user in many different scenarios. To the extent that flexible displays have been suggested to be used on bands, such as wristbands and armbands, which wrap around a user's wrist or arm, these bands contemplate the use of connection structure on the ends of the band that connect and overlap in manners that are used for traditional watch bands, for example. As an example, U.S. Patent Application Publication Serial Number 2013/0044215 discloses a wristband device including a flexible display wherein the two opposite ends of the band overlap one another, when placed around a user's wrist, at a point directly beneath the user's wrist. Such an overlap makes the display surface of the band discontinuous at the portion of the band at which the upper or visible end of the band lays over the lower portion of the band. To adjust for this discontinuity, this device detects the overlap of the band and does not use the display surface associated with the hidden or covered portion of the band. However, such a configuration still results in a discontinuity within the display surface of the band on the bottom of the user's wrist, which is a location that is easily and naturally visible to a wearer of the band. Moreover, this configuration results in a display that has most of the useful viewable surface visible to the user when the user is looking at the display with his or her palm facing downwardly. Moreover, to the extent flexible or curved displays are used on band type of devices, such as devices that fit onto a user's wrist or arm, these displays are generally designed to make as much of the display surface visible to the user when the user's palm is facing downwardly and in fact do not place display surfaces at other locations on the band.

SUMMARY

An attachable article, such as a wristband, a shoe, a belt, a piece of jewelry, etc., includes a flexible electronic display disposed thereon in a manner that is bendable or conformable to a user's wrist or other curved or even flat surface, and that enables various images to be displayed on the electronic display in a manner that is easily viewable to a user. The attachable article with such a flexible electronic display may be attached to or worn on a user's body, such as in the form of a wristband or on a shoe or a belt, and may bend to fit the various contours or body surfaces on which the electronic display is located. The attachable article is also easily attached to other items, such as mugs, cups, computers, phone covers, bike handles, automobile dashboards, etc., that enable the flexible display to be viewed when not being held in one's hands. The electronic display of the attachable article is thus, in many cases, viewable to a user and is capable of being manipulated or actuated by the user without having to be held in one or both of the user's hands, making the electronic device useable while the user is engaged in or performing other activities, such as running, biking, etc.

In one case, the attachable electronic device includes a flexible electronic display disposed on a flexible, e.g., bendable, substrate in the form of a generally rectangular shape, with one or two end pieces or clasps attached to the substrate. Various electronics are disposed in the one or more electronic modules that may be within, for example, one or both of the end pieces, with the electronics module including a display driver for driving the electronic display to display fixed or changeable messages, artwork, pictures, etc. The electronic module may also include a processor for implementing applications or programming and a memory for storing pictures, images, messages, videos, etc. to be displayed on the electronic display at various times, as well as for storing applications and application data, such as configuration data, to be used by applications for performing various display tasks at different times. The electronic module may also include a battery for powering the electronic display, the processor, the display driver, and other electronic elements, a battery charging device for charging the battery either in a wireless or a wired manner, and a communications module that enables other computer devices to communicate with the processor, the display driver and the memory to provide new or different images or messages to be displayed on the electronic display, to configure the operation of the electronic display of the attachable electronic device, etc.

The flexible electronic display may be fabricated using any desired flexible electronic display material, such as any of various suitable plastics. If desired, the flexible electronic display may be manufactured as a display having pixel elements disposed on separate frontplane and backplane substrates formed of the same or different flexible material. In some cases, such as the case in which e-paper is used as the flexible display, a separate layer of material may be disposed between the frontplane and the backplane materials to form pixel elements. In any case, these substrate materials may be placed together to form the flexible electronic display, which may then be disposed on the flexible substrate, such as a leather substrate, a bendable metal substrate, etc., the combination of which can be flexed or curved in various manners to conform to the shape of a portion of a wearer's body, such as a wrist, a foot, etc. or to conform to the shape of other items to which the attachable article may be attached. In another case, the attachable electronic device may include a flexible, for example, transparent, touch screen interface disposed over or on top of the flexible electronic display to enable a user to input data or take input actions with respect to the flexible electronic display. In some cases, the inputs may be in the form of gestures that cause the electronic device to operate in a predetermined manner, to change modes of operation, etc.

The electronic display device, so formed may, for example, enable a user to have a single type or multiple different types of digital media depicted or displayed on the display at the same time, including, for example, photographs, digital artwork created by the user or others, messages sent to or created by the user, reminders, notes that provide instructive, educational or inspirational messages, e-cards, advertisements, personalized agendas, calendars, such as a personalized Outlook® calendar, etc.

More particularly, the display driver may be configurable to drive the electronic display by displaying thereon one or more images, messages, digital artwork, videos, icons, emoticons, etc., stored in the memory. The display driver may display a fixed image via the flexible electronic display, may change the image being displayed on the flexible electronic display from time to time, such as by accessing the memory and providing a new image to the display, may display videos, such as real time videos, and/or may display other types of digital media. Likewise, the display driver may display various interfaces associated with many different applications at different times or in different modes of the attachable electronic device. For example, the display driver may be driven by various different applications run in a processor to display a calendar interface, an e-mail in-box interface, an alarm clock interface, a keyboard interface, a step-counter interface, etc. These interfaces may be located on the same place on the flexible display and displayed at different times and may be located at different places on the flexible display and displayed at the same or at different times.

Still further, a battery charger unit may be connected to the battery and may operate to charge the battery using, for example, an inductively coupled charging technique. The battery charger unit may be a part of an inductively coupled charging system and may respond to electromagnetic waves produced by an exterior charging unit to charge the battery when the attachable article is disposed near the external charging unit. In another case, the battery charger may be a kinetic energy charger unit that converts motion of the device (such as that associated with movement of an arm when the attachable electronic device is in the form of a wristband) into electrical energy which is then used to charge the battery.

Still further, a communications module may enable the processor, the driver, the memory and/or the flexible electronic display to communicate with external sources or devices, such as a computer, a mobile phone, a tablet device, a remote control unit, etc., using, for example, wireless communications produced using a Wi-Fi network, a cellular network, a Bluetooth connection, a near-field communications (NFC) connection, an infrared communication technique, a radio frequency identification (RFID) device or tag, a Z-Wave protocol, a Zigbee protocol, another wireless protocol, etc. The communications module may operate to enable the driver to receive new images or other digital media for storage in the memory and ultimate display on the flexible electronic display, new applications for execution by the driver to perform control of the electronic display in various manners and new configuration information for configuring the manner in which the display driver controls the flexible electronic display to operate to display images and other information. In this manner, a user may reprogram the attachable article via, for example, a wireless communication network to display different pictures, images, messages, etc., at different times, to execute different applications at different times or in different locations. The communications module operates to eliminate the need for the attachable device to be plugged into a computer, or otherwise to have wires connected thereto for writing information to the memory of the device.

Still further, the memory may store, and the processor may execute, one or more applications provided or downloaded to the attachable electronic device by the user. These applications may enable the user to direct or program the operational features of the attachable device with the flexible electronic display, such as the particular digital media or images to display at any given time, the order in which images are to be displayed, the speed at which images will change, display features, such as background colors, borders, visual effects, etc. Moreover, the applications may enable or perform communications via the communications module to obtain information that may be displayed on the flexible electronic display, such as e-cards, advertising or promotional information, etc. provided via, for example, a Wi-Fi connection, a cellular connection, a Bluetooth or NFC connection, or any other wireless communications network or connection.

In one case, the processor, which may be a generally purpose micro-processor type of controller or a special purpose controller, the battery, the battery charger unit, the computer readable memory and the communications module may be integrated within, for example, an endpiece or a side wall of the attachable article and these components may be sealed or otherwise protected from water, air, dirt, etc. to which the exterior of the device is exposed. Any or all of these electronic components may be encapsulated in a hermetically sealed manner to prevent any direct exposure of these components to exterior forces and environmental hazards.

Still further, the flexible substrate of the attachable article may incorporate various types of structure to protect the flexible display by, for example, limiting the possible types of motion that the flexible display can undergo. These types of structures can, for example, include a set of transverse bars, stays or stints disposed in or on the flexible substrate to limit the torsional motion of the flexible substrate to thereby prevent damage to the flexible display due to torsional bending of the flexible display. In a similar manner one or more longitudinal members may be configured within the flexible substrate to limit the bending motion of the flexible substrate around either a longitudinal axis of the device or about a transverse axis of the device. This structure thus prevents flexing of the flexible display in one or more directions so as to prevent damage to the flexible display from bending motions that might de-laminate the various layers of the flexible display. Still further, the flexible substrate may include an edge or ridge formed of, for example, a metal wire or other material that is disposed along the edges of the flexible display to prevent or limit damage to the flexible display by impacts at the edge or side of the flexible display.

Still further, the flexible display be configured to present the maximal display area on upper the surface of the attachable article by being formed such that the edges of the flexible display on which lead lines that are used to energize a display area of the flexible display are bent or folded down or under the display. Such a configuration limits or reduces the need to have an area on the upper or outer surface of the attachable article at which no display pixels are located.

In another embodiment, a dynamically flexible, attachable article or device, such as a wristband or an armband, includes a split display feature that may be used to provide a user with different types of related information at different locations of an electronic display. The split display feature may be used to implement a microlearning application, or as part of an advanced, multi-part notice/message application that may be used to provide a user with related information in display screens that are not simultaneously viewable, to display multiple different parts of a single message at different locations of a display, to provide a notice of a message or other information and the actual message or information in different screens or locations on a display, to provide information related to another application, such as a game, in various different parts of a display, etc. The split display feature may be advantageously used on a flexible electronic display disposed on a flexible substrate that, for example, wraps around a user's wrist or arm, a mug or cup, a sleeve or a glove or other article of clothing, sports equipment, etc. The article may further include a clasping structure that connects two ends of a substrate together in a manner that maximizes the amount of continuous display surface viewable to the user when the display is used on a band that is disposed on a user's wrist or arm, for example. In particular, the split display feature may include two display screens that are separated from one another in a manner that the screens are not simultaneously visible to a user, wherein the screens present separate but related information such as a message notification and a body of a message, a first part of a single message (such as a subject line, a sender, etc.) and a second part of the same message (such as a body of the message), a word and a definition of the word, a word or phrase in one language and the same word or phrase in a different language, etc. The split display feature may include two display screens that are on the same display surface or on different display surfaces which may be disposed on a flexible substrate, for example. In one case, the flexible substrate may be part of a wristband, an arm band, etc., that includes a clasping structure located at the position of the band that lies or falls on the outside of the user's wrist or arm when the band is properly attached to the wrist or arm. In this case, the discontinuity in the display surface falls at a point next to or adjacent to the outside wrist of the wearer, which is the hardest point of the display for the user to view in a natural manner, and which thus minimizes the likelihood that the user will ever need to view a portion of the display at which the discontinuity falls. Moreover, this feature enables the user to view a continuous display along the band as the user, looking at the top of the band, turns his or her palm from a face down to a face up position, thus enabling a user to view a long continuous display screen or to view multiple different display screens such as the two or more different but related display screens associated with a microlearning application, a calendar or messaging application, etc., without observing the portion of the display at which the discontinuity caused by the clasping mechanism occurs. This feature provides for a more usable and ergonomic band, as this feature provides an easy to use microlearning or messaging feature on a band that provides the maximal amount of continuous viewable display surface to the user when wearing the band.

The band, by the nature of the flexible substrate and flexible electronic display, may be dynamically bendable or conformable to a user's wrist, arm or other curved surface, and enables various images to be displayed on the electronic display in a manner that is easily viewable to a user or wearer of the band. To use the split display feature, the user may be able to view a first display screen on one side of the band (such as on the portion of the band near the top of the wrist) without being able to see or fully see a second display screen on another side of the band that is preferably not simultaneously visible with the first display screen, such as a display screen on the band near or adjacent to the bottom of the user's wrist. The display screens may be sized, positioned or oriented so that if one of the display screens is visible to the user, the other display screen is not visible or completely visible to the user. This feature will thus require the user to move (e.g., rotate) his or her wrist or take some other physical action to view the other display screen. In this manner, the two display screens can form the display portion of a microlearning application which may assist a wearer in learning a new language, learning the definition of one or more words, etc. Such a split display feature may also include presenting two portions of other types of related messages, such as a notification of a text or e-mail message or a calendar event on one screen and the body of, or details about the message or event on the other screen. When used in this manner, the dynamically flexible, attachable article with such a flexible electronic display may be attached to or worn on a user's body, such as in the form of a wristband for example, and may bend to fit the various contours or body surfaces on which the electronic display is located. The dynamically flexible, attachable article is also easily attached to other items, such as mugs, cups, computers, phone covers, bike handles, automobile dashboards, stands, etc., that enable the flexible display to be viewed when not being held in one's hands or on one's body.

Still further, the split display feature may be provided on a display, such as a flexible display, disposed on other articles besides a band, such as on a sleeve or glove, on a mug or cup, or on any other multi-surfaced object or curved object.

The electronic display device so formed may, for example, enable a user to have a single type or multiple different types of digital image media depicted or displayed on the electronic display at the same time, including, for example, photographs, digital artwork created by the user or others, messages sent to or created by the user, reminders, notes that provide instructive, educational or inspirational messages, e-cards, advertisements, personalized agendas, calendars, such as a personalized Outlook® calendar, etc. More particularly, the display driver may be configurable to drive the electronic display by displaying thereon one or more images, messages, digital artwork, videos, etc., stored in the memory. In some cases, the display driver is connected to a set of electrodes or connectors that, in turn, are connected to the pixel elements of the flexible display, and the display driver provides respective content to each electrode or connector to produce the image displayed on the flexible display. The display driver may display a fixed image via the flexible electronic display, may change the image being displayed on the flexible electronic display from time to time, such as by accessing the memory and providing a new image to the display, may display videos, such as real time videos, and/or may display other types of digital image media or content. Likewise, the display driver may cause various related interfaces associated with many different applications at different times or in different modes of the attachable electronic device to be presented on the flexible display at different but coordinated locations. For example, the display driver may be driven by various different applications executed in the processor to display a multi-part calendar interface, a multi-part e-mail in-box interface, an alarm clock interface, a keyboard interface, a step-counter interface, etc. The display screens associated with these interfaces may be located on the same place on the flexible display and displayed at different times and may be located at different places on the flexible display and displayed at the same or at different times.

Additionally, in any of the band embodiments, the band may include first and second ends and a clasp mechanism may be coupled to one or both of the first and second ends of the band to couple the first and second ends of the flexible substrate together. The clasp mechanism may include one or more magnets and may further include a first set of uneven grooves or notches disposed at one portion of the band and a corresponding second set of uneven grooves or notches disposed at a second portion of the band for mating with the first set of uneven grooves or notches. In another case, the clasp mechanism may include a multiplicity of magnets disposed in series along at least one end of the band and the clasp mechanism may be adjustable to enable the first and second ends of the band to be moved to different overlapping positions with respect to one another. If desired, the clasp mechanism may include a series of magnets disposed along the first end of the band and a series of magnetically permeable material elements, such as metal or magnets, disposed along the second end of the band, or may include at least one magnet disposed at a first lateral end of the band and a magnetically permeable material disposed at a second and opposite lateral end of the band. The clasping mechanism may further include a tab disposed at one of the first and second lateral ends of the band and a groove that accepts the tab disposed at the other of the first and second lateral ends of the band. In still other embodiments, the clasp mechanism may include a hook and loop structure coupled to the band or a buckle connected to one end of the band that accepts the other end of the band through the buckle.

BRIEF DESCRIPTION OF THE DRAWINGS

FIGS. 16A-16C illustrate a bottom view, a side view and a top view, respectively, of a wristband device configured to provide maximal continuous display surface to a user when wearing the band.

FIGS. 24-27 illustrate a still further example attachable article in the form of a wristband device having a flexible electronic display and a connection or clasping structure that includes magnets and a buckle clasp while being configured to provide a maximal continuous usable display surface to a user when wearing the band.

FIG. 31 is a block diagram of an electronics module associated with the attachable articles of FIGS. 1-30.

FIGS. 32A-32B illustrate a top and a cross-sectional view of a flexible wristband device having structure that protects the edges of a flexible display disposed thereon.

FIG. 33 illustrates a cross-sectional view of a flexible wristband device illustrating further side protection structure for protecting the edges of a flexible display.

FIG. 34 illustrates a top view of a flexible substrate of a wristband device having torsional and transverse bending limiting structure in the form of a number of transverse stays.

FIG. 51 illustrates a wristband article in the form of that illustrated in FIGS. 16-19 laid out in a flat configuration and implementing two display screens associated with a split display application executed on the wristband article.

FIG. 52 illustrates a first perspective view of the wristband article of FIG. 51 when configured to be in a looped orientation.

FIG. 53 illustrates a second perspective view of the wristband article of FIG. 51 when configured to be in a looped orientation.

DETAILED DESCRIPTION

Figure 1:
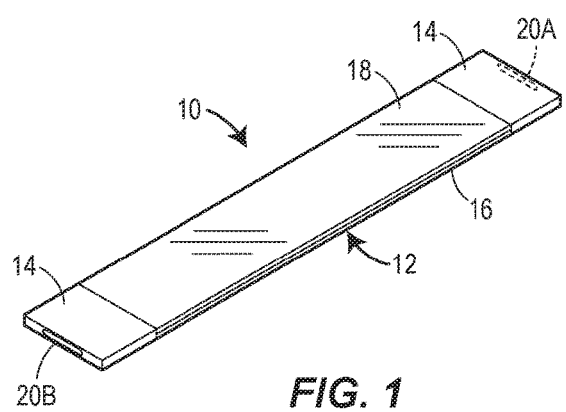
FIG. 1 is a perspective view of an example attachable article in the form of a wristband having a flexible display disposed thereon and a first type of magnetic clasp.

Referring now to FIG. 1, an attachable article 10 in the form of a wristband device includes a flexible band portion 12, which is generally rectangular in shape and configuration, disposed between two end pieces or clasps 14. The band portion 12 includes a flexible substrate 16 and a flexible electronic display 18 disposed on the substrate 16 to be viewable from the top of the band 12, as illustrated in FIG. 1. One or more of the end pieces or clasps 14, each of which may be made of hard plastic or other rigid material, but could instead be made of a pliable material, may include various electronic components therein for driving the flexible electronic display 18 and for providing other electronic functionality for the article 10.

Figure 2:
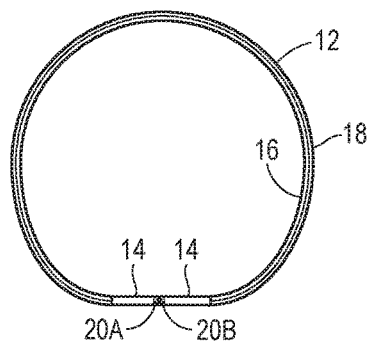
FIG. 2 is a side view of the wristband of FIG. 1 bent to form a fixed length wristband.

As illustrated in FIG. 1, one or both of the end pieces or clasps 14 may include a connection structure therein that functions to connect the end pieces 14 together when the band portion 12 is bent, as illustrated in FIG. 2, to form a circular or oval band. In one case, the connection structure may be in the form of a magnetic material 20A and 20B disposed in or on each of the clasps 14, wherein the materials 20A and 20B operate, when in close proximity to one another, to hold the end pieces or clasps 14 together. The magnetic materials 20A and 20B can each be a permanent magnet, or one of the materials 20A or 20B can be a permanent magnet while the other material 20A or 20B can be a magnetically permeable material, such as many kinds of metal. The magnetic material 20A and 20B can be disposed at the longitudinal ends of the clasps 14 so that the clasps 14 connect end-to-end when the band 12 is bent to allow the clasps 14 to meet up with each other end-to-end, as illustrated in FIG. 2. In the case in which the materials 20A and 20B are both permanent magnets, the materials 20A and 20B may be disposed in ends of the clasps 14 so that opposite poles of the permanent magnets are facing outwardly from the clasps 14 or so that the magnets have their respective north poles facing in opposite directions when the band portion 12 is bent in the manner shown in FIG. 2 (e.g., so that a south pole of one of the magnets 20A and 20B meets or mates with a north pole of the other one of the magnets 20A and 20B). As will be understood, the configuration and placement of the materials 20A and 20B in the clasps 14 in the manner illustrated in FIG. 1 enables the wristband device 10 to be clasped in a continuous circle with a fixed or predetermined length so that the clasps 14 meet end-to-end.

Figure 3:
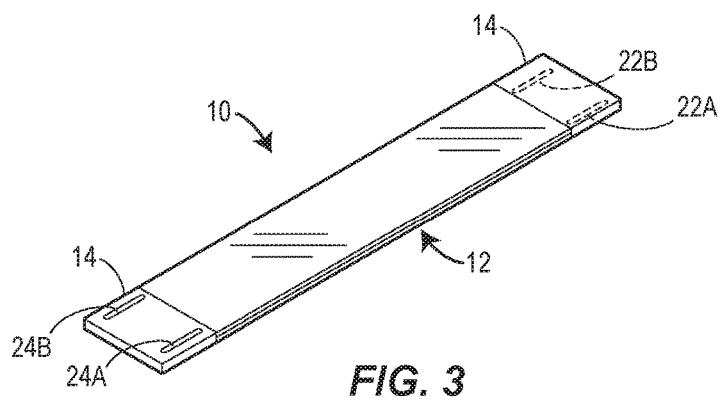
FIG. 3 is a perspective view of an example attachable article in the form of a wristband having a flexible display disposed thereon with a second type of magnetic clasp.
Figure 4:
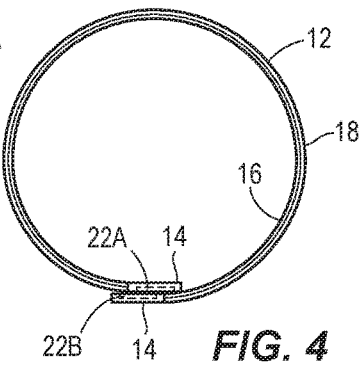
FIG. 4 is a side view of the example attachable article of FIG. 3 bent to form an adjustable length wristband.

In another embodiment illustrated in FIG. 3, the flexible attachable article 10, again illustrated in the form of a wristband, includes a similar band portion 12 and end pieces or clasps 14. However, in this case, the clasps 14 have connection structure in the form of magnets disposed on the top or bottom sides of the clasps 14 (and possibly even a portion of the band 12) to enable the wristband device 10 to be folded around on itself in an adjustable manner as illustrated in FIG. 4, so as to create a wristband of variable length when disposed around or connected around a wrist. As illustrated in FIGS. 3 and 4, magnets or magnetic members 22A and 22B are disposed on or near a lower side of one the clasps 14, and come into contact or react with magnets or magnetic members 24A and 24B disposed on or near an upper side of the other one of the clasps 14. In this manner, the clasps 14 may be disposed near or on top of one another during use and are thus connectable in various different positions with respect to one another, such as that illustrated in FIG. 4, when the flexible band 12 is bent to form a circular member to be placed around a wrist, a leg, a bicycle handle bar, etc., for example. In this manner, the wristband 10 may be easily adjustable in size to fit various different sized mounting members. As illustrated in FIG. 4, the substrate or flexible material 16 of the band portion 12 is illustrated as being flexed in a manner that causes the flexible display 18 to be disposed on the exterior or outside of the band portion 12. Of course, in the configuration illustrated in FIG. 4, the magnets or metallic members 22A and 22B on the one side, and the magnets or the metallic members 24A and 24B on the other side of the band portion 12 may slide with respect to one another in the longitudinal direction of the wristband 10 so as to make the wristband 10 variable in size or circular shape to fit around different sized wrists or other mounting members. Of course, if desired, portions of the members 22A, 22B and/or 24A, 24B could be disposed in the band portion 12 in addition to or instead of in the clasps 14 and, if so disposed, would still be considered as being disposed in the end portions of the band 12. Still further, any or all of the magnetic members 22A, 22b, 24A, 24B could be a single, long piece of material, as illustrated in FIGS. 3 and 4, or could be a series of magnetic members disposed near but not contacting each other, to enable better registration of the north and south poles of the respective magnetic members in various different longitudinal locations of the band 12. This second configuration may provide for better adjustability of the length of the band 12 when both magnetic members 22 and 24 are permanent magnets.

Figure 5A:
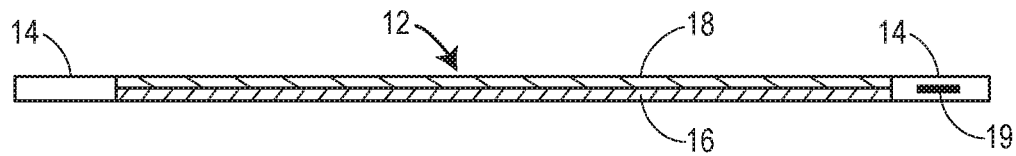
FIG. 5A is a side view of an example attachable article of FIG. 1 having a flexible display disposed on a flexible substrate between two clasps.

Of course, the wristband device 10 could take on many different configurations besides that illustrated in FIGS. 1-4. For example, as a reference, FIG. 5A illustrates a side view of the wristband 10 of FIGS. 1-4 in more detail. In this case, the band portion 12 is illustrated as including a flexible base or a substrate portion 16 that may be made of any suitable flexible material such as, for example, cloth, leather, plastic or other material, while the flexible display 18 is disposed on the substrate 16. The clasps 14 may be the same size as each other and may be the same height as the flexible display 18 and the substrate 16 together. In another case, the clasps 14 may be larger in height than the flexible display 18 and the substrate 16 and, in this case, may stick out above surface of the flexible display 18 and/or below the bottom surface of the substrate 16. As noted above, one or both of the clasps 14 may be or include an electronics module 19 that holds electronics, such as processors, memories, sensors, batteries, etc. that are used to power and drive the flexible display 18 and to provide other communication functionality for the wristband 10. If desired, the components of the electronics module 19 may be sealed or otherwise protected from water, air, dirt, etc. to which the exterior of the device 10 is exposed. For example, any or all of these electronic components may be encapsulated in one or both of the clasps 14 in a hermetically sealed manner to prevent any direct exposure of these components to exterior forces and environmental hazards.

Figure 5B:
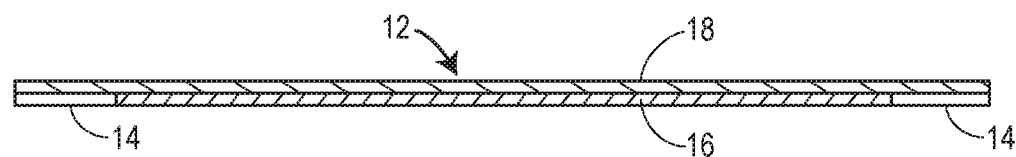
FIG. 5B is a side view of an example attachable article in the form of a wristband having a flexible display disposed over an entire length of a substrate.

In another embodiment, as illustrated in FIG. 5B, an attachable article in the form of a wristband 10 has the flexible display 18 disposed over the entire length of the substrate 16 and end portions 14, which may be part of the substrate 16. In this case, the flexible display 18 spans the entire length of the band portion 12 and of the wristband device 10 and thus goes from end to end of the device 10. The connection structure, in the form of for example, magnets (not shown in FIG. 5B) may be disposed in the end pieces 14 and/or, if desired, in portions of the flexible substrate 16.

Figure 5C:
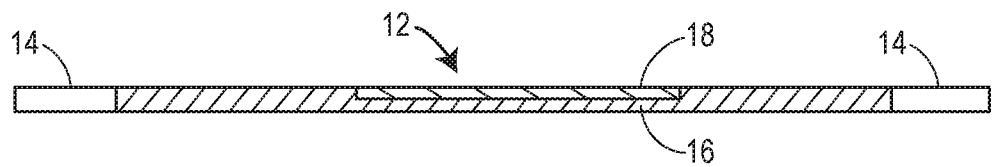
FIG. 5C is a side view of an example attachable article in the form of a wristband having a flexible display disposed on a center portion of a flexible substrate.

In yet another configuration, as illustrated in FIG. 5C, an attachable article in the form of a wristband 10 has a flexible display 18 disposed on a limited portion of the flexible substrate 16 so that the flexible display 18 is only disposed, in this case, in the center portion of the band 12. Of course, while not shown, the flexible display 18 could be disposed on any other portion of the band 12, including in portions offset from the center of the band 12 and the flexible display 18 could cover any desired amount or portion of uppers surface of the band 12. Here again, any desired connection structure could be provided in the ends of the substrate 16, including in the clasps 14, to connect the two ends of the band 12 together.

Figure 5D:
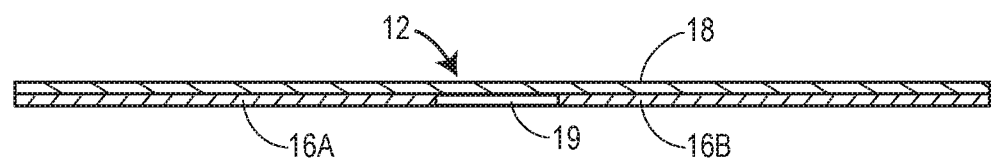
FIG. 5D is a side view of an example attachable article in the form of a wristband having a flexible display disposed over a substrate having two flexible end pieces connected by an electronics module.

In a still further case, as illustrated in FIG. 5D, an attachable article in the form of a wristband device 10 has a flexible display 18 disposed over a substrate 16 having two flexible end pieces 16A and 16B connected by an electronics module 19 which, in this case, is illustrated is being disposed in the center of the flexible substrate 16. The electronics module 19 may or may not be made of a flexible material and in either case is still part of the flexible substrate 16. Moreover, while being illustrated in the center of the substrate 16, the electronics module 19 could be disposed at any other location along the substrate 16 including at any position offset from the center of the substrate 16. Again, any desired connection structure could be attached to or disposed in or on the end portions of the device 10, including the ends of the substrate 16.

Figure 6:
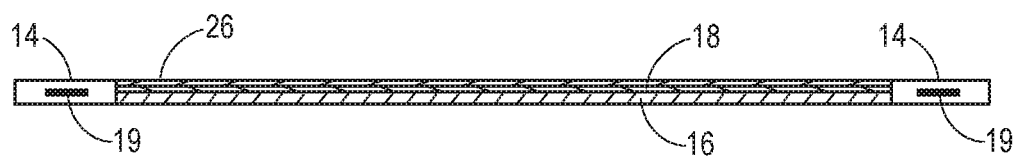
FIG. 6 is a side view of an example attachable article in the form of a wristband having a flexible touch screen disposed on a flexible display and a flexible substrate which are disposed between two clasps.

In another embodiment, as illustrated in FIG. 6, the wristband or attachable article 10 may be configured similarly to that of FIGS. 1-5D, but may also include a touch screen interface 26 disposed over the flexible display 18. In particular, in this case, the touch screen interface 26 can be a capacitive touch screen or any other type of touch screen interface that is transparent in nature, and thus can be laid over top of the flexible display 18 to allow the flexible display 18 to be viewable there-through. As will be understood, the touch screen interface 26 of FIG. 6 is powered by and controlled by the electronics disposed within one or more electronics modules 19 illustrated as being disposed, in this case, in both of the clasps 14 to perform various different types of touch detection functionality associated with a typical touch screen display. Of course, the touch screen interface 26 could be added to any of the wristband configurations of FIGS. 5A-5D or to any of the other attachable article embodiments described herein.

Figure 7A:
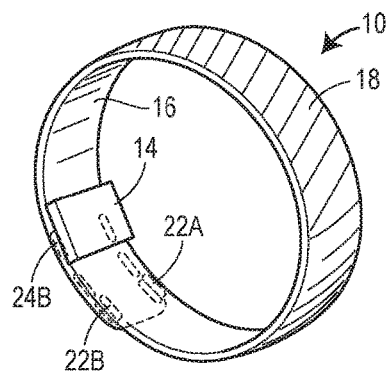
FIGS. 7A and 7B illustrate a perspective and top view, respectively, of an example attachable article in the form of a wristband having a clasp member at one end of the wristband and various magnetic members disposed on either end of the wristband to form an adjustable connection structure.
Figure 7B:
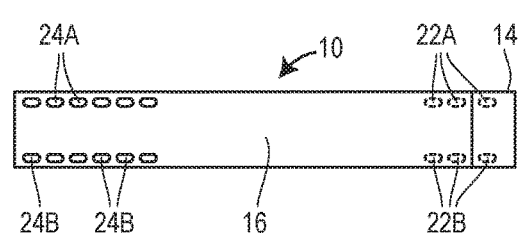

While the wristband device of FIGS. 1-6 is generally illustrated as having a flexible display and a flexible substrate disposed between or including two magnetically coupled clasps 14, with at least one of the clasps 14 containing or operating as an electronics module 19, other manners of disposing connection structure on the wristband device 10 and of locating the electronics module 19 could be used instead. For example, FIGS. 7A and 7B illustrate an example attachable article in the form of a wristband device 10 having a single clasp member 14, such as one of clasps members 14 of FIGS. 1-6, disposed at one end of the flexible display 18 and a set of magnets 22 and 24 or other magnetic material disposed on or in an end piece or end portion attached to or formed as part of the other end of the flexible substrate 16. In this case, individual magnets 22A and 22B are disposed in a spaced apart manner within the end piece 14 or are disposed in the flexible substrate 16 next to the end piece 14 and operate in conjunction with the individual magnetic materials 24 which are spaced apart and disposed on the other end piece of the band 12 to form a secure magnetic connection when the band portion 12 is wrapped around a user's wrist, for example. The spaced apart nature of the individual magnetic members 22 and 24 enable the band to be adjustable in length so that a pair of magnetic members 22A and 22B (on opposite sides of one end of the band 12 or substrate 16) may meet up with any of a number of different pairs of magnets 24A and 24B (on opposite sides of the other end of the band 12 or substrate 16) to enable the length of the band, when connected, to be adjustable. Of course, the magnetic members 22 and 24 may each be permanent magnets, or one may be made of permanent magnets while the other is formed of magnetically permeable material. Of course, the spaced apart magnetic material configuration of FIGS. 7A and 7B may be used in any of the embodiments illustrated in FIGS. 1-6.

Figure 8:
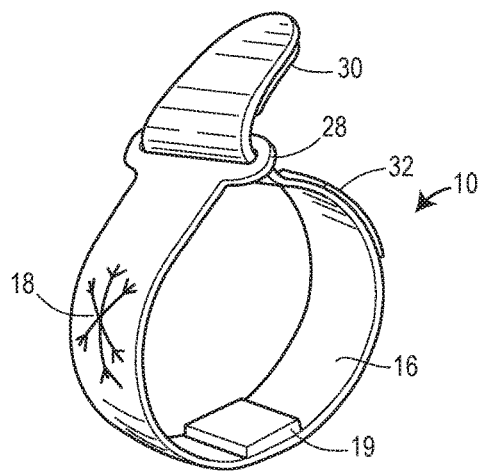
FIG. 8 illustrates an example attachable article in the form of a wristband having an electronics module disposed in the center of the article with a non-magnetic connection structure used at the ends of the flexible substrate to secure the article in a loop.

Moreover, while FIGS. 1-7 illustrate magnetic based connection structure, other connection structure, such as any desired hook and loop connection material, like Velcro, a buckle and hole structure, a snap fit buckle, etc. could be used instead of magnetically coupled connection structure. As a further example, FIG. 8 illustrates an example attachable article in the form of a wristband device 10 having an electronics module 12 disposed in the center of the band 12 with a non-magnetic clasp arrangement used at the ends of the flexible substrate 16 to secure the article 10 to a wrist of a user or other mounting member, such as a bike handle. In this case, a loop or buckle member 30 is attached to one end of the flexible substrate 16 and hook and loop pads 30 and 32 (one being hook material and the other being loop material) are attached to the end portions of the band 12. Here, one end of the band portions 12 may be looped through the buckle 28 and bent back to enable the hook and loop material pads 30 and 32 to contact each other and thus secure the band 12 to a user's wrist or other structure. Of course, while the electronics module 19 is illustrated as being located in the center of the band portion 12, the module 26 could be located on one of the ends as well, such as near the buckle 28. Moreover, use of the buckle 28 in FIG. 8 is not necessary, and instead, hook and loop pads may be placed at opposite ends of the band 12 to enable a connection between the two ends of the band 12.

Figure 9A:
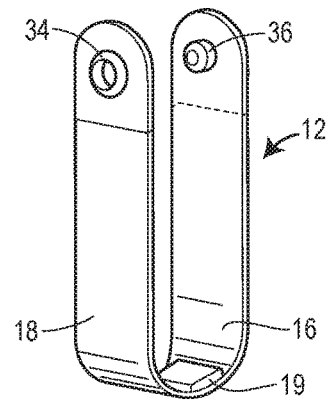
FIGS. 9A-9C illustrate an example attachable article in the form of a wristband having a flexible display and a further connection structure in the form of a snap-on connector.
Figure 9B:
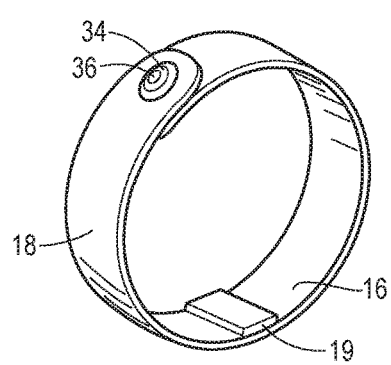
Figure 9C:
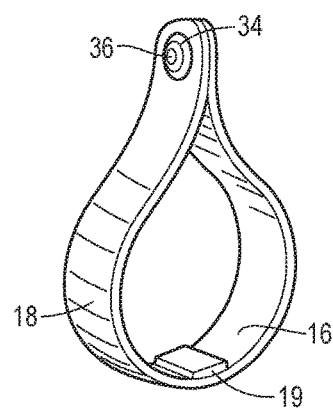

FIGS. 9A-9C illustrate a wristband device 10 having yet another type of connection structure in the form of a button based or snap-type connection structure. As illustrated in FIG. 9A, the wristband device 10 includes a band 12 having a flexible display 18 disposed on a flexible substrate 16. In this case a hole member 34 forming one side of a snap-fit connector and a snap member 36 forming the other side of a snap fit connector are disposed on opposite ends of the band portion 12. The snap member 36 snaps or slides into the hole member 34, which may have flexible material such as rubber disposed around a center hole to better interact with the snap member 36 and retain the snap member 36 therein. As illustrated in FIGS. 9B and 9C, the band 12 may be bent to enable the snap member 36 to side into either side of the hole member 34 to thereby create a circular band as illustrated in FIG. 9B or a tear-drop shaped band as illustrated in FIG. 9C. In this case, the electronics module 19 that drives the display 18 could be located near one of the ends or in the center of the band portion 12 of FIGS. 9A-9C or at any other desired location on the band 12. As will be understood, the embodiments of FIGS. 7-9 are provided to illustrate that other connection structure, besides a magnetic based connection structure, can be used on the ends of the band 12 to enable connection of the ends of the band 12 around a wrist or other mounting member, if so desired, as well as to illustrate that the electronics module 19 can be located in any desired position on the band 12. Of course, other connection structure could be used as well including, for example, a slide in snap-fit buckle.

Figure 10A:
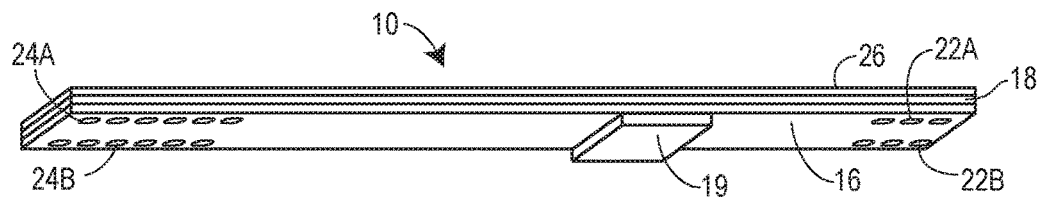
FIG. 10A illustrates an example attachable article in the form of a wristband having an adjustable clasping mechanism in the form of one or more magnets, an electronics module disposed at approximately one third of the length of the band from one end of the band, and a touchscreen input layer.
Figure 10B:
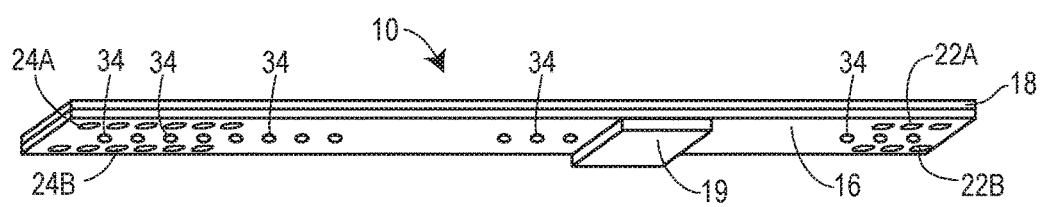
FIG. 10B illustrates an example attachable article in the form of a wristband having an adjustable clasping mechanism in the form of one or more magnets, an electronics module disposed at approximately one third of the length of the band from one end of the band, and a set of pressure sensors or magnetic sensors disposed in the band.
Figure 10C:
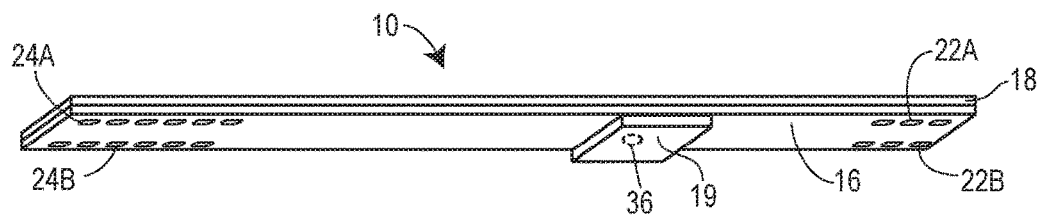
FIG. 10C illustrates an example attachable article in the form of a wristband having an adjustable clasping mechanism in the form of one or more magnets, and an electronics module, having a gyroscope component, disposed at approximately one third of the length of the band from one end of the band.

FIGS. 10A-10C illustrate various examples of an attachable article in the form of a wristband device 10 that includes and adjustable clamp or connection mechanism for enabling the ends of the band of the device 10 to overlap one another by different distances when worn so as to enable the wristband device 10 to be used on wrists of different sizes. In addition, however, each of the various devices in FIGS. 10A-10C include mechanisms for determining or enabling the electronics module 19 of the device 10 to determine the orientation of the band with respect to the user's wrist when being worn to enable better operation of the display features of the device 10. While a magnetic connection or clamping structure is illustrated in each of the devices 10 in FIGS. 10A-10C, other types of adjustable clamping or connection structure could be used instead and allow the electronics module 19 to be able to determine the orientation or positioning of the band or the display 18 when on the arm or wrist of a user. In addition, while the orientation detection and display calibration procedure described herein is described with respect to FIGS. 10A-10C when the devices of FIGS. 10A-10C are connected around the wrist of a user, the same or similar orientation detection and calibration procedure could be used when an attachable article is placed or connected around other body parts, including arms, legs, waists, or around other devices, like handlebars of bikes or motorcycles, etc. Likewise, the principles described herein for detecting the orientation and positioning of a band on a user's wrist with respect to FIGS. 10A-10C could also be used with any other adjustable band mechanism, such as that illustrated in FIG. 8, as an example only.

More particularly, FIG. 10A illustrates an example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band 16 from one end of the band 16 and two-thirds of the length of the band 16 from the other end of the band 16. In addition, the device 10 of FIG. 10A includes a flexible touchscreen interface 26 disposed over the flexible electronic display 18.

FIG. 10B illustrates another example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band support 16 from one end of the band 16 and two-thirds of the length of the band 16 from the other end of the band support 16. However, in this case, one or more pressure sensors 34 are disposed in or on the band support 16 and are electronically connected to the electronics module 19 to provide signals to the module 19 indicative of pressure, strain, or force applied to those locations of the band 16. While the pressure sensors 34 are indicated to be disposed at various points along the length on the band support 16 on both sides of the band support 16 near the ends of the support 16, these sensors may be disposed along the entire band support 16, only on one side of the support 16, or on any suitable portion of the support 16 for the purpose of detecting pressure or force applied to the band support 16 or display screen 18. Still further, the pressure sensors 34 may be any desired or suitable pressure sensors including piezoelectric sensors, strain gauges, etc. Additionally, any desired number of sensors 34 may be used and these sensors 34 may be spaced apart from one another any suitable distance along the length of the band support 16. Likewise, the sensors 34 may be disposed in the center of the band support 16 (from side to side) or offset from the center. Also, more than one sensor 34 may be located at any longitudinal location along the band support 16. Alternatively, the sensors 34 of FIG. 10B could be magnetic sensors which sense magnetic field strength, for example. In this case, the magnetic sensors 34 may detect whether one or more magnets on one end of the band (used a part of the coupling mechanism) are near to or are interacting with magnets or magnetic material on the other end of the band. Here, the magnetic sensors 34 may be used to detect the amount of overlap of the ends of the band.

FIG. 10C illustrates another example attachable article in the form of a wristband device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band support 16 from one end of the band 16 and two-thirds of the length of the band 16 from the other end of the band support 16. However, in this case, a gyroscopic detection element 36 is dispose in the electronic module 19 and operates to detect the orientation of the band (or at least the electronics module 19 or other location at which the gyroscopic element 36 is disposed). The gyroscopic element 36 operates to detect the orientation of the band with respect to gravity or other acceleration force to which the element 36 is subjected. While a single gyroscopic element 36 is illustrated as being disposed in the electronics module 19 of FIG. 10C, this or similar elements could be disposed at other locations along the band (e.g., within the support 16 of the band) and/or multiple gyroscopic elements 36 could be disposed at various locations along the support 16.

Generally speaking, the embodiments of FIGS. 10A-10C include structure or elements, such as a touchscreen interface 26, pressure or magnetic sensors 34 or gyroscopic elements 36 that are included in or communicatively connected to the electronics module 19 and that can be used to assist the electronics module 19 in determining the orientation or positioning of the wristband support 16 or the display 18 with respect to one or more fixed locations on a user's wrist when the device 10 is wrapped around the user's wrist. This operation enables the module 19 to then calibrate the display 18 to place or center display information such as display screens at particular locations with respect to the user's wrist, such as being centered on the top or posterior side of the wrist, on the bottom or anterior side of the wrist, on the radius or thumb side of the wrist, on the ulnar or fifth finger side of the wrist, etc. Likewise, these elements or sensors may be used to detect user inputs and band orientation or location.

Moreover, while FIGS. 1-10 illustrate magnetic or other based connection structures, other connection structures, such as one or more mechanical connectors (e.g., buckles, snap components, etc.), any desired hook and loop connection material, like Velcro, or some other connection means, etc. could be used instead of or in addition to any of the above-described magnetically coupled connection structures. In the embodiments in which the article 10 includes a connection structure that utilizes one or more mechanical connectors in combination with one any of the above-described magnetically coupled connection structures, the connection structure can provide both a magnetic connection and a mechanical connection, and, thus, the connection structure provides a stronger and more durable connection between the end pieces 14 of the article 10 or between the various portions of the band or support 16. In these cases, the magnetic connectors can, but need not, be disposed near or proximate to the mechanical connectors.

Figure 11A:
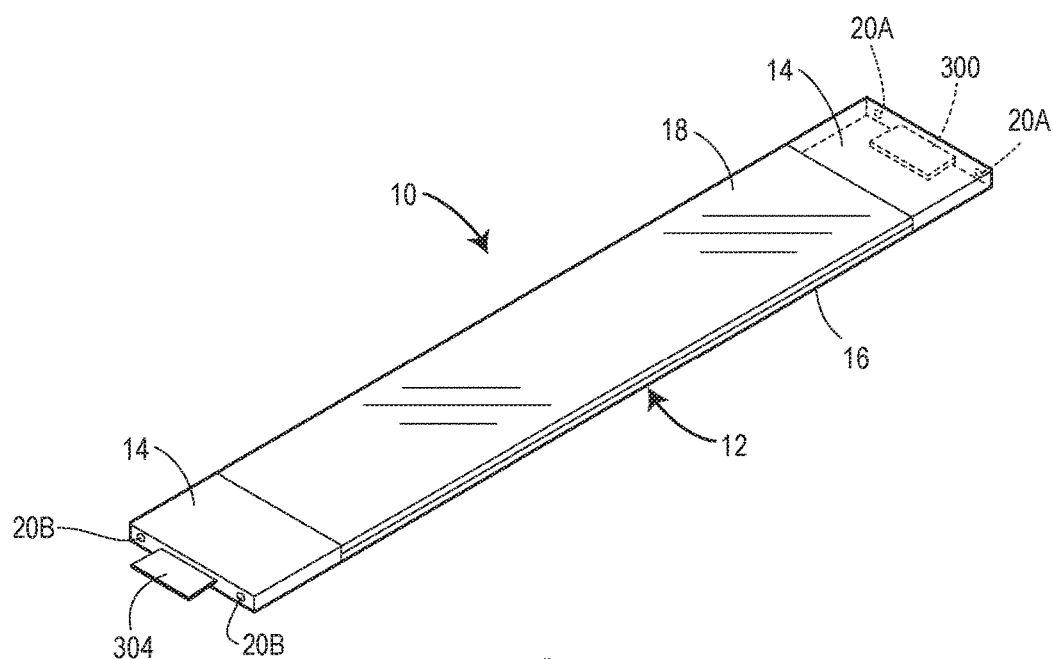
FIGS. 11A and 11B illustrate an example attachable article in the form of a wristband device having a flexible display and a connection structure that includes magnets and a tab and recess arrangement.
Figure 11B:
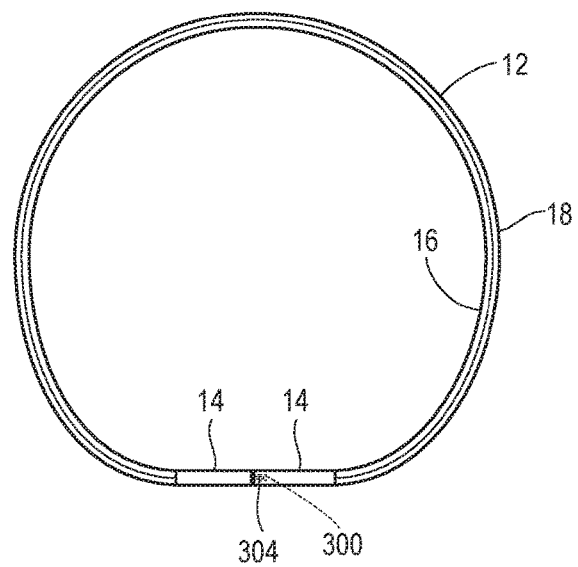

As an example, FIGS. 11A and 11B illustrate a set of magnetic connectors used in conjunction with a mechanical connector to effect a clasping structure in a fixed length band. In the embodiment illustrated in FIG. 11A, the flexible attachable article 10, again illustrated in the form of a wristband, includes a similar band portion 12 and end pieces or clasps 14. However, in this embodiment, the article 10 has a connection structure that not only includes magnets 20A, and 20B disposed at the lateral ends of the band portion 12, as described above in connection with FIGS. 1 and 2, but also includes mechanical connectors that can effectuate a mechanical connection between the end pieces or clasps 14, such that the clasps 14 can be mechanically and magnetically connected to one another when the device 10 is bent, as illustrated in FIG. 11B, to form a circular or oval band. In FIGS. 11A and 11B, the mechanical connectors take the form of a recess 300 that is formed or defined in the longitudinal or lateral end of one of the clasps 14 and a tab 304 that is formed or defined on, and extends laterally outward from, the longitudinal or lateral end of the other one of the clasps 14. The tab 304 can be disposed or inserted into the recess 300 to mechanically connect the longitudinal ends of the opposing clasps 14 to one another when the flexible band 12 is bent to be disposed around or on a wrist, an arm, etc., for example. At the same time, the magnets 20A and 20B, by virtue of being in proximity to one another as shown in FIG. 11B, create or provide a magnetic force that also serves to hold the clasps 14 together. In this manner, the connection structure described in connection with FIGS. 11A and 11B can provide a stronger, more durable connection when the clasps 14 are connected in an end-to-end arrangement so that the device 10 is clasped in a continuous circle or oval with a fixed or predetermined length.

In some instances, it may be desirable to be able to adjust (e.g., expand, reduce) the length of the band 12 to accommodate or fit differently-sized wrists or other mounting members (e.g., a leg instead of an arm). It may also or instead be desirable to add or increase functionality, such as battery capacity, charging capability, sensing capability, connectivity, and/or display capability, to the device 10 using such extenders. Accordingly, one or more extenders can be removably coupled to one or both of the first and second ends 14A, 14B of the band 12 to adjust the length of the band 12 and/or to add or increase functionality to the device 10. It will be understood that any number of extenders can be used, depending on the desired length of the band 12 and/or the desired functionality. If desired, the extenders can have the same general shape but may have slightly different sizes. In other examples, the extenders can have different shapes (than one another) and/or different sizes (than one another). The extenders can have the same radius of curvature or can have different radii of curvature, such that the device 10 can accommodate different radii of curvature due to different sized mounting members (e.g., different sized wrists). Likewise, the extenders can have the same arc length or can have different arc lengths, such that the device 10 need not include an excessively large number of extenders to accommodate larger mounting members (e.g., larger wrists). The extenders can be made of a same or different flexible material (e.g., cloth, leather, plastic), a same or different rigid or semi-rigid material (e.g., hard plastic, metal), or various combinations of different flexible, rigid, and semi-rigid materials. As an example, two extenders can be made of a flexible material while two other extenders can be made of a rigid or semi-rigid material.

To provide additional or increased functionality to the device 10, one or more of the extenders can include an electronics module that is disposed on or within the extender and that holds electronics, such as one or more batteries, one or more chargers, one or more sensors, one or more memories, one or more processors, one or more communication modules, or combinations thereof. In addition to powering the other electronics in the electronics module 19, the one or more batteries can power other electronics in the device 10. In this manner, the one or more extenders can provide additional battery or charging capacity or functionality to the device 10. The one or more chargers can be connected to the one or more batteries and/or one or more other batteries of the device 10 and enable charging or recharging of any of these batteries using any known or desired recharging circuitry or methodology. As an example, the one or more chargers can use any desired energy harvesting technology to derive energy from a solar source, a kinetic energy source (e.g., motion of the device 10), a heat energy source, or some other external energy source. In this manner, the extenders can provide charging capability or functionality to the device 10, or, when the device 10 already includes some charging capability, can provide additional charging capability or functionality to the device 10. The one or more sensors may include, for example, an impact sensor or step counter, one or more gyroscopic sensors or gyroscopes, temperature sensors (which may, for example detect the temperature of the skin of the user when the device 10 is being worn), vibration sensors, pulse rate monitors, external pressure sensors, blood pressure sensors (e.g., which may detect the blood pressure of the user wearing the device 10), heart rate sensors (e.g., which may detect the heart rate of the user wearing the device 10), accelerometers, strain gauges, gyroscopes, accelerometers, compression sensors, tensional strain sensors, positional sensors (e.g., GPS sensors), light sensors, piezoelectric sensors, or any other desired sensors. In this manner, the extenders can provide sensing capability or functionality, or additional sensing capability or functionality, to the device 10. The one or more processors, which may, for example, include programmable, general purpose processors and/or specially programmed processors, can implement operation of any of the electronics of the extenders and/or other electronics of the device 10. In this manner, the extenders can provide computational processing capability or functionality, or additional processing capability or functionality, to the device 10. The one or more memories can be, for example, one or more flash memories or other suitable types of non-transitory, tangible, data storage media. The one or more memories can store various applications to be run on the various processors and/or various data (e.g., image or video data files). In this manner, the extenders can provide memory capability or functionality, or additional memory capability or functionality, to the device 10. The one or more communication modules may include or use any type of communication hardware/software/firmware that uses any desired types of communication techniques to enable the processors to communicate with other electronics in the device 10 and/or exterior devices or sources. Of course, the communication modules could include multiple different types of communication hardware/software/firmware, including any kind of hardwire-based communication module or wireless-based communication module. As examples, the communication modules may be a wired or wireless communication module that may provide wired or wireless-based protocol (e.g., WiFi, Z-Wave, ZigBee) communications between the extenders and the device 10 and other devices (including other extenders) or a communication network such as a LAN or a WAN to which other devices are communicatively connected. Likewise, the communication modules may be a near field communication (NFC) module or a Bluetooth communication module, which may perform near field communications or Bluetooth communications in any known or desired manner with nearby NFC or Bluetooth enabled devices, thereby enabling wireless communication between the extenders and the device 10 and other closely situated or closely located electronic devices. Still further, the communications modules may include a USB or other type of wired communication module for decoding and encoding USB-based communication signals to be sent out and received via the USB communication module(s). In the above-described manner, the extenders can provide communication (e.g., connectivity) capability or functionality, or additional communication capability or functionality, to the device 10.

Moreover, one or more of the extenders can include a display. The display can be similar to the flexible display 18 of the device, while in other cases the display can be a different type of display. The display can be an extension of the flexible display 18 of the device 10, while in other cases the display on the extender can be a separate display, such as, for example, an indicator display or a matrix display that, for example, reacts to certain user interactions, reacts to certain users wearing the device 10, provides different content, or performs some other desired functionality. In this manner, the extenders can provide additional display capability or functionality to the device 10.

In some cases, it will be necessary for the device 10 to query the one or more extenders to identify the extenders and the functionalities or capabilities offered by those extenders. As such, the one or more extenders can include a unique identifier that identifies the respective extender, its location, and its capabilities. Depending upon the communication capability or functionality provided by the respective extender, this unique identifier may be a unique NFC identifier, Bluetooth communication identifier, or some other identifier.

It will also be appreciated that the one or more extenders can include indicia, such as, for example, engravings, branding, badges, and artwork. The indicia can be added by a user of the device 10 (e.g., for self-expressive reasons) or can be added by the manufacturer (e.g., to identify an extender as corresponding to a certain device 10 or to denote functionality).

As briefly noted above, the one or more extenders can be removably coupled to one or both of the ends 14A, 14B of the band 12. In some cases, one or more extenders can be removably coupled to only one of the ends 14A, 14B, while in other cases one or more extenders can be removably coupled to each end 14A, 14B. In the event that two or more extenders are utilized, these extenders will also be removably coupled to one another. The extenders can be removably coupled to one another in the same manner as the extenders are coupled to one or both of the ends 14A and 14B or can be removably coupled to one another in a different manner.

Generally speaking, it is envisioned that the one or more extenders can be removably coupled to one or both of the ends 14A, 14B and to one another using a number of different connection techniques or methods. If desired, one or more of the extenders can be removably coupled via a mechanical connection such as, for example, a tab and a recess arrangement (e.g., similar to the tab and recess arrangement described above), a standard charging bus (e.g., 2-, 3-, or 4-wire charging bus), a snap arrangement, or some other mechanical connection that mechanically connects the extenders and the device 10 but does not, on its own, facilitate electronic communication between the extender and the device 10 and other extenders. In cases in which the extenders are equipped with electronic or communications functionality as described above, the electronic or communication modules of the extenders can facilitate the desired connection and communication once the extender(s) is(are)

mechanically connected. As an example, the communication modules may facilitate NFC, Bluetooth, Z-Wave, or other wireless communication. In other cases, the mechanical connection may be paired with an electronic connection (e.g., a data bus connection) that facilitates the desired communication. For example, the standard charging bus could be paired with a standard data bus (e.g., SPI, i2C) to facilitate both the desired mechanical and electronic communication. In still other cases, the mechanical connection may be sufficient; in other words, the user may only wish to adjust the length of the band 12 and may not be concerned with the functionality provided by the extenders.

Figure 11C:
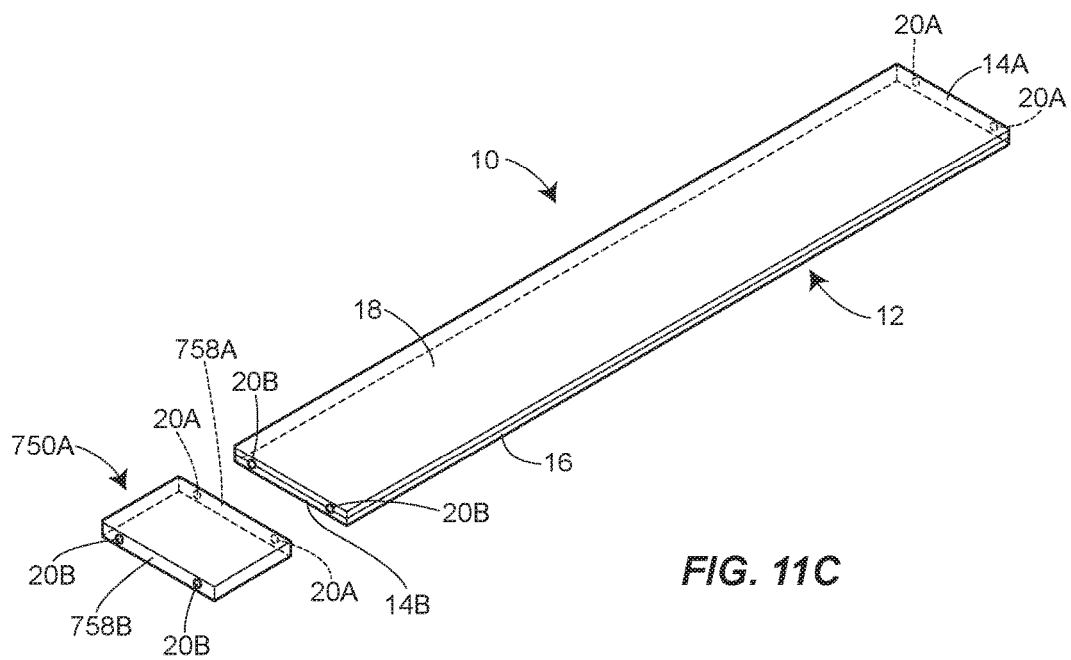
FIGS. 11C and 11D illustrate an example of an attachable article in the form of a wristband device having one or more extenders removably coupled to the attachable article, via a magnetic connection, to enable the adjustment of the length of the attachable article.
Figure 11D:
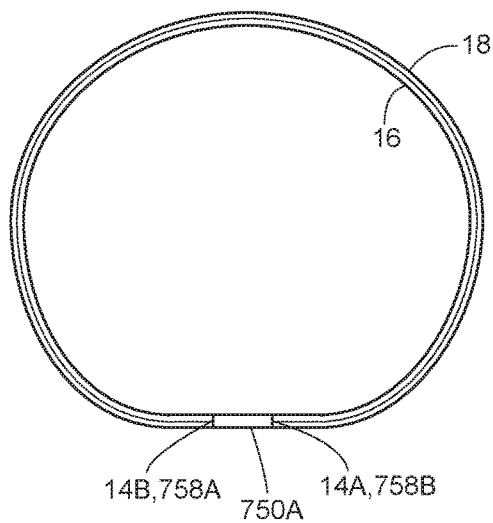

In another embodiment, one or more of the extenders can be removably coupled via a magnetic connection. Such a configuration is illustrated in FIG. 11C in which, for example, magnets 20A and 20B can be disposed on the ends 14A and 14B, respectively, of the band 12 and magnets or magnetic material 20A and 20B can be disposed on respective ends 758A, 758B of an extender 750A. When, for example, the end 758A of the extender 750A is brought into close proximity with the end 14B of the band 12, the magnets 20A and 20B operate to connect the end 758A of the extender 750A to the end 14B of the band 12 of the device 10, thereby connecting the extender 750A to one end of the device 10. The extended device 10 can then be folded around on itself as illustrated in FIG. 11D and the end 758B of the extender 750A can be similarly connected, in an end-to-end manner, to the end 14A of the band 12. It will be appreciated that the device 10, by virtue of being extended by the extender 750A, will be longer and will therefore have a slightly different (e.g., slightly flatter or more oval) shape than the non-extended device 10 (see FIG. 11B) when in the folded position.

In cases in which the extender 750A is equipped with functionality as described above, the communication module(s) of the extender 750A can facilitate NFC, Bluetooth, Z-wave, or other wireless communication between the extender 750A and the device 10. In this manner, the extender 750A can provide additional functionality or capability to the device 10.

Figure 11E:
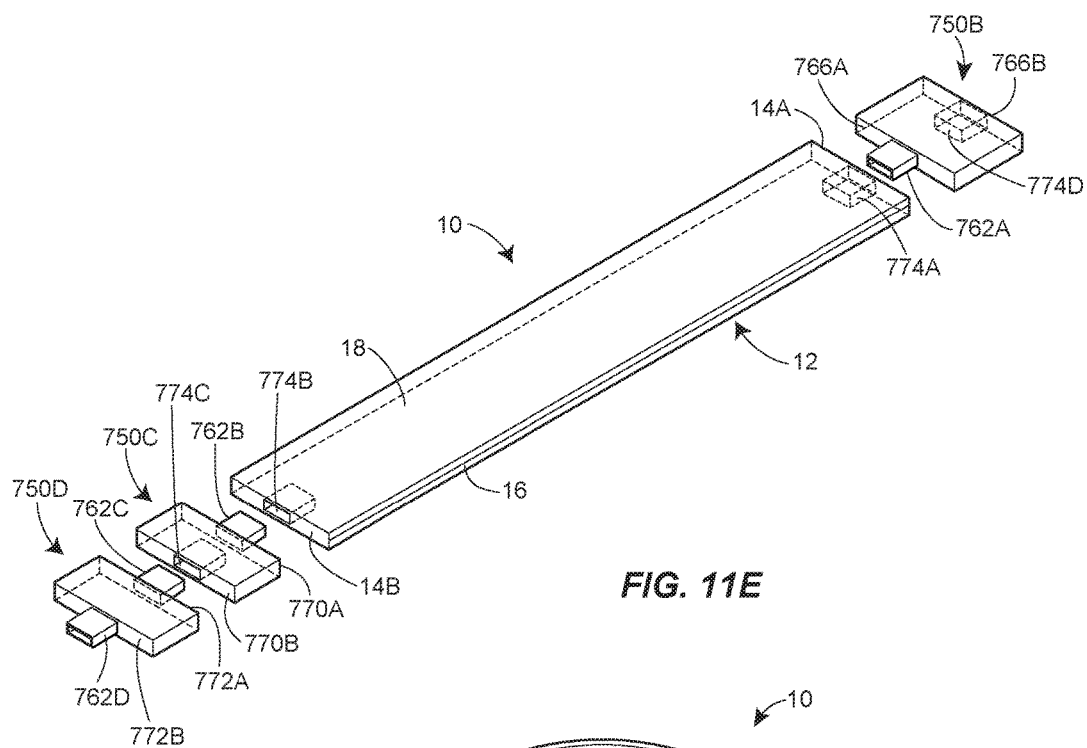
FIGS. 11E and 11F illustrate an example of an attachable article in the form of a wristband device having one or more extenders removably coupled to the attachable article, via an electronic connection such as a USB connection, to enable adjustment of the length of the attachable article.

In a further embodiment, one or more of the extenders 750 can be removably coupled via a dual mechanical-electronic connection that mechanically connects the one or more extenders 750 and the device 10 while simultaneously facilitating electronic communication between the extenders 750 and the device 10 and other extenders 750. For example, as illustrated in FIG. 11E, a first extender 750B can be removably coupled to the end 14A of the band 12 via a regular or standard USB connection (including micro-USB connectors), and second and third extenders 750C, 750D can be removably coupled to the end 14B of the band 12 via regular or standard USB connections. More specifically, the first extender 750B can include a regular or standard USB plug 762A that is formed in and extends outward from a first end 766A of the first extender 750B, the second extender 750C can include a regular or standard USB plug 762B, identical to the plug 762A, formed in and extending outward of a first end 770A of the second extender 750C, and the third extender 750D can include two regular or standard USB plugs 762C, 762D, also identical to the plug 762A, formed in and extending outward from first and second ends 772A, 772B, respective, of the third extender 750D. To accommodate the regular or standard USB plugs 762A, 762B, regular USB sockets 774A, 774B can be formed into the ends 14A, 14B, respectively, of the device 10. It will be understood that each of the USB plugs 762A, 762B can be inserted into either USB socket 774A, 774B. To accommodate the regular USB plugs 762C, 762D, regular or standard USB sockets 774C, 774D can be formed into the ends 770B, 766B, respectively. In this manner, a dual mechanical-electronic connection can be facilitated between the device 10 and the three extenders 750B-750D.

Figure 11F:
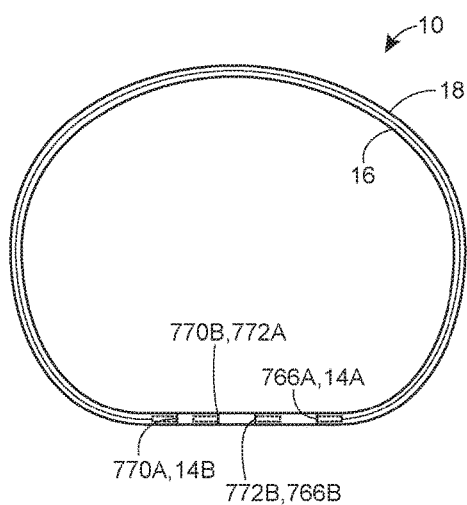

When the first end 766A of the first extender 750B is brought into proximity with the end 14A of the band 12, the USB plug 762A of the first extender 750B can be inserted into the USB socket 774A formed in the end 14A of the band 12, thereby mechanically and electronically connecting the first extender 750B to the device 10. Likewise, when the first end 770A of the second extender 750C is brought into proximity with the end 14B of the band 12, the USB plug 762B of the second extender 750C can be inserted into the USB socket 774B formed in the end 14B of the band 12, thereby mechanically and electronically connecting the second extender 750C to the device 10. Similarly, when the first end 772A of the third extender 750D is brought into proximity with the second end 770B of the second extender 750C, the USB plug 762C of the third extender 750D can be inserted into the USB socket 774C formed in the end 770B of the second extender 750C, thereby mechanically and electronically connecting the third extender 750D to the second extender 750C, and, in turn, the rest of the device 10. The extended device 10 can then be folded around on itself as illustrated in FIG. 11F. With the second end 766B of the first extender 750B in close proximity to the second end 772B of the third extender 750D, the USB plug 762D of the third extender 750D can be inserted into the USB socket 774D formed in the second end 766B of the first extender 750B to connect the second end 766B of the first extender 750B to the second end 772B of the third extender 750D in the end-to-end manner illustrated in FIG. 11F. It will be appreciated that the device 10, by virtue of being extended by the extenders 750B, 750C, will be longer and will therefore have a slightly different (e.g., slightly different or more oval) shape than the non-extended device 10 illustrated in FIG. 11B and the extended device 10 illustrated in FIG. 11D when in the folded position. Finally, in cases in which the extenders 750B, 750C, and 750D are equipped with functionality as described above, the extenders 750B, 750C, and 750D can provide additional functionality or capability to the device 10, via the USB connections.

While the connection between the extenders 750B-750D and the device 10 in FIGS. 11E and 11F are described as being a standard or regular USB connection, a different type of USB connection (e.g., a micro USB connection, a mini USB connection) or another type of dual mechanical-electronic connection (other than USB, for example) could be used instead. Moreover, any of the above-described connection techniques or methods could be used in combination with one another or any other desired connection technique not explicitly mentioned herein.

Of course, if desired, one or more of the extenders 750 (e.g., the extender 750A of FIGS. 11C and 11D) can be removed or detached from the device 10 in a similar manner as described herein. This might be done, for example, when it is desirable to reduce the length of the band 12 to accommodate or fit a smaller-sized mounting member (e.g., an arm instead of a leg), and/or when additional functionality provided by one or more of the extenders 750 is no longer necessary.

In another embodiment illustrated in FIGS. 12-15, the flexible attachable article 10, which is again illustrated in the form of a wristband, includes a similar band portion 12 having one or more ends 14, and an electronics module 19 disposed at or on one of the ends 14. In this embodiment, the article 10 also includes the magnets 22A, 22B, 24A, and 24B described above, but includes different mechanical connectors than the article 10 illustrated in connection with FIGS. 11A and 11B. In the band device of FIGS. 12-15, the mechanical connectors take the form of a plurality of grooves or notches 320 formed on the band 12 and a plurality of projections (also called grooves or notches) 324 formed on the module 19 which are configured to mate with, engage and/or retain the corresponding grooves or notches 320 therein when one end of the band 12 is bent to overlap with the other end of the band.

Figure 13:
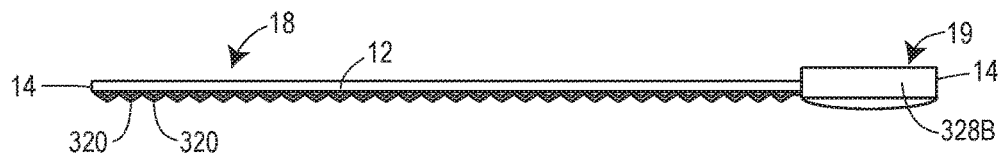
Figure 14:
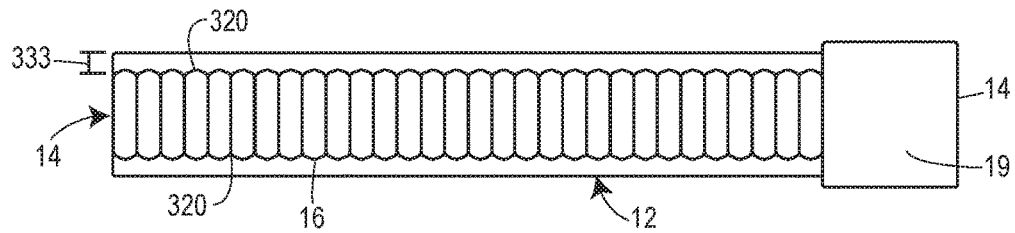
Figure 15:
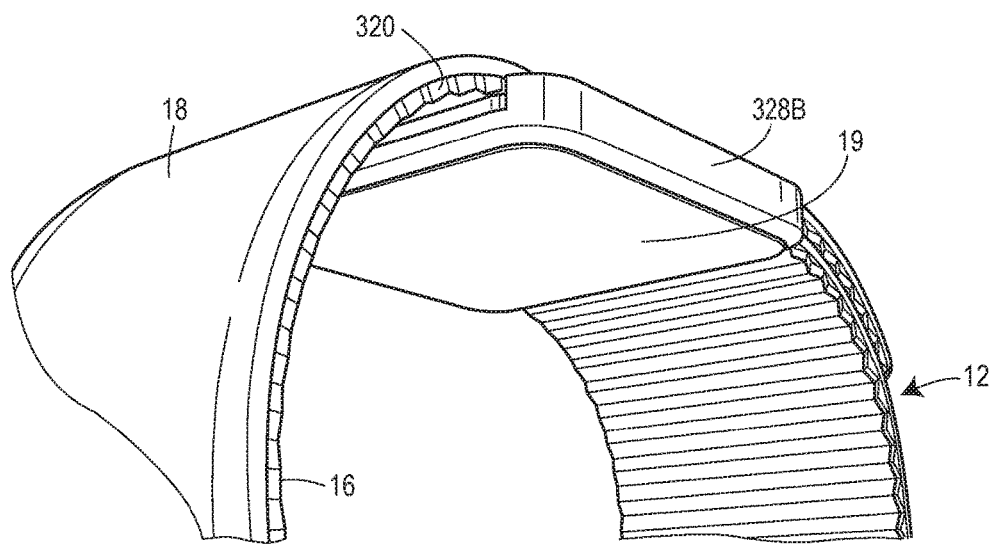

More particularly, as depicted in FIG. 13, which illustrates a side view of the flexible attachable article 10, and FIG. 14, which illustrates a bottom view of the article 10, the grooves 320 (or notches) may be formed in a side of a portion of the band 12 that extends below the flexible electronic display 18. The grooves or notches 320 illustrated herein may also be formed in the transverse edges of the bottom portion of the band 12 and may extend from one end of the band 12 to the other end of the band 12 or may extend along only a portion of the band 12 and need not extend from end to end. As illustrated in FIG. 14, there may be a gap or a space 333 between the outer or transverse edges of the grooves or notches 320 and the outer or transverse edges of the rest of the band 12 or the flexible electronic display 18. In other words, the outer edges of the grooves 320 may be positioned inwardly of the greatest transverse edges of the band 12 or the display 18. In other embodiments, this gap can be reduced or eliminated (i.e., the edges of the grooves 320 can be commensurate with the transverse edges of the band 12) or this gap can be increased. In further embodiments, the grooves 320 can extend outward of the transverse edges of the support 16, in which case the grooves 320 can engage and connect with a complementary structure disposed on an interior of the electronics module 19 or another portion of the band 12. In still a further embodiment, the grooves 320 can, alternatively or additionally, be formed in the bottom side of the band 12. As briefly noted above, in other embodiments, the grooves 320 can be formed in the bottom side along the entire length of the support 16 or along only a partial length of the support 16. For example, the grooves 320 may only be formed in the bottom side of the support 16 near or at the end portions of the band 12. As also illustrated in FIGS. 13-15, the grooves or notches 320 each have a generally triangular shape, but, in other examples, the grooves 320 can be differently shaped grooves or notches (e.g., they can be rectangular, semi-circular, etc.)

Figure 12:
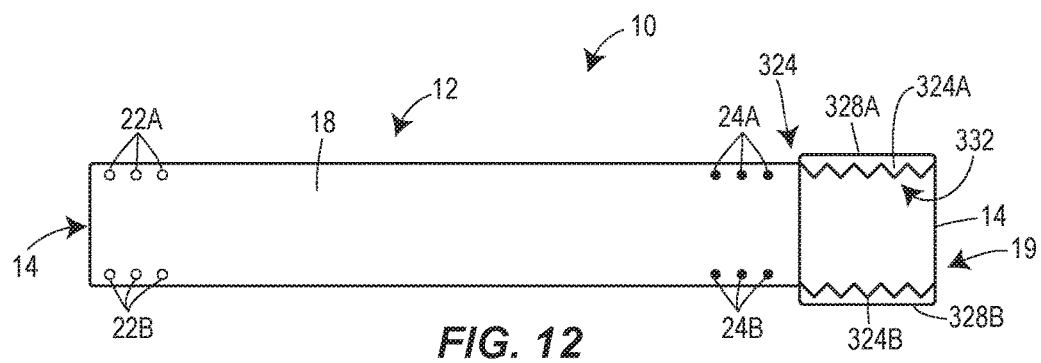
FIGS. 12-15 illustrate an example attachable article in the form of a wristband device having a flexible display and a different connection structure that includes magnets and interlocking grooves and that is configured to provide maximal continuous display surface to a user when wearing the band.

As illustrated in FIGS. 12 and 13, the electronics module 19 may include first and second opposing sidewalls 328A and 328B that border and extend above (at least with reference to FIG. 12) the band portion 12. A first set of inwardly facing projections 324A is formed or defined by the first sidewall 328A, while a second set of inwardly facing projections 324B is formed or defined by the second sidewall 328B. As illustrated in FIG. 12, the projections 324A and the projections 324B are aligned with and extend inward toward one another. When, however, the gap 333 between the edges of the grooves 320 and the edges of the band 12 is decreased, the projections 324A and 324B can be modified so as not to extend quite as far inwardly. On the other hand, when the gap 333 is increased, the projections 324A and 324B can be modified so as to extend further inwardly. In any event, the projections 324A and 324B are configured to accept or mate with the grooves or notches 320 when one end of the band 12 is disposed so that the lower portion of the band 12 including the grooves 320 is disposed in the space between the projections 324A and 324B. As such, the projections 324A and 324 are spaced apart a distance that is the same as or slightly larger than the distance between corresponding grooves 320 on either side of the band 12. In some cases, the distance between the projections 324A and 324B may be slightly smaller than the distance between the corresponding groove 320 on either side of the band 12, in which case the material forming the grooves 320 may be flexible or compressible.

When the flexible band 12 is bent to be disposed on or around an object (e.g., a wrist, an arm, etc.), such that one of the ends 14 is disposed on or near an upper side of the other one of the ends 14, a portion of the device 10 (e.g., one of the ends 14) can be disposed or seated in a receiving area 332 (FIG. 12) defined by the bottom of the electronics module 19 at the other end 14, the receiving area 332 including the projections 324, and the sidewalls 328A and 328B. In this manner, as illustrated in FIG. 15, one or more of the grooves 320 will be disposed or seated in the receiving area 332 between one or more of the projections 324A and 324B, such that one or more of the projections 324A and 324B, which extend inwardly, engage and serve to mate with and retain respective ends of the grooves 320. As such, a mechanical connection may be formed between one or more of the grooves 320 and one or more respective projections 324A and 324B. At the same time, the magnets 22A, 22B, 24A, and 24B, if present, by virtue of being in proximity to one another, create or provide a magnetic force that also serves to help hold the ends 14 together. So configured, the end pieces 14 are mechanically and magnetically connectable in various different positions with respect to one another, such as that illustrated in FIG. 15, when the device 10 is bent or curved to be placed around a wrist, a leg, a bicycle handle bar, etc., for example. As a result, the attachable device 10 may be easily adjustable in size to fit various differently-sized mounting members or wrists while still providing for a strong connectivity between the ends 14 of the band 12. As one of ordinary skill in the art will appreciate, the grooves 320 disposed or seated in the receiving area 332 can be repositioned, relative to the projections 324A and 324B, to adjust the attachable device 10 to fit a differently sized mounting members (e.g., different sized wrists). It will be understood that, while the band construction and clasping concepts discussed with respect to FIGS. 1-15 are provided in the context of specific examples, any of these concepts or techniques can be applied to any of the other embodiments described herein in any combination.

Importantly, it is desirable to maximize the amount of the electronic display 18 that is continuously viewable to a user when, for example, the user has the band device 10 mounted on the user's wrist. To do so, the device 10 may be configured to cause the connection between and/or the overlap of the ends 14 of the band 12 to fall in a region that is near or adjacent to the outer side or edge of the user's wrist (i.e., the edge of the user's wrist that is on the side of the hand at which the pinky finger is located). Generally speaking, when the band 12 is disposed around a user's wrist, the flexible electronics display 18 forms a continuous display around the wrist from one end to the other end (when the ends 14 of the band 12 attach end-to-end) or from one end to a position at which one side of the band begins to overlap the other side of band (when the ends 14 of the band 12 overlap). It is desirable to place the discontinuity in the flexible electronics display 18 at the outer side of the user's wrist so that the flexible electronic display 18 is continuous through the portions of the band disposed near the top of the wrist, the inner side of the wrist and the bottom of the wrist (i.e., so that the discontinuity of the electronic display 18 caused by the connection of the ends of the band or the overlap of the ends of band falls at a position adjacent to the outer wrist of the user). When configured in this manner, the user may view a continuous display, i.e., one without a discontinuity caused by the ends of the band, as the user looks at the band at the top of his or her wrist (i.e., when the user's palm is facing downwardly), and as the user turns his or her wrist over to cause the user's palm to face upwardly. During this motion, the user views the display adjacent the top of the user's wrist, the display adjacent the inside of the user's wrist (on the index finger side of the hand), and the display adjacent the bottom of the user's wrist (on the same side of the wrist as the user's palm). As this is a natural range of motion of the user's wrist, it is desirable to provide a continuous display to the user during this motion.

To provide this maximal continuous usable display to the user, the device 10 may be configured to have a fixed position of the band that is to be placed adjacent to a fixed position of a user's wrist, such as on the top of the user's wrist. In this case, the ends of the band are sized or spaced from this fixed position to overlap or connect at a position that will end up being adjacent to the user's outer wrist when the band is disposed on or wrapped around the user's wrist. The outer wrist or outside of the wrist, in this case, may be defined by any position that is substantially within a particular quarter of the circumference of a circle, oval, or ellipse defined around a user's wrist, with the particular quarter being centered at the middle of the outer side of the user's wrist.

FIGS. 16-20 illustrate one or more embodiments of the band device 10 which provide for a maximal continuous usable display surface by assuring that the discontinuity in the electronic display falls at a position adjacent to the user's outer wrist. In particular, the device 10 illustrated in FIGS. 16A-16C includes a band 12 extending between two end pieces 14A and 14B which may be metal, plastic or other material that provides a pleasing look. An electronics module 19 having an exterior casing or cover is disposed on the band 12 at a position between the two end pieces 14A and 14B, but is not centered between the two end pieces 14A and 14B. In particular, the electronics module 19 is disposed closer to one end piece 14B than the other end piece 14A. FIG. 16C illustrates a top view of the device 10 showing a continuous flexible electronic display 18 extending between the two end pieces 14a and 14B. In this configuration, the end pieces 14A and 14B form at least a portion of a clasp or clasping mechanism that is similar in nature to that described with respect to FIGS. 12-15. As such, and as illustrated in FIG. 16A (depicting a bottom view of the device 10), notches or grooves 320 are formed into the transverse edges of a lower portion of the band 12 and these notches or grooves 320 are received in a mating structure 332 formed in one of the end pieces 14B (as illustrated in FIG. 16C).

Figure 17A:
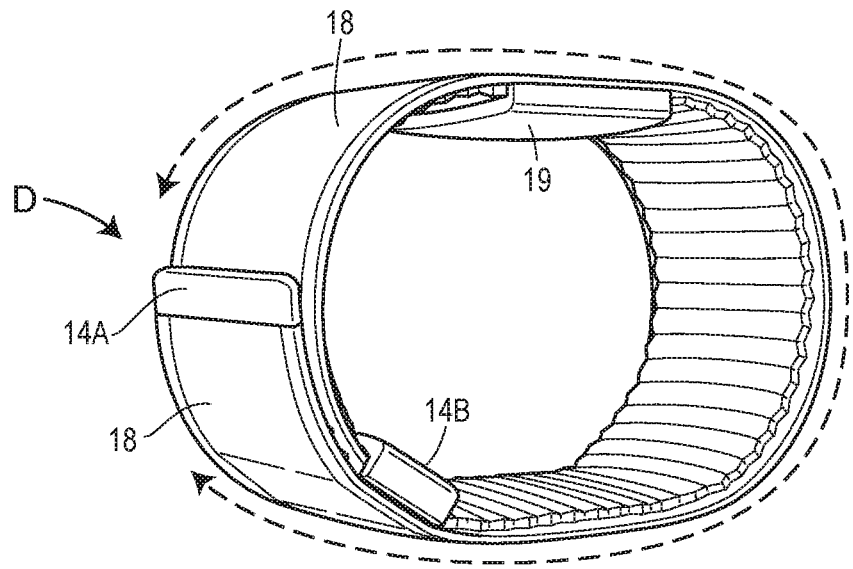
FIG. 17A illustrates the band of FIG. 16 when the ends thereof are connected together to form a maximal continuous display surface for a user.
Figure 17B:
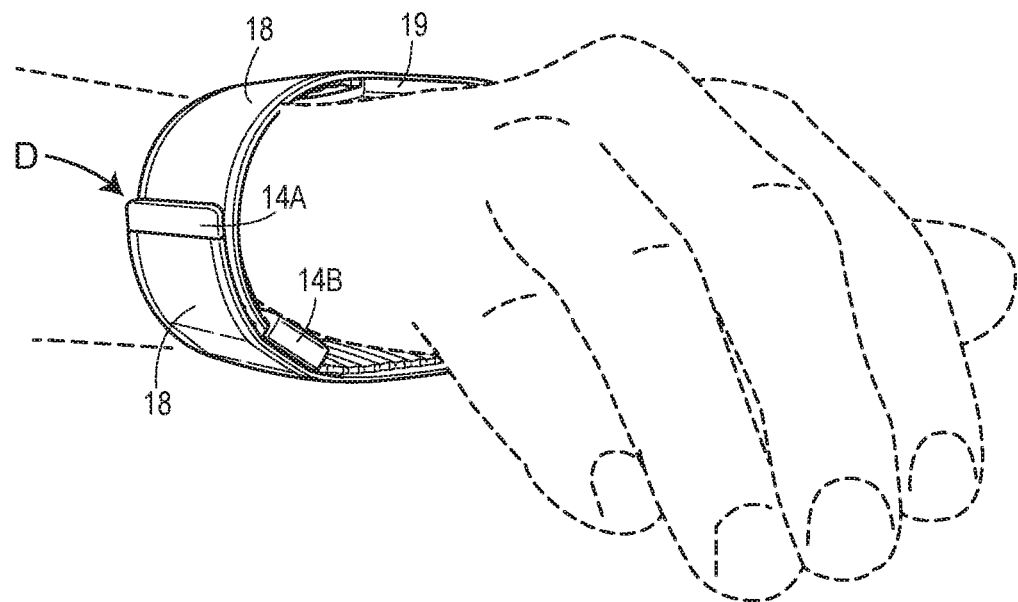
FIG. 17B illustrates the band of FIG. 17A when connected around a user's wrist.

In this case, the electronics module 19 (or the cover associated with that module) acts as a reference mark or reference location that is to be placed at a particular position on a user's wrist, in this case, on the top of a user's wrist. When so placed, the sections of the band 12 extending out from the module 19 are sized to overlap at a position adjacent to the outer side of the wrist of the user. FIGS. 17A and 17B illustrate the band device 10 of FIGS. 16A-16C flexed to overlap, with the connection structure on the end 14B being used to hold or attach the ends together. Here, as illustrated by a user's wrist in dotted relief in FIG. 14B, the ends of the band 12 overlap or come together on the outer side of the user's wrist. As such, the flexible electronic display 18 forms a continuous display from the top of the wrist, through the inner side of the wrist to the bottom of the wrist as illustrated by the arrow in FIG. 14A. This continuous usable display enables a user to view a long continuous screen or multiple serial display screens disposed next to one another on the display 18 without there being any discontinuity in the display of these screens, as the user turns his or her wrist between a palm up and a palm down position or vice versa. While the illustration of FIGS. 17A and 17B depict the band device 10 on a right wrist of a user, the band device 10 could be similarly placed on the left wrist with the module 19 still adjacent to the top of the wrist and the ends of the band 12 overlapping on the outer side of the wrist.

Figure 17C:
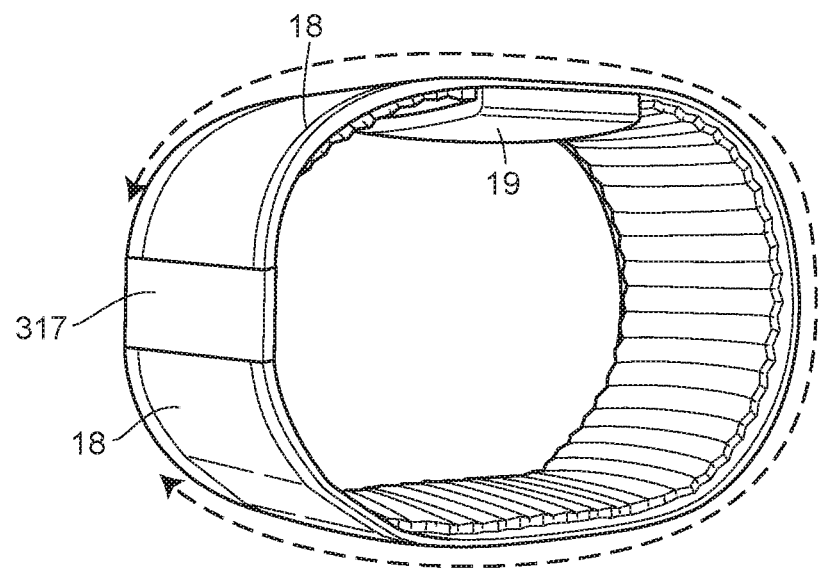
FIG. 17C illustrates a wristband device including one extender that increases a length of the device and connects the ends of the wristband device together in an end-to-end manner so as to provide maximal continuous display surface to a user when wearing the band.
Figure 17D:
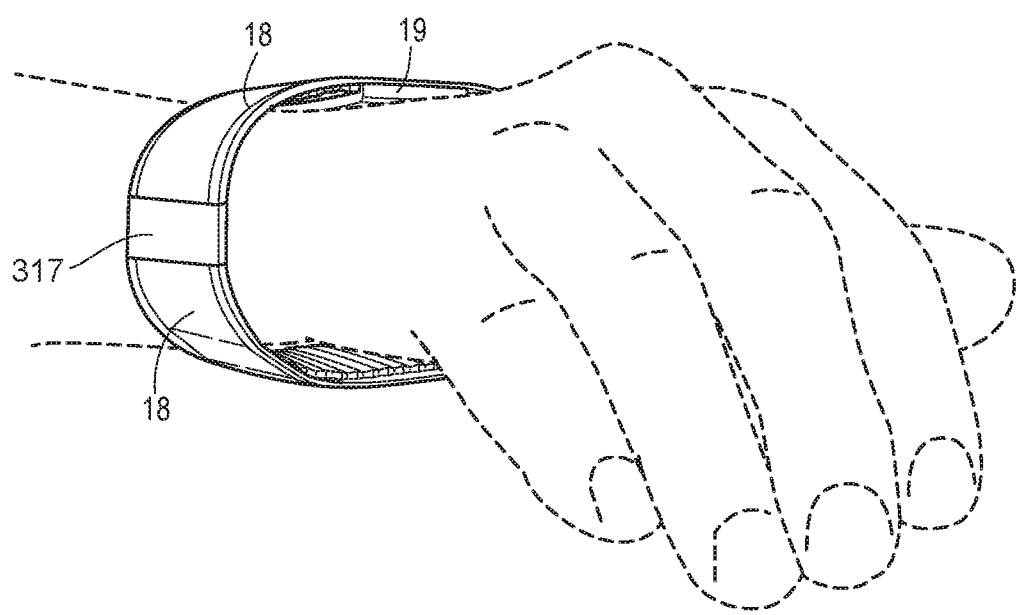
FIG. 17D illustrates the band of FIG. 17C when connected around a user's wrist.

Similarly, in another configuration, FIGS. 17C and 17D illustrate the band device 10 having an end-to-end clasping configuration in which zero, one or more extenders 317 may be disposed and connected together between the ends of the band to form an end-to-end connected band configuration. The example embodiments of FIGS. 17C and 17D illustrate one extender 317 removably coupled to the ends 14A and 14B of the band 12 and configured to connect the ends 14A, 14B of the band 12 together in an end-to-end manner, thereby eliminating the overlap of the ends of band present in FIGS. 17A and 17B. Here, as illustrated by a user's wrist in dotted relief in FIG. 17D, the position of the extender 317 corresponds (e.g., is adjacent) to the outer side of the user's wrist. As such, the flexible electronic display 18 forms a continuous display from the top of the wrist, through the inner side of the wrist to the bottom of the wrist as illustrated by the arrow in FIG. 17C. This continuous usable display enables a user to view a long continuous screen or multiple serial display screens disposed next to one another on the display 18 without any discontinuity in the display of these screens, as the user turns his or her wrist between a palm up and a palm down position or vice versa. While the configuration of FIGS. 17C and 17D depict the band device 10 on a right wrist of a user, the band device 10 could be similarly placed on the left wrist with the module 19 still adjacent to the top of the wrist and the ends of the band 12 connected via one or more extenders 317 on the outer side of the wrist. Moreover, while the configuration of FIGS. 17C and 17D illustrate the use of one extender 317, zero, two or more extenders of the same or different sizes can be connected together or disposed serially at the ends 14A and 14B of the band 12 to form bands lengths of different sizes. The extenders 317 may be mechanically connected to the ends 14A and 14B of the band via the use of one or more of magnets at the ends of the band and/or on the extenders (such as the magnets illustrated at the ends of the band in FIG. 1), interlocking tabs and slots on the band and the extenders (such as the interlocking tabs and slots illustrated on the ends of the band in FIGS. 11A and 11B), both magnets and tabs and slots, or using any other clasping structure.

Figure 18:
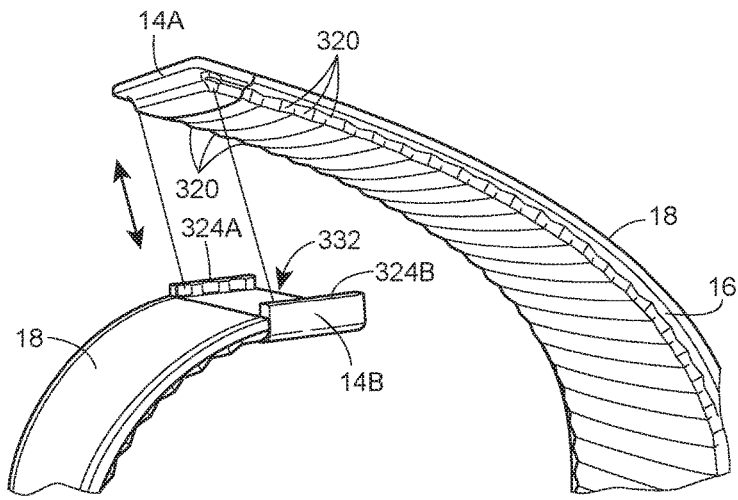
FIG. 18 illustrates in more detail the manner in which the clasp structure of the band of FIG. 16 operates.

FIG. 18 illustrates in more detail the manner in which the end pieces 14A and 14B operate to enable the opposite ends of side of the band 12 to be coupled together. In particular, as illustrated in FIG. 18, the lower end clasp 14B includes a receiving area 332 and notches or grooves 324A and 324B (as described with respect to FIG. 12) to accept a portion of the band 12 from the other end 14A of the band 12 therein. Here, the notice 320 in the band 12 or in the end piece 14A may interact with or fit into the notches 324A and 324B of the end piece 14B to provide a frictional force that holds the ends of the band 12 from moving laterally with respect to one another. Of course, the size or inner circumference of the device 10 can be adjusted by using different ones of the notches 320 on the band near the end 14A. Additionally, as described in earlier embodiments, magnets (not shown in FIGS. 16-18) may be disposed in the end pieces 14A and/or 14B and/or in the ends of the band 12 adjacent to the end pieces 14A and/or 14B to enable or provide a magnetic connection between the ends of the band 12 when the opposite ends 14A and 14B of the band 12 are disposed in an overlapping manner. The magnets may provide an attractive force between the ends of the band 12 to help prevent the ends of the band 12 from moving away from one another in the direction of the arrow in FIG. 18.

Figures 19A, 19B, 19C:
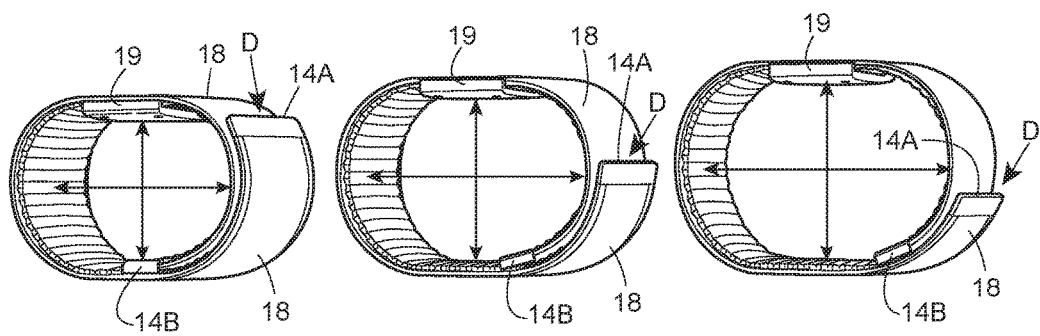
FIGS. 19A-19C depict the band of FIG. 16 adjusted to fit various different sized wrists to illustrate the positioning of the band overlap with respect to a user's wrist while providing maximal continuous useable display surface area to the user.

FIGS. 19A-19C illustrate the device 10 of FIGS. 16-18 disposed in three different overlapping band positions to illustrate that this device 10 can take on or be adjusted to various different sizes while still providing a flexible electronic display 18 with maximal continuous usable surface area. In this case, the band 12 is approximately 246 mm long, when laid out flat. As will be noted, by coupling the ends 14A and 14B of the band 12 together at different locations, the band device 10 can take on different sizes which may accommodate different sized wrists. For example, in each of the configurations of FIGS. 19A-19C, the inner side of the band device 10 generally forms an oval with different dimensions. In this example case, the smaller band device configuration of FIG. 19A includes a smaller dimension of 35.5 mm (measured from the electronics module 19 across to the band 12) and a larger dimension of 62 mm (from one inner side of the band device 10 to the other inner side of the band device 10). In similar manners, the medium sized band device configuration of FIG. 19B includes a smaller dimension of 41.5 mm and a larger dimension of 69 mm while the large sized band device configuration of FIG. 19C includes a smaller dimension of 45 mm and a larger dimension of 73 mm. In each of these cases, the discontinuity D in the band device 10 (illustrated as the point at which the end 14A of the band begins to overlap the portion of the band below it) is disposed adjacent to the side of the user's wrist and, in particular, the outer side of the user's wrist (as shown in FIG. 17B). Moreover, as can be seen, the band 12 could be adjusted further to be smaller or larger in size and, in most cases the discontinuity D in the band will lie adjacent to the outer side of the wrist.

Figures 19D, 19E, 19F:
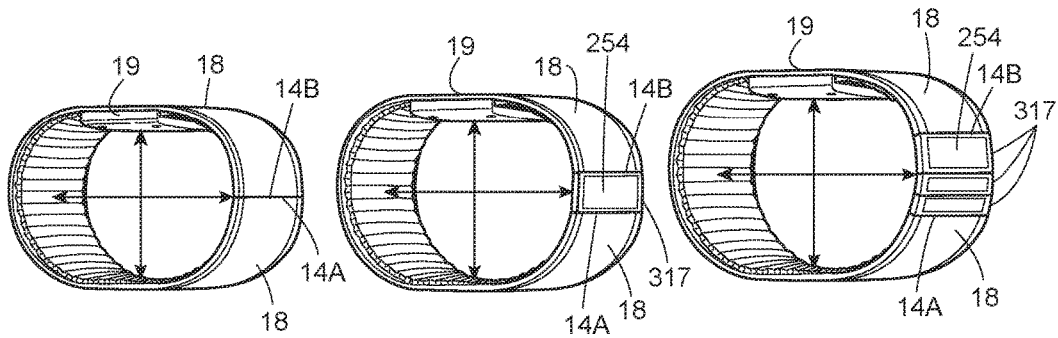
FIGS. 19D-19F illustrate a wristband device connected in an end-to-end manner using zero, one or more extenders to cause the band to fit various different sized wrists while providing a maximal continuous useable display surface area to the user.

FIGS. 19D-19F illustrate the band configuration of FIGS. 17C and 17D having an end-to-end clasping configuration, adjusted to different sizes using zero, one or more extenders 317 to provide different lengths of the device 10, and in turn to enable the size of the device 10 to be adjusted while still providing a flexible electronic display 18 with maximal continuous usable surface area. The device 10 illustrated in FIG. 19D does not include any extenders 317, such that the device 10 has its standard or normal length. The device illustrated in FIG. 19E includes one extender 317, which serves to increase the length of the device 10 and, in turn, creates a more-oval or flatter shaped device 10 than the device 10 in FIG. 19D when in the folded position. The device illustrated in FIG. 19F includes three extenders 317, having various different sizes. The two additional smaller extenders serve to further increase the length of the device 10, thereby creating an even more-oval or flatter shaped device 10 than the device 10 in FIG. 19E when in the folded position. In FIGS. 19E and 19F, the position of the extender(s) 317 substantially corresponds (e.g., is adjacent) to the side of the user's wrist and, in particular, the outer side of the user's wrist. As such, the flexible display 18 continues to provide a continuous display from the top of the wrist, through the inner side of the wrist to the bottom of the wrist, while at the same time the device 10 can be adjusted to be smaller or larger in size.

Figure 20:
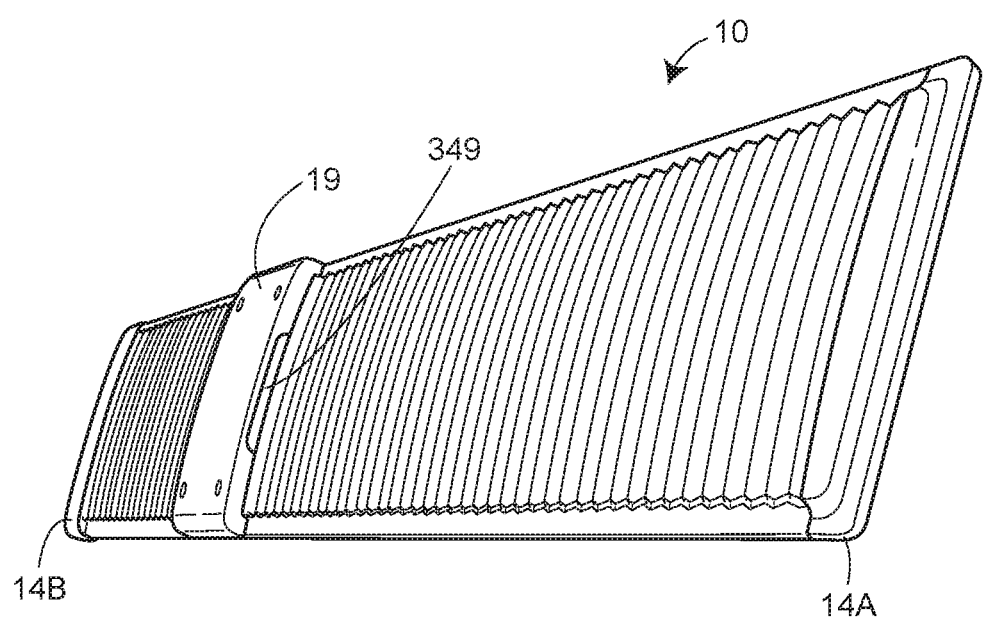
FIG. 20 is a perspective view of the band of FIG. 16 laid out in a flat configuration.

For the sake of completeness, FIG. 20 illustrates the back of the device 10 of FIGS. 16-19C when the band 12 of the device 10 is laid out flat or straight. As can be easily seen in FIG. 20, the electronics module 19 sticks up (or down) from the surface of the band 12 and thus provides a tactile sensation to the user when the user wears the band. This feature, in turn, makes using the module 19 as the reference point for the user when placing the band on the user's wrist more natural, as the user can feel the presence of the module 19 in the correct location on the top (or bottom) of his or her wrist, and thus will know that the band is properly aligned on the wrist to provide for a maximal continuous usable display surface in the manner described above. Still further, as illustrated in FIG. 20, the electronics module 19 may have a single or multiple contact points 349 that may be used to charge a battery (not shown) disposed within the electronics module 19, or to provide other communications between the electronics module 19 and another device such as a base station or a base unit.

Figure 21:
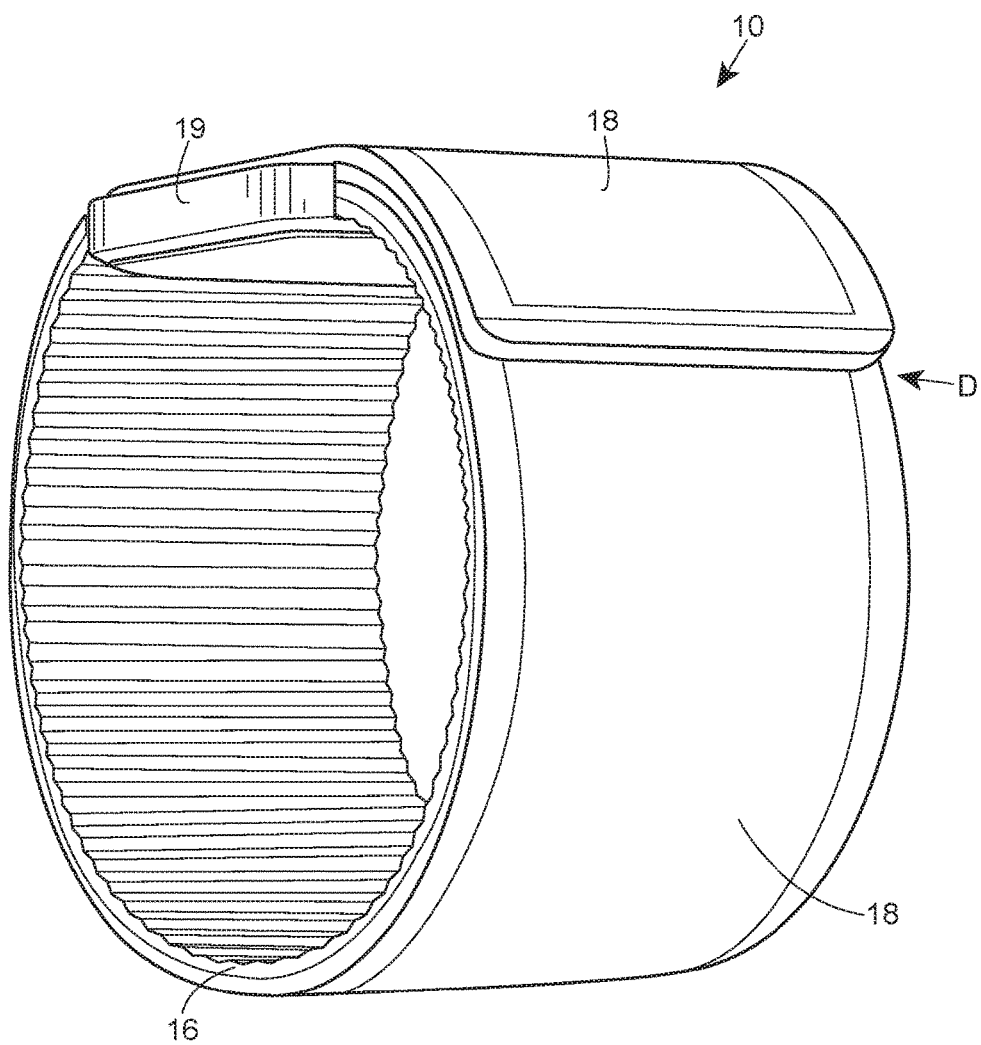
FIG. 21 depicts a further configuration of a band similar to that of FIG. 15, having an electronics module disposed on one end and that is configured to provide maximal continuous display surface to a user when wearing the band.

FIG. 21 illustrates the embodiment of FIGS. 12-15 in more detail to illustrate another example of a band device 10 configured to have a maximal continuous usable display surface by having the clasping or overlapping portions of the band 12 disposed adjacent a side of a user's wrist, such as the outer side of the user's wrist. In this case, the electronics module 19 is disposed on one end of the band 12, but still operates as a reference member or point that is to be located as a particular position on the user's wrist, such as on the top or the bottom of the user's wrist. As illustrated in FIG. 21, when so located, the ends of the band 12 overlap to create a discontinuity D on the side of the device 10 that is adjacent to the outer (or inner) side of the user's wrist. Moreover, further adjustment of the band 12 in the embodiment of FIG. 21 to make the band 12 configured to be smaller will still place the overlapping ends of the band 12 and thus the discontinuity D of the band device 10 on a side of the user's wrist.

Figure 22:
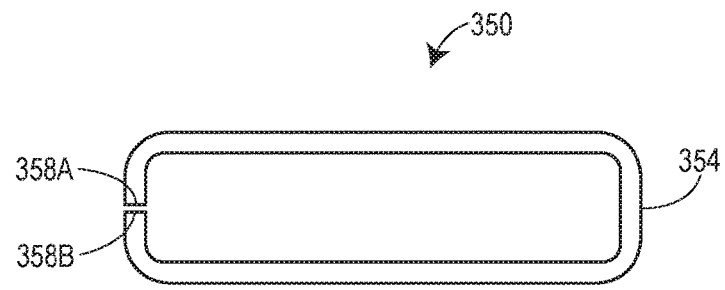
FIGS. 22 and 23 illustrate a further example of an attachable article in the form of a wristband having a flexible display and a connection or clasp that includes magnets and a clasp loop while being configured to provide a maximal continuous display surface to a user when wearing the band.
Figure 23:
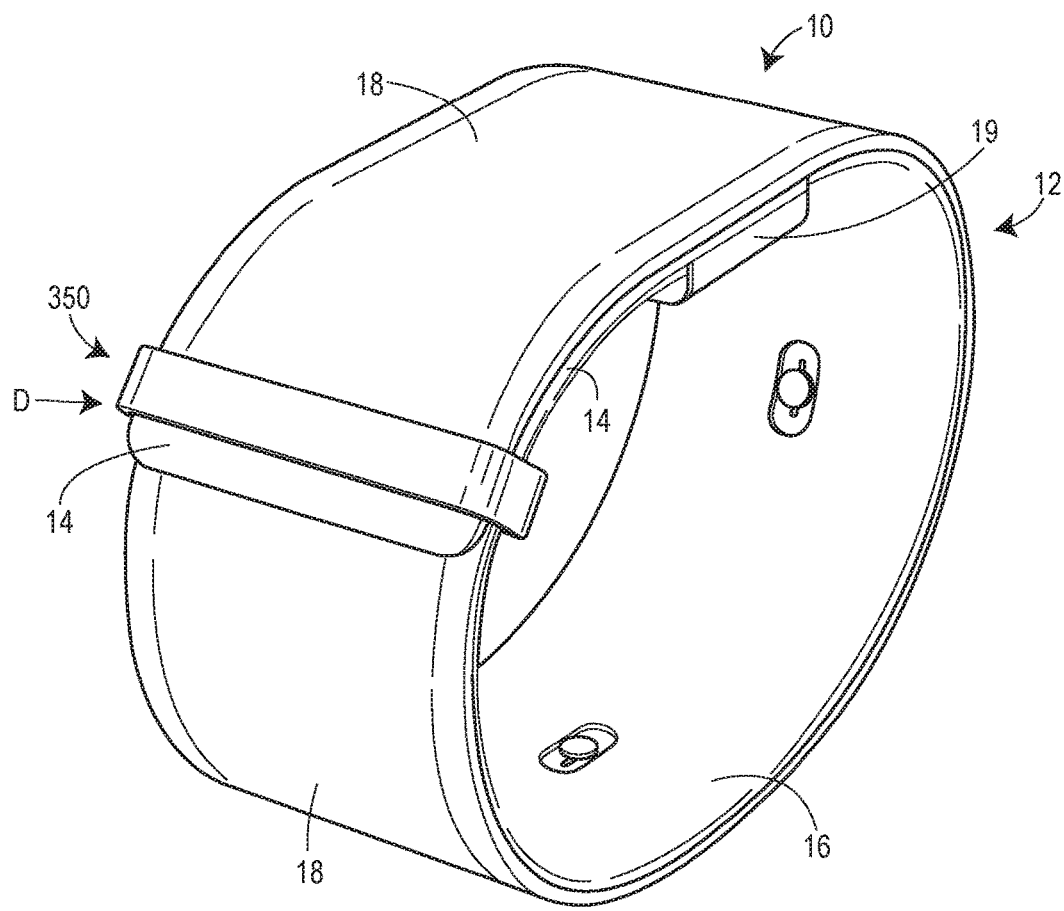

In another embodiment illustrated in FIGS. 22 and 23, the flexible attachable article 10 is similar to the article 10 described above in connection with FIGS. 12-15. In this embodiment, however, the article 10 includes a mechanical connector 350 instead of the mechanical connectors 320 and 324 described above in connection with FIGS. 12-15. As illustrated in FIG. 22, the mechanical connector 350 is or takes the form of a clasping structure. The clasp 350 has a flexible body 354 that has an oval-shaped cross-section and two opposing end portions 358A and 358B spaced apart from but closely adjacent to one another.

When the flexible band 12 of the device 10 is bent to be disposed on or around an object (e.g., a wrist), and after portions of the device 10 are magnetically connected to one another (e.g., via the magnets 22A, 22B, 24A, and 24B not shown), the clasp 350 can be installed on the device 10 to mechanically connect two overlapping portions of the device 10, as illustrated in FIG. 23. Specifically, the flexible body 354 of the clasp 350 can be manipulated such that the clasp 350 can be slid or positioned over the two overlapping portions of the article 10. For example, the opposing end portions 358 of the clasp 350 can be pulled apart from one another, after which the clasp 350 can be slid or positioned over the two overlapping portions of the band 12. The clasp 350 can, in some cases, be positioned over one or both overlapping ends 14 (e.g., proximate to the magnets 22A, 22B, 24A, 24B), while, in other cases, the clasp 350 can be positioned over other overlapping portions of the band 12. In any event, because the body 354 is flexible, the body 354 can be restored to its original shape after being manipulated and positioned over the two overlapping portions of the device 10. The clasp 350 can be retained in the installed position by virtue of the shape of the body 354 and the thickness of the overlapping portions of the device 10.

Of course, the clasp 350 can be constructed differently and yet still perform the intended function. In other embodiments, the clasp 350 can have a differently-shaped body 354. The body 354 can, for example, have more of a circular shape, more of a rectangular shape, or have some sort of other suitable shape. In other embodiments, the body 354 can be formed of two or more discrete sections that can be removably coupled to one another to facilitate the installation or removal of the clasp 350. These sections could, for example, be snapped or hooked to one another. Depending on the construction of the clasp 350, the clasp 350 can, in other embodiments, also be installed differently and yet still perform the intended function. When, for example, the body 354 is formed of two or more sections that can be removably coupled to one another (such as by being hinged), one or more of the sections could be removed from the other section(s) to allow the clasp 350 to be installed on the device 10. Once the clasp 350 is positioned properly, the sections could be again coupled together to install the clasp 350 thereon. In still another embodiment, the clasp 350 could be rigid or semi-rigid and form a member that encircles (partially or completely) one portion of the band 12 and that slides over the other end portion of the band 12 when the band 12 is folded over on itself as illustrated in FIG. 23.

However, as further illustrated in FIG. 23, the device 10 is configured to provide maximal continuous usable display surface to a user wearing the device 10 as the discontinuity D in the display 18 occurs at the side of the device (i.e., adjacent a side, such as the outer side, of a user's wrist when worn on the wrist). Here again, the electronics module 19 may act as the reference point that is disposed adjacent a particular part of the user's wrist, such as the top of the wrist, so that the discontinuity D in the electronic display 18 which now occurs at or near the clasp 350 is disposed at a point adjacent to the side of the user's wrist. In this embodiment, as in the embodiment illustrated in FIGS. 12-15, the electronics module 19 is the reference point and is also disposed at one end of the band 12.

In another embodiment illustrated in FIGS. 24-27, the flexible attachable article 10, again illustrated in the form of a wristband, includes a similar band portion 12 and ends 14A and 14B. However, in this embodiment, the article 10 has a connection structure that includes the magnets 22A, 22B, 24A, and 24B described above, but also includes a buckle clasp 380 that can effectuate a mechanical connection between the ends 14A and 14B, such that the ends 14A and 14B can be mechanically and magnetically connected to one another when the device 10 is bent, as illustrated in FIG. 27, to form a circular or oval band with the display 18 on the outside of the band 12 while also providing maximal continuous usable display surface to a user. As illustrated in FIG. 24, the buckle clasp 380 is connected to the end 14A (although it can be connected to the end 14B in other embodiments) and has a frame 384. The frame 384 includes a first frame portion 386A, a second frame portion 386B, and a pair of sides 388 that each connect the first frame portion 386A and the second frame portion 386B. The buckle clasp 380 further includes an opening 390 defined between the first and second frame portions 386A, 386B. As depicted in FIG. 25 (which illustrates a partial side view of the band 12), the article 10 in this embodiment includes a plurality of grooves or notches 392 defined in the end of each of the opposing sides 394 of the article 10 which may cooperate with similar grooved structure on the inside surfaces of the sides 388 of the frame 384.

When the flexible band 12 is bent to be disposed on or around an object (e.g., a wrist), the end 14B can be inserted or fed through the opening 390 in the buckle clasp 380, as shown in FIGS. 26 and 27, and manipulated (e.g., pushed, pulled, etc.) to the desired position (which is based on the desired size of the article 10 and the size of the wrist, for example). In turn, the buckle clasp 380 and the magnets 22A, 22B, 24A, and 24B serve to connect the ends 14A and 14B in the desired position while mechanical interactions between the frame portions 386A and 386B and the upper and lower sides of the band 12, as well as mechanical interactions between the sides 388 and the sides 394 of the band 12 limit movement of the band 12 in the lateral direction. Specifically, the first frame portion 386A applies a resistive force on a top or upper side of the device 10, which prevents movement of the ends 14A and 14B relative to one another. In addition, as depicted in FIG. 26, an interior portion of each of the sides 388 (which may be grooved or otherwise provided with a rough surface treatment) engages or contacts a respective plurality of corresponding grooves or notches 392, which also serves to prevent movement of the ends 14A and 14B relative to one another. At the same time, the magnets 22A, 22B, 24A, and 24B, by virtue of being in proximity to one another, create or provide a magnetic force that also serves to hold the ends 14A and 14B together. In this manner, the ends 14A and 14B can be both mechanically and magnetically connected to one another when the device 10 is disposed on or around the desired object, as shown in FIG. 27.

In the embodiment of FIG. 27, the electronics module 19 is illustrated as being on the bottom of the device 10 when the ends 14A and 14B are connected and, in this case, the electronics module 19 may be a reference point or reference element that is to be located near or adjacent the bottom of the user's wrist so as to provide the discontinuity in the electronics display 18 on the outer side of the user's wrist, as illustrated in FIG. 27.

Each of the embodiments of FIGS. 12-27 use the electronics module 19 or a portion thereof, such as the casing or cover of the electronics module 19, as a reference element which is to be placed at or adjacent to a particular point on a user's wrist, such as on the top or bottom of the user's wrist, so that the discontinuity in the electronic display 18 (e.g., where the ends of the band 12 meet or begin to overlap) is on one of the sides of the user's wrist, and preferably is on or adjacent to the outer side of the user's wrist. However, other things could be used as the reference element instead or as well. For example, the reference element could be any rigid element (e.g., other than the electronics module 19) such as a rigid bar or a point on the band 12 to be disposed at a particular location on the user's wrist. Alternatively, the reference element could be a printed, etched, or other non-rigid member or indication on the band 12 indicating the location of the band 12 that is to be placed on or adjacent to a particular point of the user's wrist, such as the top of the wrist or the bottom of the wrist or even one of the sides of the user's wrist. The reference element could additionally or alternatively be a weighted element that has, for example, more weight per unit volume than the other components of the band device 10. The reference element could be a surface treatment, such as a particular rough surface, a point, a line that is distinguishable by touch or sight (e.g., a ridge extending across the band 12 in the transverse direction), etc. The reference element could be disposed on the bottom of the band 12 so that it is viewable and/or able to be felt (e.g., by the wrist) from the underside of the band 12 or could be located on the top of the band 12, one or more of the sides of the band 12, or the edges of the band 12, or any combination thereof and be viewable or able to be felt by the user. If desired, the reference element could be displayed on the flexible electronic display 18 at a particular point on the display instead of being located on or printed on the band (in which case the reference element is still coupled to the band 12). Moreover, the reference element could stick out from the upper or lower surface of the band 12 to be able to be seen or felt better or could be an indentation or reduced surface or void disposed within the band 12. As examples, the reference element could be a harder point on the band 12 that can be felt by the user when, for example, placing the band 12 on a wrist, but could otherwise not be viewable or distinguishable by sight. To the contrary, the reference element could be visible by sight but not be distinguishable by touch. Moreover, the reference element may be located at a point or position on the band 12 that is to be adjacent to any part of the wrist, such as the top of the wrist, the bottom of the wrist, the inner side of the wrist or even the outer side of the wrist.

Moreover, while the embodiments having maximal continuous useable display surface features as described herein are generally described using an adjustable band with overlapping ends, the same principles could be used on a non-adjustable (in length) band having an end-to-end connection mechanism, such as that described with respect to FIGS. 1 and 2, and 11A and 11B. In this case, the end-to-end connection will be located at a position disposed adjacent to the outer (or possibly inner) side of the user's wrist.

In other embodiments, the connection structure can include any of the above-described mechanical connectors in combination with a different configuration of magnets. For example, the connection structure can include the clasp 350 in combination with the magnetic materials 20A and 20B described in connection with FIGS. 1 and 2. Moreover, in other embodiments, the connection structure can utilize one or more of the above-described mechanical connectors and/or other mechanical connectors in combination. For example, the connection structure could alternatively include the recess 300 and the tab 304 as well as the clasp 350. Such a connection structure would provide an even stronger and more durable connection between the end pieces 14 of the device 10. In further alternative embodiments, different mechanical connectors, other than those described above can be used. For example, the connection structure can include a recess formed on a top or bottom side of one of the clasps 14 and a cooperating tab that extends upward from one of the clasps 14 and can be inserted into the recess.

Figure 28A:
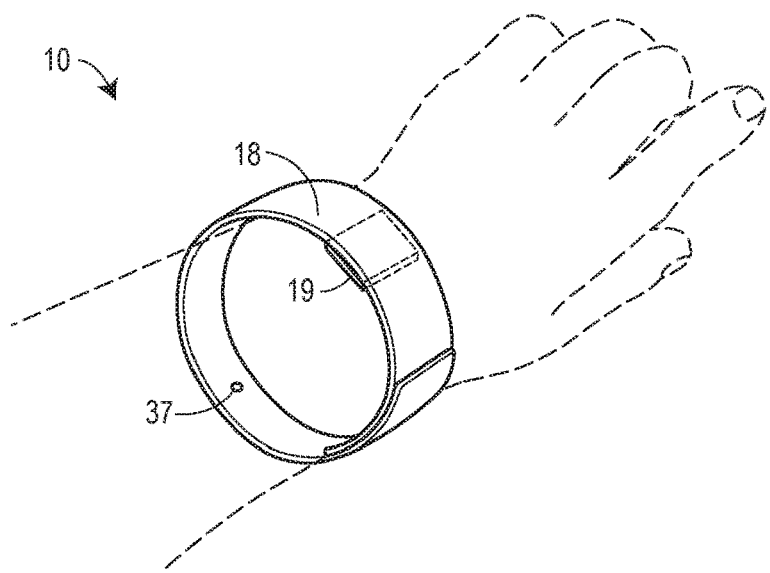
FIGS. 28A and 28B illustrate the manner in which an attachable article with an adjustable band causes the same portion of the band to be located or oriented near a different part of a user's wrist when the adjustable band is adjusted to fit different sized wrists.
Figure 28B:
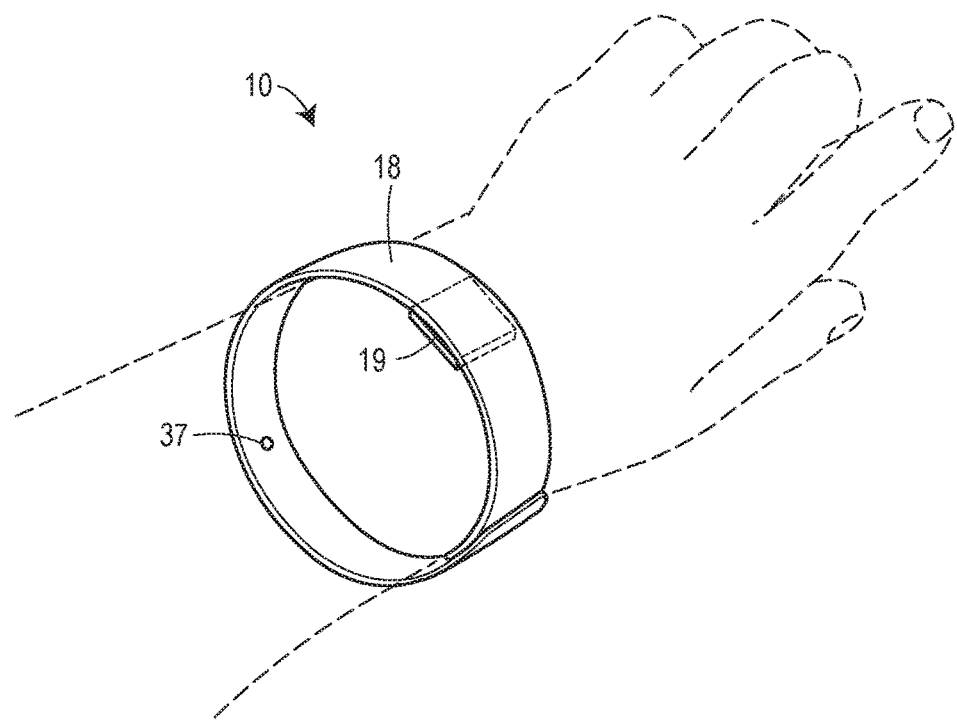

Moreover, a band calibration procedure may be used to detect the specific orientation of the band or sizing of the band as placed on a user's wrist to enable the electronics module 19 to place display screens of the device 10 at very specific locations, such as at the top of the band 18 (directly above the user's wrist), at the bottom of the band (directly beneath the user's wrist), on the side of the band, as worn by the user, etc. To illustrate the operation of this band orientation and calibration procedure, FIGS. 28A and 28B depict the same wristband device 10 (which may be any of those of FIGS. 10A-10C) disposed around different sized wrists, with the electronics module 19 disposed at the top of the users' wrists in both cases. However, as illustrated in FIG. 28A, the point 37 is disposed on the direct underside or bottom of the wrist, while in FIG. 28B, this same point 37 is disposed between the bottom of the wrist and the ulnar side of the wrist, due to the difference in the positioning of the band on the different sized wrists. Thus, if the electronics module 19 were to try to place or center a particular display screen on the flexible electronic display at the bottom of the wrist in both cases, the electronics module 19 would need to address the flexible electronic display 18 differently due to the different adjustment of the band support 16 on the different wrists. Of course, this same phenomenon exists for placing a display screen at any location with respect to a user's wrist other than the top of the wrist, assuming that the user always places the electronics module 19 at the top of the wrist when wearing the band. In any event, to correct for this phenomenon, the electronics module 19 must detect the orientation of the band (e.g., the support 16 or the display 18), such as by detecting the part of the band that is disposed at a particular location with respect to the wrist, such as the bottom of the wrist, for each different user. Moreover, if a user does not always place a particular part of the band, such as the electronics module 19, at a particular location on the wrist, such as at the top of the wrist, when wearing the band, then the electronics module 19 must detect the orientation of the band with respect to two or more locations on the user's wrist such as at the top and the bottom of the wrist, and calibrate the display with respect to these two or more points, in order to be able to center or place different display screens at particular locations on the band with respect to the user's wrist.

Figure 29:
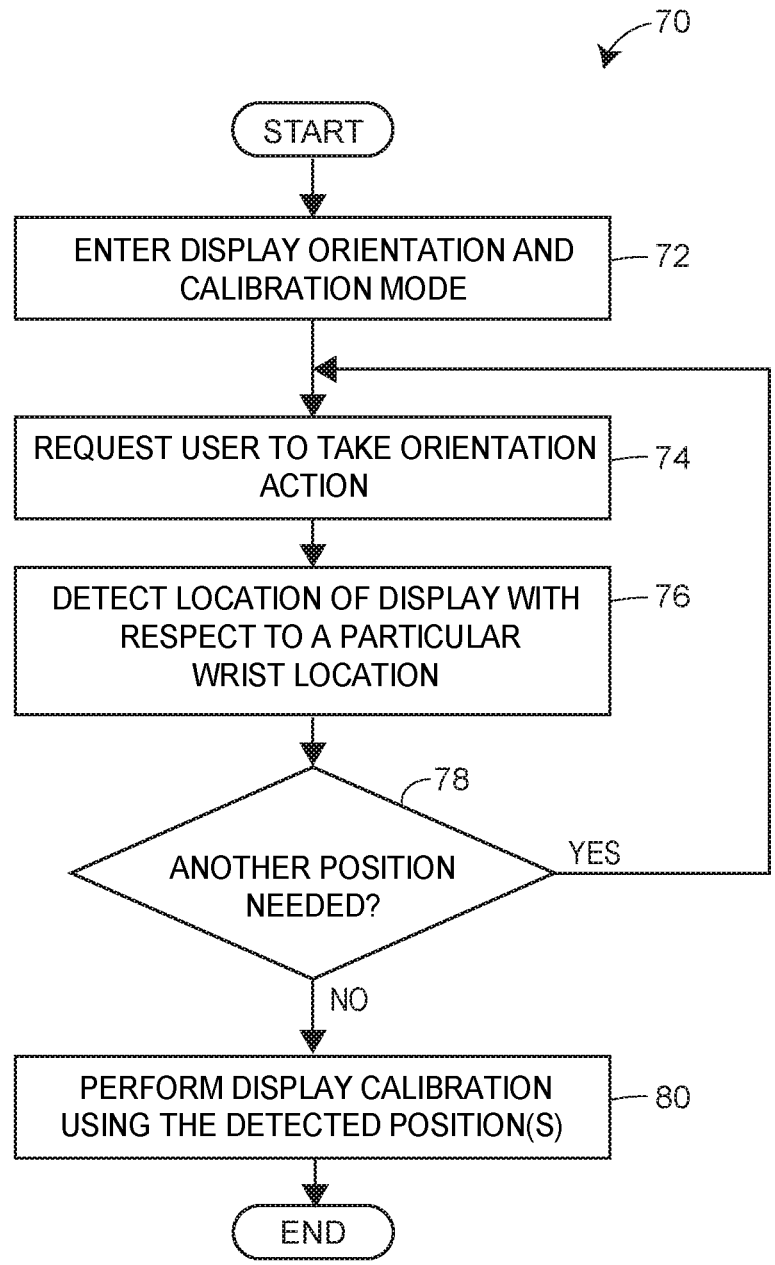
FIG. 29 depicts a flow chart of a band orientation detection and calibration routine that can be used with an adjustable band to selectively provide display screens at specific locations on the band with respect to a wearer's body.

FIG. 29 illustrates a flow chart 70 that may be implemented by a band orientation detection and calibration routine which may be stored in a memory of and executed on a processor of the electronics module 19 to perform band orientation and display calibration, thus enabling the electronics module 19 to be able to place or center particular display screens at particular locations on a band with respect to a user's wrist, such as at the top (posterior side) of the wrist, the bottom (anterior side) of the wrist, the inner (radial) side of the wrist, the outer (ulnar) side of the wrist, etc. The routine is especially useful when the band is an adjustable band that can be adjusted to various different sizes to fit different user's wrists, for example. Moreover, this routine can be useful when the module 19 is programmed or configured to provide public screens (such as those that display the time, date, images, etc. in more publically visible locations on the band, such as on the top of the band and on the outer side of the band, when the band is on a user's wrist), and is programmed or configured to provide or display more private display (such as e-mail displays, text message displays, incoming phone call user ID displays, etc., on the bottom of the wrist or on the inner side of the wrist). In particular, in all of these cases, the electronics module 19 needs to know the position of the band or the display 18 on the band that is directly adjacent to such wrist locations to be able to center the public or private display screens at any of these locations.

At a block 72, the routine 70 receives or detects an input to enter a display orientation and calibration mode. The block 72 may execute in response to a user instructing the electronics module 19 to enter the orientation and calibration mode, such as with a user input of any type including via a touchscreen display, a remote signal, etc. In some cases, however, the block 72 may operate automatically when the band is first wrapped around a wrist so that portions of the ends of the band overlap. In this case, the electronics module 19 may detect the repositioning of the band using sensors (such as magnetic sensors) located in the band that detect magnet on one end or side of the band being in close proximity to other magnets on the opposite end or side of the band, using strain gauges that detect a particular curvature of the band over a particular length (such that the band is curved into a loop), etc.

Next, at a block 74, the routine 70 requests the user to take one or more preset or predetermined actions to enable the electronics module 19 to be able to detect the position of at least one portion of the band with respect to a known portion of a user's wrist. For example, the block 74 may ask the user to press the band or display 18 on the location of the display screen that is at the top of the wrist, the bottom of the wrist, one of the sides of the wrist, etc. In another example, the block 74 may ask the user to press at multiple locations simultaneously or in sequence, such as squeezing the band together at the top and the bottom of the wrist. In still another example, the block 74 may ask the user to place his or her wrist in a particular orientation, such as on a flat surface or level with the top of the wrist facing up and the bottom of the wrist facing down. In still another case, the routine 70 may merely ask the user or display a button to allow the user to start a band orientation determining procedure.

After waiting for the user to take the requested action or actions, a block 76 detects the location of the display oriented or disposed adjacent to a particular wrist location. In particular, the block 76 may use signals from the touchscreen display 26 of FIG. 10A, from one or more of the pressure or magnetic sensors 34 of FIG. 10B or from the gyroscopic element 36 of FIG. 10C to detect the position at which the user touched or pressed the band in response to the instructions of the block 74, or the position of the band at the bottom or top of the wrist when the wrist is in a particular known orientation, such as level. In some cases, the block 76 may determine the amount of overlap of the two ends of the band to determine a position on the band as connected, that is directly opposite the electronics module 19.

More particularly, in the embodiment of FIG. 10A, if the user touched the touchscreen 26 at the bottom of the wrist, or at both the top and bottom of the wrist simultaneously in response to the instructions of the block 74, then the block 76 determines, from the touchscreen interface 26 associated with the embodiment of FIG. 10A which point or points were touched. In a similar manner, in the embodiment of FIG. 10B, if the user touched the band at the bottom of the wrist, or at both the top and bottom of the wrist simultaneously in response to the instructions of the block 74, then the block 76 determines, using the signals from the pressure sensors 34, where the user pressed the band. To do so, the block 76 may simply detect the highest pressure reading from the group of pressure sensors 34 and use that as the detected touch location. In another case, the block 76 may interpolate between two or more pressure signal locations to detect the location between those signals that appears to have the highest pressure reading. In still another case, the block 76 may, in response to a user input to start a calibration procedure, use magnetic sensors 34 disposed in the band to determine the amount of overlap of the ends of the band, and may determine the underside or bottom of the user's wrist as the location directly opposite (e.g., the same distance) from the electronics module 19 in both directions along the band as coupled. Of course, other parts of the wrist could be determined in this similar manner. In these cases, the user request to take an action from the block 74 may be simply providing the user with a calibration button that, when pressed or activated by the user, starts the calibration procedure that determines the amount of overlap of the ends of the band. In still another manner, in the embodiment of FIG. 10C, if the user placed his or her wrist in a predetermined orientation, than the block 76 may determine from the one or more gyroscopic elements 36 in the attachable article 10 which locations of the band are flat with respect to the force of gravity or otherwise detect the orientation of one or more portions of the band to determine which portions of the bank are at the top of the wrist, the bottom of the wrist, one of the sides of the wrist, etc. based on the gyroscopic element readings during a known orientation of the band. Of course, other methods of detecting user actions (such a touch events, shaking the arm in a specific manner, etc.) or detecting specific positions of the band with respect to a user's wrist could be used instead, and any suitable combination of the structure and routines described herein with respect to the bands of FIGS. 10A-10C could be used as well. In any or all of these scenarios, the blocks 74 and/or 76 may operate so that an orientation detection and calibration procedure will only be performed when the two ends of the band are detected as being overlapping or are disposed in an overlapping manner around an exterior object (such as by the use of one or more magnetic sensors).

After the block 76 determines the associated wrist position of one portion or location of the band, a block 78 may determine if identification of another band position is needed. For example, the band orientation detection procedure 70 may require that the user identify two locations of the band with respect to an exterior object, such as first identifying the top of the wrist, and then the bottom of the wrist. In another case, the routine 70 may perform the position detection at the same wrist location more than once in order to assure a better determination, such as by determining an average of two or more position detections, for example. In the case in which a known portion of the band (such as the electronics module 19) is not always placed at a known location with respect to a user's wrist (such as at the top of the wrist or at the bottom of the wrist), then the band position orientation and calibration routine 70 may need to make two or more position detection measurements in order to be able to determine which portion or position of the band is at which position of the user's wrist. Moreover, detecting more positions on the band (e.g., the position of the band at the top or posterior side of the wrist, at the bottom or anterior of the wrist, at the inner or radial side of the wrist, and at the outer or ulnar side of the wrist) will generally provide for a better calibration of the display 18 with respect to the wrist. In any event, if another reading is needed, control is provided from the block 78 back to the block 74 which again asks the user to take some detection initiation action with respect to the band. Thereafter, the blocks 76 and 78 repeat operations until all of desired or needed the band locations have been determined.

After all of the band positions or locations have been determined, a block 80 performs display calibration using the detected position(s). In particular, the block 80 may set the specifically detected or determined parts of the display as reference points for display screens to be provided on the display device, such as the various display screens of FIGS. 43A-43E. If desired, the electronics module 19 may then center display screens at or based on these detected positions, and may scale the sizes of the display screens based on the distances between the detected positions or based on the distance between a detected position and a fixed position on the band, such as the center or the electronics module, one or both ends of the band, etc. Furthermore, after the display calibration has been performed, various public display screens or information may be reliably placed at or centered at more publically visible positions of the band, such as at the top of the wrist or on the outer side of the wrist, while various private display screens or information may be reliably provided at or centered at less publically visible positions of the band, such as on the bottom of the wrist or on the inner side of the wrist, even though the band is adjustable in length. While the calibration routine has been generally described as calibrating the flexible electronic display to center display screens at the detected points on the band, the calibration routine could be configure to offset the center of display screens at other points on the flexible electronic display in reference to the detected point(s) on the band and need not center screens at the detected points.

Moreover, while the display orientation and calibration routine 70 has been described herein with respect to performing display location detection and calibration when the display is placed on a user's wrist, the same or similar routine could be used to perform display orientation detection and calibration when a band is looped around other body parts, such as legs, waists, arms, etc., as well as when the band is looped around other devices not being body parts.

Figure 30:
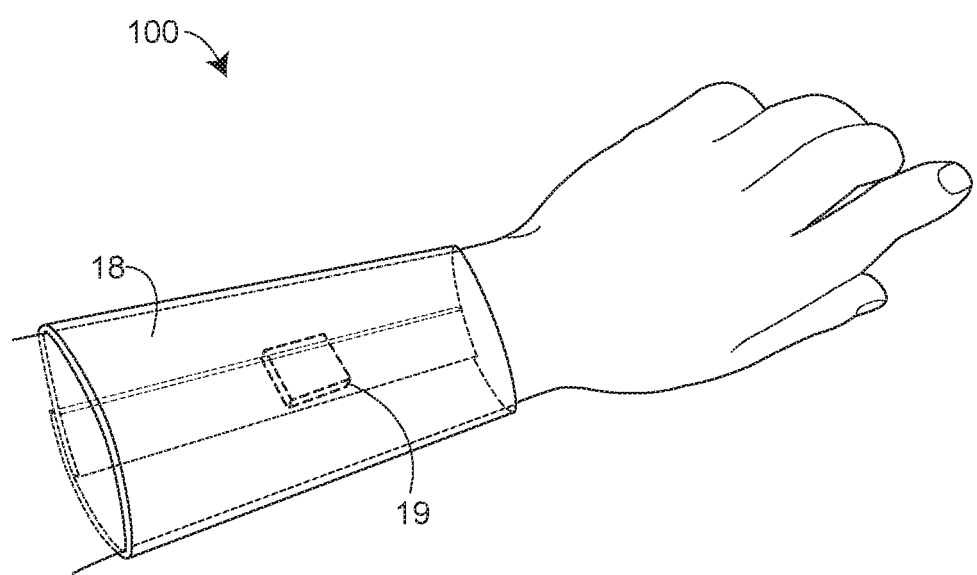
FIG. 30 depicts an arm band constructed according to the principles described herein.

Still further, while the functioning of a band and the routines performed on the band have been described with respect to a wrist band that is longer than it is wide, when laid flat, the same structure and techniques can be used for other types of bands, such as arm bands. FIG. 13, for example, illustrates an arm band 100 in which the display 18 wraps around a larger part of a user's arm, as opposed to just the wrist. In this case, the band 100 may be wider than it is long when laid flat. However, in this case, the display 18 and the electronics module 19 may be configured in any of the manners described above. For example, the same or a similar display orientation and calibration procedure as that described in conjunction with FIGS. 28 and 29 may be used in the armband of FIG. 30, but this procedure may also include detecting longitudinal points along the length of the arm as well as (or instead of) points around the arm.

FIG. 31 illustrates a block diagram of various electronic components, referred to herein as an electronics suite 38, that may be used in or disposed in the electronics module 19 of any of the attachable articles described herein to drive the flexible display 18 of the dynamically flexible, attachable article or device 10. In particular, the electronics suite 38 illustrated in FIG. 31 includes a battery 40 that powers a number of other modules or electronic components including a microprocessor or other processor 42, a computer readable memory 44, which may be, for example, a flash memory or other suitable type of non-transitory, tangible, data storage medium, a communication module 46, a display driver 48, a touch screen controller 50 and a number of sensors 52 and other secondary devices 53. The sensors 52 may include, for example, an impact sensor or step counter, one or more gyroscopic sensors or gyroscopes, temperature sensors, vibration sensors, pulse rate monitors, pressure sensors, strain gauges, etc. For example, the sensors 52 may include any number of any number of types of sensors, such as strain gauges, gyroscopes, accelerometers, compression sensors, tensional strain sensors, positional sensors, motion or movement sensors, pressure sensors, vibration sensors, temperature sensors, orientation sensors, gravity sensors, light sensors, and piezoelectric sensors, to name a few. The secondary electronic devices 53 may include, for example, an alarm or noise creation device, a speaker, a microphone, one or more vibrational elements or vibrators, the operation of each of which causes an area on which the element is disposed (e.g., the clasp 14, a particular location of the band 12, or the electronics module 19) to vibrate, etc. If desired, the vibrators or vibrational elements can be made using piezoelectric elements that contract and expand upon application of an electrical bias. These devices are already widely used in inkjet printers and new piezoelectrical polymers can be used to make these elements very thin but that can expand and contract by three percent upon receiving an electrical bias. Multiple ones of these elements may be disposed on the inside or outside or in an intermediate layer of the band to give the desired vibrational properties and can give a very noticeable user feedback in the form of a vibration or even an audible signal or a combination of both.

Still further, although FIG. 31 illustrates the sensors 52 and the secondary electronic devices 53 as being integral with the electronics suite 38, in some cases, one or more of the sensors 52 and/or the secondary electronic devices 53 are physically disposed at one or more other locations along the band 12 separate from the remainder of the electronics suite 38. In these cases, though, the separately disposed sensors 52 and/or secondary electronic devices 53 remain in communicative connection with the remainder of the electronics suite 38 (e.g., via a wired or wireless connection).

Similarly, although FIG. 31 illustrates the display driver 48 as being integral with the electronics suite 38, in some cases, the display driver 48 is physically disposed at another location separate from the remainder of the electronics suite 38. In an example, the display driver 48 is disposed in a location that is proximate to the electrodes or connectors of the pixel elements of the flexible electronic display 18, e.g., on the backplane of the flexible display 18 or at some other suitable location. The separately located display driver 48, though, remains in communicative connection with the remainder of the electronics suite 38 (e.g., via a wired or wireless connection).

As will be understood, the memory 44, the communication module 46, the display driver 48 and the touch screen controller 50, as well as the sensors 52 and other secondary electronic devices 53, are communicatively connected to the processor 42 and may operate to perform various functions in conjunction with applications or other programs implemented by the processor 42. Still further, each of these elements is connected to and is powered by the battery 40 in any known or desired manner. Still further, the electronics suite 38 of FIG. 14 may include one or more communication ports, such as communication port 54 (e.g., a USB or other type of digital communication port) and a power or battery charger input port 56. In this case, the power input port 56 may be connected to the battery 40 and enable charging or recharging of the battery 40 using any known or desired recharging circuitry and methodology. Alternatively or in addition, the communications input/output port or interface 54 (in the form of for example, a USB input port) may be connected to the battery 40 and provide power to the battery 40 for charging battery 40, and the input/output port or interface 54 may also be connected to the microprocessor 42, as well as to the communication circuit module 46, for performing wired- and/or wireless-based communications via the input port 54. Of course, the communication interface 54, while being illustrated as a USB-type connection, could any other type of known wired or physical communication connection, including any desired serial or parallel digital communication port using any number of pins or wires, as is known in the art, an analog communication port, etc. For example, the communication interface 54 may be a wireless input port for performing wireless communications.

In some configurations, the device 10 includes multiple communication interfaces or ports 54 of multiple different types.

In an embodiment, the power input port 56 may be a wireless input port for powering the article 10, and in this case may, for example, be part of a battery charger unit that operates to charge the battery 40 using, for example, an inductively coupled charging technique. If the battery charger unit is part of an inductively coupled charging system, it generally responds to electromagnetic waves produced by an exterior charging unit (not shown) to charge the battery 40 when the attachable article 10 is disposed near the external charging unit. In another case, the battery charger of the input port 56 may be a kinetic energy charger unit that converts motion of the device 10 (such as that associated with movement of an arm when the attachable electronic device 10 is in the form of a wristband) into electrical energy which is provided to charge the battery 40.

As will be understood, the processor 42, which may be a programmable, general-purpose processor or a specially programmed processor programmed using any desired type of hardware or firmware programming, generally coordinates and implements the operation of the display 18 and the associated electronic components as described in more detail herein. The computer readable memory 44 stores various applications, including for example the general operating system implemented by the processor 42, and various applications (illustrated as a set of applications 60 in FIG. 31) to be run on the processor 42 to implement various different types of functionality via the device 10, some of which will be described in more detail herein. The memory 44 may also store one or more data files 62, which may be, for example, image or video data files associated with various images to be displayed on the display screen 18 at various different times. Still further, the memory 44 may store application data that may be created by the various applications 60 or the microprocessor 42 as part of the operation of various applications 60 and to be used by those applications 60 either during runtime of the applications 60 or at other times. If desired, the microprocessor 42 or one of the secondary electronic components 53 may include or be a clock that tracks the current time, day, date, month, year, time zone, etc.

As an example, one or more of the applications 60 may implement various functionalities typically associated with standard computers or other types of electronic devices such as personal handheld electronic devices, including for example an e-mail application, an Internet or web-browsing application, an alarm clock application, a calendar application, a music-playing application such as an MP3 application, a video application, a digital picture slideshow application, a mapping application, an e-reading application which may provide books, notes, magazines or other types of articles, for reading by the user, etc. Still further, one or more of the applications 60 may operate on the processor 42 to turn the display 18 associated with the dynamically flexible, attachable device 10 into a slave display device that may be tied to or communicably coupled to an exterior master device that is generating content to be displayed via the flexible display 18. The master device, which may be a smart phone or a nearby computer device, may be wirelessly connected to the electronics suite 38 to provide content to be displayed on the flexible display 18 and will typically have more memory, and computing and processing power than the processor 42.

The communication module 46 of FIG. 31 may include or use any type of communication hardware/software/firmware that uses any desired types of communication techniques to enable the microprocessor 42 to communicate with exterior devices or sources. Of course, the communication module 46 could include multiple different types of communication hardware/software/firmware, including any kind of hardwire-based communication module or wireless-based communication module. As examples, the communication module 46 may include a wired or wireless Internet-based communication module that may provide wired or wireless-based, IP protocol communications (e.g., via one or more communication interface ports 54) between the dynamically flexible, attachable article or device 10 and other devices or a communication network such as a LAN or a WAN to which other devices are communicatively connected. For example, the wired or wireless Internet-based communication module may support a Wi-Fi protocol and/or another packet protocol. Likewise, the communication module 46 may include a radio frequency identification (RFID) communications module for communicating with, sending messages to and/or receiving messages from RFID tags stored in other devices around or close to the device 10. In this case, the communications module 46 may decode signals received from RFID tags in response to pings by the RFID communication module 46 to identify the RFID tags or tag numbers (identifiers) associated with these devices. Additionally or alternatively, the communication module 46 may include a near field communication (NFC) module and/or a Bluetooth communication module, which may perform near field communications and/or Bluetooth communications in any known or desired manner with nearby NFC or Bluetooth enabled devices, thereby enabling wireless communication between the device 10 and other closely situated or closely located electronic devices, e.g., via a wireless communication interface 54. Still additionally or alternatively, the communication module 46 may include a Z-Wave protocol communication module, a Zigbee protocol communication module, and/or another communication module that uses another wireless protocol to communicative with other devices. Still further, the communications module 46 may include a USB or other type of wired communication module for decoding and encoding USB-based communication signals to be sent out and received via a USB communication port 54.

As illustrated in FIG. 31, the display driver 48 is coupled to the microprocessor 42 and to the display 18, and drives the display 18 to present different images to a user and thus implement functionality via the display 18. The display driver 48 may be associated with or use any type of display driver technology associated with the various different types of flexible displays that might be used, including, for example, e-ink or other bi-stable display drivers, organic light emitting diode (OLED) display drivers, etc. Of course, it will be understood that the display driver 48 is connected to the various pixel elements or pixels of the flexible display 18 to cause the pixel elements to change their visual appearance so as to present content image on the flexible display 18. Typically, but not necessarily, each pixel element is communicatively connected to two electrodes, lead lines, connecting lines, or connectors corresponding the (x, y) coordinates of the particular pixel element on the flexible display 18. Thus, the display driver 48 provides image content (e.g., by using electrical signals or other suitable signals) to a set of connecting lines corresponding to a width of the flexible display 18 or its display area (and, in some cases, physically emanating from a width edge or transverse side of the flexible display 18 to the driver 48), and the same display driver 48 may provide image content (e.g., by using electrical signals or other suitable signals) to another set of connecting lines corresponding to a length of the flexible display 18 (and, in some cases, physically emanating from a length edge or longitudinal side of the flexible display 18 to connect to the driver 48). In an example, the display driver 48 provides image content to a set of transverse connecting lines and/or to a set of longitudinal connecting lines so that image content is presented on the display area of the flexible display. In an example, the article 10 includes multiple display drivers 48, each of which provides image content to a respective set of connecting lines.

Returning to FIG. 31, the display driver 48 illuminates or causes the pixel elements to obtain or reach a color, a lighting level, an on-off state, etc., so as to drive the display 18 to present various images and other functionality as determined by the particular application 60 being executed on the microprocessor 42. In some cases, the display driver 48 may cause various images, such as one or more artistic renditions, patterns, etc. or other types of images stored in the memory 44 to be displayed as one of the images 62 on the flexible display 18. Such an image may be any type of graphic element in the form of artwork, an indication of an association of the user with a particular university or other organization, such as a logo, a mascot, an icon, etc. In the case of a static display, and particularly when the flexible display 18 is a bi-stable type of flexible display, such as an e-ink type of display, the display 18 might display a particular image or background image whenever the device 10 is in a sleep mode, and thus in which the display driver 48 is not operating to actively drive the display 18.

Of course, the touch screen controller 50 is connected to a touch screen interface 26, if such an interface exists, and receives input signals from the touch screen interface 26. The controller 50 operates to decode these input signals to identify touch events that occur with respect to the touch screen interface 26. The touch screen interface 26 may be a capacitive touch screen interface or any other suitable type of touch screen interface disposed over the flexible display 18, and may be transparent in nature to thus enable the pixel elements of the display 18 to be viewable through the touch screen interface 26. Of course, other types of touch screen interfaces may be used instead or as well. In any event, the touch screen controller 50 operates to energize and control the touch screen interface 26, as well as to recognize and decode touch screen events to identify, for example, the location of each touch screen event, a type of a touch screen event, such as a tap or a swipe movement, etc. If desired, the touch screen controller 50 alone or in conjunction with the processor 42 may operate to determine or recognize gestures that are input via the touch screen interface 26, such gestures being, for example, a slide, a swipe, a multi-finger pinch or any other type of gesture that includes one or more finger movements coordinated with one another. Each such gesture may indicate an action to be taken on or via the device 10. Of course, the dynamically flexible, attachable article or device 10 may include other or different types of user input devices configured to detect user-generated gestures, such as interfaces that include buttons switches, roller balls, slide bars, pressure sensors, strain gauges, etc., disposed on, for example, one of the clasps 14 or elsewhere along the band 12. Such user interfaces may enable the user to perform more rudimentary functions, such as scrolling movements, on-off powering movements, mode switching, etc. that are traditionally entered via actuate-able buttons or switches.

As previously discussed, the sensors 52 may include any of various different types of sensors. In an embodiment, the sensors 52 include one or more gyroscopes which detect movement of or the orientation of the band 12, rapid shaking of the band 12, etc. One or more of these types of movements may be considered to be a particular type of input or user input, such as a gesture to reset the device 10, to change a mode of the device 10, etc. Likewise, the output of such gyroscopes can be used by the microprocessor 42 to determine the orientation or direction of the flexible display 18 to enable the microprocessor 42, or an application 60 executed on the microprocessor 42, to determine the proper orientation of the image to be displayed on the flexible display 18. In some instances, such motion detection and position detection devices might be located in two or more of the fasteners 14 or other electronics modules 19, to enable the device 10 to more accurately determine whether the device 10 is oriented around a wrist or other circular member or whether it is instead laid out flat or oriented in some other manner. The microprocessor 42 or an application executed thereon may change functionality, behavior, and/or actions of the device 10 based on the detected orientation of the band 12.

Likewise, the sensors 52 may include step-counter or an impact-sensor like and accelerometer, which might be used to count the number of steps a user takes over a particular period time. Alternatively or in addition, the sensors 52 may include one or more temperature sensors, which may detect the ambient temperature, the temperature of the skin of the user when the device 10 is being worn, etc. The sensors 52 could also include a blood-pressure sensor device, which might check blood pressure or heart rate using known exterior blood-pressure sensor device technology.

In some cases, the sensors 52 include one or more pressure or force sensors and/or strain gauges which detect pressure, strain, or similar forces that are considered to be an input to cause the functionality, behavior, and/or actions of the device 10 to change, e.g., reset the device 10, change a mode of the device 10, change a presentation displayed on the flexible display 18 of the device 10, etc. In one example, two pressure or force sensors are positioned on or attached to the band 12 (e.g., as part of the backplane of the flexible 18 or as part of the support 16 so that when the dynamically flexible device 10 is attached to itself in a generally circular or looped configuration, the pressure or force sensors are diametrically opposed to each other. In other examples, multiple pressure or force sensors may be disposed along the band of the device 10 at desired locations.

As will be understood, the various different electronic devices or components disposed in or shown in the electronic suite 38 of FIG. 31 may be used in conjunction with one another in various different manners to provide a whole host of functionality for the attachable article 10, which might be beneficial in various different uses of that article. However, only some of these uses will be described in detail herein.

It may be important to limit in the manner in which the flexible substrate 16 can bend or flex so as to protect the flexible display 18 and/or the touch screen interface 26 of FIGS. 1-28, as well as to provide or protect the edges of those devices, which might be subject to impact if the wristband 10 is hit from a lateral side. FIG. 32A illustrates a top view of the flexible substrate 16, showing the flexible display 18 disposed thereon. In this case, the flexible display 18 is disposed on top of the flexible substrate 16 over the center portion of the substrate 16, while the edges of the substrate 16 extend out transversely towards the sides of the wristband 10 beyond the flexible display 18 at least a little bit. This additional area of material of the substrate 16 may be used to protect the flexible display 18 from being bent or torn in the case of a side impact to the wristband 10, as this material will operate to blunt or absorb some of that impact. As illustrated in FIG. 32B, which provides a cross-sectional view of the wristband of FIG. 32A, the flexible substrate 16 can be thicker in the area at the edges of the band 10 and may extend upward to be even with or disposed above the lateral or transverse sides of the flexible display 18, to provide additional side impact protection for the flexible display 18. In this case, as illustrated in FIG. 32B, the display 18 is seated in a space or crevice formed within the center of the substrate 16, wherein the substrate 16 has sidewalls that extend above or up against the edges of the flexible display 18, in order to provide side impact protection to the display 18. In some cases, the edge or sidewalls of the substrate 16 that extend upward to protect the edges of the flexible display 18 and/or the touch screen interface 26 (if present) may be formed with stitching when the substrate 16 is made of leather for example. In another embodiment, illustrated in FIG. 33, additional side impact protection is provide by a wire or other harder, rigid or semi-rigid material 60 (having a density greater than that of the flexible substrate material 16) but that is still flexible, disposed within or along the flexible substrate 16 along the edges of the flexible display 18 near or adjacent to the sides of the flexible display 18. As illustrated in FIG. 33, the wires 60 are provided within the flexible substrate material 16 and extend along the edge of the band portion 12 next to or adjacent the transverse sides of the flexible display 18 to provide superior support or edge protection for the display 18 in the case of a side impact to the wristband 10. Of course, other types of edge protections besides those illustrated in FIGS. 32 and 33 can be used to protect the edges of the of the flexible display 18.

Figure 35A:
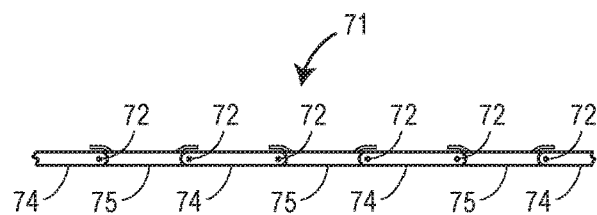
FIGS. 35A and 35B illustrate side views of various bending limiting members that limit the flexing motion of a flexible substrate in at least one direction while allowing flexing motion in another or opposite direction.
Figure 35B:
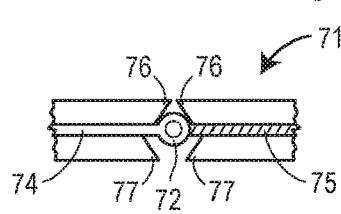
Figure 35C:
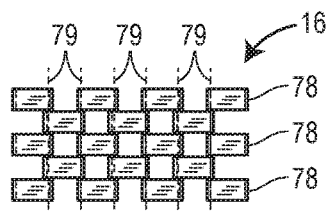
FIG. 35C illustrates a top view of a bending or flexing limiting structure forming a flexible substrate, formed as a series of transversely interconnected longitudinal members, each longitudinal member made up of a set of longitudinally disposed links.
Figure 36:
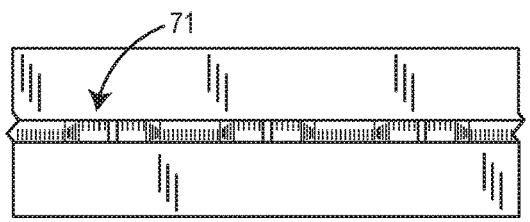
FIG. 36 illustrates a top view of a flexible substrate of a wristband device having bending limiting structure of any of FIGS. 18A-18C disposed therein.

FIGS. 34-36 illustrate structure that can be used to protect the flexible display 18 and the touch screen interface 26 (if it exists) by limiting the certain flexing, bending and/or torsional movement of the flexible substrate 16, and thus the display 18 disposed thereon, to certain predefined bending motions or ranges. In particular, because the flexible display 18 is formed as a set of separate substrates having different electronic components formed or etched thereon, as will be described herein, certain types of movement or bending motions may cause damage to the flexible display 18 by causing these layers to delaminate or come apart from one another. In particular, while it is generally possible to flex or bend the band portion 12 in one direction (e.g. around a wrist to form a circular band such as that shown in FIGS. 2 and 4) without delaminating the separate layers of the flexible display 18, it is typically not generally desirable or possible to be able to flex or bend the display 18 in the opposite direction or in multiple different directions, such as forming a circular band with the flexible display 18 facing the inside of the band, as doing may cause the layers of the flexible display to delaminate from one other and thus stop functioning.

More particularly, while it is desirable to bend the flexible substrate 16, as illustrated in FIGS. 2 and 4, such that the display 18 faces towards the outside of a circular ring, it would be disadvantageous and potentially destructive to the flexible display 18 to bend the wristband 10 in too far in the opposite manner (referred to herein as a counter-rotational direction) with the display 18 on the inside of the ring, because to do so would or could potentially delaminate the various layers of the flexible display 18 from one another. Still further, it would be undesirable to provide too much flexing of the sides of the flexible display 18 around the longitudinal axis of the band 12 or too much torsional bending on the flexible display 18, wherein such torsional bending rotates one of the clasps 14 around the longitudinal center line of the band 12 with respect to the other of the clasps 14, thus forming a helical structure in the band 12. In this case, torsional rotation would occur when one end of the flexible display 18 is rotated in one direction while the other end of the flexible display 18 is rotated in the other direction, such as by rotating one of the end pieces 14 about the center longitudinal axis of the band 12 in a clockwise direction while simultaneously rotating the other end piece 14 about the center longitudinal axis of the band 12 in a counter-clockwise direction simultaneously. Again, as will be understood, too much of such a bending movement could delaminate the flexible display 18 and/or otherwise damage the flexible display 18.

FIGS. 34-36 illustrate various mechanisms for limiting the bending or flexing motion of the flexible substrate 16 of the wristband 10 to the desired bending motions like those illustrated in FIGS. 2, 4, 7, 8 and 9, while limiting undesirable bending motion such as longitudinal flexing, torsional or counter-rotational flexing of the display 18. In particular, FIG. 34 illustrates the substrate 16 as including a series of bars, or stays 70 disposed from side to side (transversely) across the band portion 12. The bars or stays 70 operate to limit or reduce the amount of torsional rotation that is able to be applied to the substrate 16 and also limit the amount of longitudinal rotation that can be applied to the band 12. Here, the bars or stays 70 are made of relatively stiffer or even inflexible material, such as a rigid or semi-rigid material like hard plastic or metal. The bars or stays 70 may be made of a separate material that is disposed within or on the substrate 16 or may be manufactured as part of the substrate 16. Of course, the size, number and spacing of the bars or stays 70 within the flexible substrate 16 may be used to define the amount of torsional motion that can be applied to the substrate 16. The bars or stays 70 may also operate to absorb side impacts to the band 12 and thus, if the substrate 16 has a width that is at least slightly larger than the width of the flexible display 18, the bars or stays 70 also act as side impact protection structure. In one case, the bars or stays 70 may be separate material than the rest of the substrate 16 while, in another case, the bars or stays 70 may be made of the same material as the rest of the substrate 16, but may comprise a thicker or denser configuration of that material. In still another case, the material of the substrate 16 may be a bendable metal that bends easily at large radius of curvatures (i.e., small bending angles) but that increases in stiffness or non-elasticity at smaller radius of curvatures (i.e., larger bending angles).

To limit the counter rotational bending motion of the band 12, i.e., a bending motion that would put the flexible display 18 on the inside of a circular band as opposed to the outside of the circular band as illustrated in FIGS. 2 and 4, a longitudinally spaced rigid or semi-rigid member can be disposed in or on the flexible substrate 16 that operates to allow bending motion as illustrated in FIGS. 2 and 4 but to limit counter-rotational bending movement. FIGS. 35A and 35B illustrate a bending limiting member 71 configured as a set of interconnected slats or bars rotatable with respect to one another around a pivot point 72. In FIG. 35A, the interconnected slats or bars have alternating flat members 74 and flat members with wings 75 on the edges thereof, wherein the wings are disposed above the adjacent flat members 74. The flat members 74 are pivotally connected to the flat members 75 so that the wings, when disposed above a flat member 74, prevent or at least limit rotation about the pivot point 72 in one direction while allowing such rotation in the opposite direction. In FIG. 35B, interconnected bars 74 and 75 are connected at pivot points 72 and each includes a protrusion 76 that extends at least partially above the pivot point 72. In this case, the protrusions of adjacent bars 74 and 75 contact each other very soon (in response to minimal rotation about the pivot point 72) when rotated in one direction, to thereby limit or prevent such rotation, and allow rotation in the opposite direction. Moreover, the interconnected bars 74 and 75 may additionally include protrusions 77 that extend below the pivot point 72 but that are spaced further apart and thus allow more rotation than the protrusions 76. The protrusions 77 will thus enable the member 71 to bend in one direction (i.e., the down direction in FIG. 18B) more than in the other direction (i.e., the up direction in FIG. 35B). However, the protrusions 77 will still prevent bending or flexing at large angles of curvature. The spacing and size of the protrusions 76 and 77 can be adjusted to obtain the desired amount of flexing in each direction.

Still further, FIG. 35C illustrates a top view of a bending or flexing limiting structure forming a flexible substrate, formed as a series of transversely interconnected longitudinal members 78, each longitudinal member made up of a set of longitudinally disposed links. Here, the various sets of rotatably interconnected links are rotatably interconnected by pivot members disposed along the dotted lines 79 of FIG. 35C. The various sets of links as illustrated in FIG. 35C may be used as or may be part of the flexible substrate 16, and may operate to limit the bending motion of the flexible substrate 16 in each of the longitudinal, counter-rotational and torsional directions described above. Of course, the interconnected links illustrated in FIG. 35C could additionally have wing or protrusion structure such as that of FIGS. 35A and 35B, or other structure that limits rotation of adjacent links about the transverse pivot points 79 interconnecting the links, to provide superior bending or flexing limiting structure.

In any event, the configuration of the members 71 of FIGS. 35A, 35B and 35C allow or enable movement of the adjacent slats or flat members 74, 75 and 78 with respect to one another in one direction, e.g., the down direction in FIGS. 35A and 35B, while limiting the rotational movement of the slats or bars 74 and 75 in the opposite direction, such as the up direction in FIGS. 35A and 35B. In this case, the member 71 with the alternating flat members 74 and flat members 75 or the interconnected substrate of FIG. 35C may be disposed along a longitudinal axis or in the longitudinal direction of the substrate 16, as illustrated in FIG. 36, to allow the bending motion illustrated in FIGS. 2 and 4 while limiting counter rotational bending motion. While only one member 71 is illustrated in FIG. 36 as being disposed longitudinally in the center of the flexible substrate 16, more such members could be disposed at other locations along the length of the flat substrate 16, such as on either or both lateral sides of the substrate 16. Moreover, while only one member 71 is illustrated in FIG. 36, multiple such members could be used to limit the counter-rotational movement of the flexible substrate 16. Of course, if desired, a bending limiting member similar to that of FIGS. 35A and 35B could be disposed along the edge of the flexible substrate 16 instead of or in addition to the wire 60 of FIG. 33, so as to both protect the edge of the flexible display 18 (by providing a rigid or semi-rigid structure at the edges of the display 18) and to limit the counter-rotational movement of the flexible substrate 16, while allowing rotational movement of the substrate 16 in the manners described herein. Thus, for example, in FIG. 33, the wire 60 could be replaced with a series of links forming a bar member 71 in accordance with the principles of FIG. 35A or 35B, wherein the links 74 and 75 are rotationally connected to one another and are disposed such that they allow rotation or movement in one direction while not allowing or at least limiting movement relative to one another in the other direction. Of course, the flat interconnected longitudinal members of FIGS. 35A and 35B could be used in conjunction with the slats or bars of FIG. 34 to limit both the torsional and the counter rotational movement of the flat substrate 16 in the manners described above.

In a general sense, the flexible display 18 of any or all of the embodiments described herein may be manufactured as any type of flexible display, such as an e-paper display, an organic light emitting diode (OLED) display, etc. and this flexible display, once manufactured, may then be formed, curved or bent in various manners. Generally speaking, flexible display 18 may be made of two flexible substrates including a backplane flexible substrate and frontplane flexible substrate placed back to back, next to one another, or laminated onto each other. In the case of e-paper, an additional layer of material such as an adhesive may be included in the frontplane and disposed between the backplane and the frontplane. In some cases, such as with the use of active-matrix OLEDs, electrophoretic displays (EPDs), e-paper, electronic ink displays, e-reader displays, liquid-crystal displays (LCDs), or other active-matrix type displays, the backplane includes a plurality of semiconductor devices or elements, e.g., an array of transistors and/or other elements, disposed thereon for driving or providing energization to individual lighting, transmitting, or reflective elements disposed in a similar array on the frontplane or on top of the transistors and/or other elements. The semiconductor devices or elements may be formed on the backplane in any known or desired manner, such as by etching, dye cut forming, printing, sputtering, spin-coating, spray coating, other deposition or patterning techniques, or combinations thereof, etc. Likewise, the light emitting, transmitting, or reflective elements may be formed as any desired types of light emitting, transmitting, or reflective elements using these same or different techniques, and the elements may include light emitting diodes (LEDs), OLEDs, e-paper, liquid crystal, etc. In the case of e-paper, for example, the frontplane and the backplane may be formed with black and white, oppositely charged particles suspended in a clear fluid which, when put in an electric field, will cause the black or the white particles to drift to the top of the display to create a white state, a black state, or an intermediate grey state. In any case, the substrate of the backplane and the frontplane may be formed of the same material or of a different flexible material, such as plastic or flexible glass, and these materials may have the same or different flexibility properties, as long as both materials are able to flex to the curvature needed for bending the electronic display 18.

More particularly, the flexible displays illustrated herein, may be manufactured as a flexible display, such as an e-paper display, an organic light emitting diode (OLED) display, etc. Generally speaking, the flexible displays may be constructed on two flexible substrates, or may be constructed on one flexible substrate but having at least two flexible substrates. The flexible substrates may include a backplane display area and frontplane display area placed back to back, next to one another, or laminated onto each other. The frontplane display area comprises an array of optic elements (e.g., electro-optic elements) provided on a first flexible substrate that are capable of displaying an image, while the backplane display area comprises an array of semiconductor devices or elements (e.g., transistor elements) provided on a second flexible substrate for driving or providing energization to the optic elements on the frontplane. Materials suitable for use as the flexible substrate for either the frontplane and/or the backplane include, but are not limited to, various plastic substrates such as polyimide, polyethylene terephthalate (PET), polycarbonate, polyethersulfone, polyether ether ketone (PEEK), and polyethylene naphthalate (PEN). Metallic foils or flexible glass also may be used.

Preferably, the backplane display area comprises an array of thin film transistors (TFTs) provided on a flexible, plastic substrate such as PET. The TFT array may include switching and/or driving TFTs, and additional elements such as storage capacitors, and interconnect wiring. An individual TFT element generally is made by successive deposition and patterning of conductor (i.e., source, drain, and gate electrodes), insulator (i.e., dielectric) and semiconductor thin film layers. The active semiconductor layer can be composed of either organic (small-molecule or polymeric semiconductors) or inorganic materials (such as amorphous silicon, low-temperature polycrystalline silicon, graphene, carbon nanotube, and metal oxide semiconductors).

The TFT array may preferably comprise organic TFTs (OTFTs) based upon an organic semiconductor described in at least one of U.S. Pat. Nos. 6,585,914; 6,608,323; 6,991,749; 7,374,702; 7,528,176; 7,569,693; 7,605,225; 7,671,202; 7,816,480; 7,842,198; 7,892,454; 7,893,265; 7,902,363; 7,947,837; 7,982,039; 8,022,214; 8,329,855; 8,404,844; 8,440,828; U.S. Patent Publication No. 2010/0252112; U.S. Patent Publication No. 2010/0283047; U.S. Patent Publication No. 2010/0326527; U.S. Patent Publication No. 2011/0120558; U.S. Patent Publication No. 2011/0136333; and U.S. Patent Publication No. 2013/0062598, the disclosure of each of which is incorporated by reference herein in its entirety for all purposes. While OTFTs may include metallic contacts and a dielectric layer composed of silicon oxide ($SiO_2$) or another inorganic oxide or nitride (such as $Al_2O_3$, $HfO_2$, $SiO_2$, or $Si_3N_4$), a dielectric layer composed of an electrically insulating polymer may be preferred. Exemplary polymeric dielectric materials include polyacrylates, polyimides, polyvinyl alcohol, polystyrene, polyester, polycarbonate, polyhaloethylene, epoxy resins, siloxane polymers, benzocyclobutene-based polymers. Other polymeric dielectrics are described in U.S. Pat Nos.7,605,394; 7,981,989; 8,093,588; 8,274,075; 8,338,555; U.S. Patent Publication No. 2011/0175089; U.S. Patent Publication No. 2011/0215334; and U.S. Patent Publication No. 2012/0068314. Conductive polymers such as poly(3,4-ethylenedioxythiophene) poly(styrenesulfonate) (PEDOT:PSS) may be used as alternative materials for metallic contacts in OTFTs.

Preferably, the TFT array may comprise metal oxide TFTs based upon a metal oxide semiconductor. For example, the metal oxide semiconductor can be selected from various mixed oxides including one or more of indium, zinc, tin, and gallium such as indium zinc oxide (IZO), zinc tin oxide (ZTO), indium gallium oxide (IGO), and indium gallium zinc oxide (IGZO). In a more preferred embodiment, the TFT array may comprise IGZO TFTs. While state-of-the art IGZO TFTs usually include thick layers of inorganic materials such as $SiO_2$, $SiO_x$, $Si_3N_4$, and $SiO_xN_y$ as dielectric and passivation layers, it is preferred that if the TFT array backplane comprises metal oxide TFTs, organic materials are used in at least some of the dielectric and passivation layers, such that the thickness of the remaining inorganic layer(s) may be reduced to allow maximum flexibility of the TFT array as whole. Metal oxide TFTs incorporating one or more organic layers are described in U.S. Pat. Nos. 8,017,458; 8,097,877; 8,395,150; and U.S. Patent Publication No. 2012/0223314, the disclosure of each of which is incorporated by reference herein in its entirety for all purposes.

In some scenarios, such as for an electrophoretic or e-reader display, the frontplane display area may be laminated, sealed to, or otherwise secured onto the backplane display area. The frontplane display area may be produced by forming a subassembly that comprises, in sequence, a flexible substrate, a conductive electrode layer, an electro-optic layer, and optionally, an adhesive layer to allow lamination to the backplane. In the case of an OLED display, the electro-optic layer is sandwiched between two electrode layers and is typically built on the TFT array. Generally, at least one of the two electrode layers is transparent, often composed of a transparent conductive oxide such as indium tin oxide (no). The electro-optic layer is composed of an organic material capable of emitting light when a voltage is applied across the two electrode layers. The organic light-emitting material may have a stacked structure including a plurality of different organic layers. In addition to one or more emissive layers, the stacked structure may include additional layers such as a hole-injection layer, a hole-transport layer, an electron-transport layer, a hole-blocking layer, and/or an electron-blocking layer to enhance device performance. Individual OLED elements may have different emitters (for example, a red emitter, a green emitter, or a blue emitter) in their emissive layer to provide a colored image. Exemplary OLED device structures and materials are described in U.S. Pat. Nos. 5,707,745, 5,844,363, 6,097,147, 6,303,238, and 8,334,545, the disclosure of each of which is incorporated by reference herein in its entirety for all purposes.

In the case of an e-paper display, the electro-optic layer may be composed of an encapsulated electrophoretic medium. The encapsulated electrophoretic medium generally comprises numerous small capsules, each of which itself comprises an internal phase containing electrophoretically-mobile (e.g., black and/or white) particles suspended in a liquid suspending medium, and a capsule wall surrounding the internal phase. Typically, the capsules are themselves held within a polymeric binder to form a coherent layer positioned between two electrode layers. Most commonly, one electrode layer has the form of a single continuous electrode, while the other electrode layer is patterned into a matrix of pixel electrodes, each of which defines one pixel of the display. Electronic charges are applied to the capsules to bring particles of a selected color to the surface. Electrophoretic media and related display device structures are described in, for example, U.S. Pat. Nos. 5,930,026; 6,831,769; 6,839,158; and 7,170,670, the disclosure of each of which is incorporated by reference herein in its entirety for all purposes. In addition to electrophoretic displays, other e-paper display technologies include electrowetting displays, and electrofluidic displays as described in, for example, U.S. Pat. Nos. 7,446,945 and 8,111,465, the disclosure of each of which is incorporated by reference herein in its entirety for all purposes.

To integrate the TFT array backplane with the frontplane for a completed display system, the bottom or pixel electrode of the frontplane is (connected) to the drain or source electrode of the switching TFT in an e-paper display, and the driving TFT in an active matrix OLED (AMOLED) display.

Various organic layers on either the frontplane and/or the backplane may be formed on the flexible substrate by solution-phase deposition techniques such as spin-coating, slot coating, die coating, printing (e.g., inkjet printing, screen printing, pad printing, offset printing, gravure printing, flexographic printing, lithographic printing, mass-printing and the like), spray coating, electrospray coating, drop casting, dip coating, and blade coating. Inorganic (e.g., metallic or metal oxide) layers usually are deposited by physical or chemical vapor deposition methods (e.g., sputtering), but may be solution-processed if a soluble precursor is available. The layers may be patterned into specific elements by photolithography, either by use of the intrinsic photosensitivity of the layers (e.g., certain polymeric layers) or by use of a photoresist (e.g., metallic, metal oxide, or small-molecule organic layers).

Figure 37:
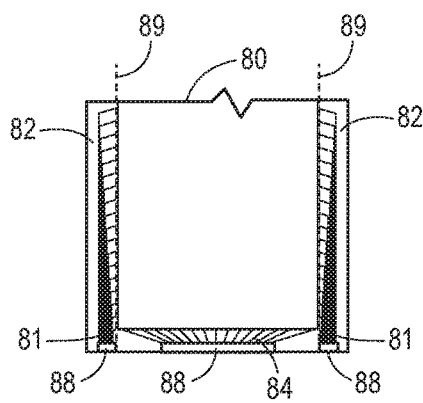
FIG. 37 illustrates a top view of a backplane layer of flexible electronic display as formed on a flexible display element substrate.

Moreover, it may be desirable to manufacture the flexible display 18 in a manner that maximizes the amount of the display area space viewable on the top layer of the device 10, i.e., that is viewable on the band 12. In this regard, FIG. 37 illustrates a base or backplane layer 81 of a flexible display 18 as manufactured. Generally speaking, the backplane of a flexible display 18 comprises a flat surface, or a first display substrate, and has a display area with various electrical energizing elements (e.g., transistors) formed, printed, etched or otherwise disposed thereon. As is known, the electronically energizing components on the backplane substrate of a backplane component are then operatively connected to electronically energizable components, such as organic light emitting diodes (OLEDs), encapsulated electrophoretic media (e.g., as in an e-paper display), etc., disposed on or formed on a frontplane component. Both the backplane substrate of the backplane component and the frontplane substrate of the frontplane component are flexible, and the backplane substrate and the frontplane substrate are aligned to provide a register between various energizing components and energizable components to thereby form pixels on the display area. In particular, the flexible display may be made of two or more layers including a backplane display substrate on which various display elements, such as pixel elements, associated with each pixel of the display are printed, etched or otherwise manufactured in the form of, for example, transistors or other switching elements, a secondary or frontplane display substrate on which OLEDs, e-ink microcapsules or other energizable components that form black and white or various colors on the display for each pixel, and, in some cases a further flexible substrate layer that operates as a ground layer. In some embodiments, such as in electrophoretic displays, the frontplane and backplane are laminated together as frontplane and backplane components. In some embodiments, the flexible display 48 may be built in layers, e.g., starting with the backplane and ending with attaching the frontplane substrate.

As illustrated in FIG. 37, the display area 80 formed on the backplane component 81 of such a display 18 may be generally rectangular in shape and have a large aspect ratio, e.g., an aspect ratio where the length of the display area 80 is at least two times greater than the width of the display area 80, and, in some configurations, is at least five times greater than the width. The display area 80 includes any number of pixels or pixel elements, each of which may be connected to at least two lines (e.g., electrical lines, lead lines, electrodes, connecting lines or connectors) for energization thereof. The electrical lines or connecting lines are disposed at the pixel elements and exit from the display area 80 via various sides of the display area 80. Generally, each line services a particular row or column of pixel elements. As such, in FIG. 37, the connection lines are illustrated as a first set of connecting lines 82 coming from one of the longitudinal sides and including a line 82 for each of y columns of pixels of the display area 80 (e.g., a set of longitudinal connecting lines), and a second set of connecting lines 84 coming from one of the transverse sides of the display area 80 and including a line 84 for each of x rows of pixels of the display area 80 (e.g., a set of transverse connecting lines). As is known, energization or connection between a particular connecting line 82 of a column $y_n$ and a connecting line 84 of a row $x_m$ of the display area will energize or turn on that corresponding pixel, and, as such, the corresponding pixel may be referred to using its two-dimensional coordinates, e.g., $(x_m, y_n)$ or $(y_n, x_m)$. In any event, as illustrated in FIG. 37, the sets of connecting lines 82, 84 exit from the display area 80 along the same backplane substrate 81 and are connected to one or more multiplexer or IC driving circuits 88, which may be formed, for example, on or near the edge of the backplane display substrate 81. The driving circuits 88 may be integral with the display driver 48 of the electronic suite 38, or the driving circuits 88 may be disposed separately from but nonetheless communicatively connected to the display driver 48, e.g., the driving circuits 88 are disposed on a flexible connector 90 connecting the backplane layer 81 to the electronics module 19. Typically, the flexible connector 90 is not integral with the backplane layer 81, but instead is a separate element that couples to the backplane layer 81 to communicate with the electronics module 19 and components included therein, such as the display driver 48.

Figure 38:
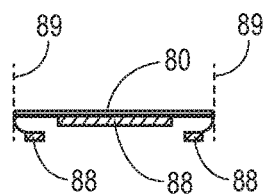
FIG. 38 illustrates a manner of bending the flexible display element substrate of FIG. 37 to form a flexible display with maximal display area on the top of a wristband device.

FIG. 38 illustrates a manner of folding or bending the substrate 81 of FIG. 37, to form a display that includes a maximum amount of display area 80 on the top thereof that is viewable to the user, so as to maximize the amount of area on the band 12 at which the display area 80 is viewable and to minimize the area of edges surrounding the display area 80 that are visible to the user. (For ease of viewing, the flexible connector 90 is not shown in FIGS. 38-39.) In FIG. 38 in particular, the bending may occur along the dotted line 89A, illustrated in FIG. 37, so as to fold over the backplane sections adjacent to the longitudinal side of the display area 80 at which the connecting lines 82 are disposed. This folding enables the connecting lines 82 to be bent down and under the display area 80, and enables the multiplexer or IC driving circuits 88 to be connected to the display driver 48 (disposed in, for example, one of electronics module 19 not shown in FIGS. 38-39) via separate electronics or electrical connections. Thus, as illustrated in FIG. 38, which depicts a cross-sectional end view of the flexible display 18, the flexible display 18 so formed and bent enables the separate longitudinal display lines 82 to be connected to different multiplexer or driving IC circuits 88, which are ultimately connected to the display driver 48 of FIG. 31, in order to energize the rows and columns of pixel elements of the flexible display 18 to thereby drive the display 18. As the fold 89A occurs along the edge of the display area 80, the areas of the backplane substrate of the flexible display 18 that are used to form the connecting lines 82 are disposed in a different plane than, and are disposed in some cases under the display area 80, and thus do not require the backplane substrate 81 to extend out towards the sides of the band 12 much beyond the edges of the display area 80. This configuration, in turn, enables the maximal amount of viewable display area to be disposed on the top portion of the band 12 which maximizes the viewable or usable area of the band 12 at which the display 18 can present viewable images. In some embodiments, the backplane substrate 81 may also be bent along the dotted line 89B along the opposite longitudinal side, even if the opposite longitudinal side does not support any electrodes or connectors thereon, e.g., for ease of manufacturing and/or for aesthetic considerations.

Figure 39:
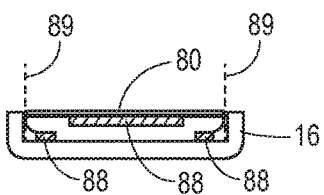
FIG. 39 illustrates an end view of a flexible display configured as provided in FIG. 38 disposed within flexible substrate with side protection structure.

FIG. 39 illustrates a cross-sectional view of the display 18 bent as illustrated in FIG. 38 and disposed in or on a flexible support 16 of the band 12, with the display 18 having the maximal display area 80 thereon disposed up to the edges of the band of the device 10. In this case, the flexible support 16 is illustrated as having sidewalls to form a protective barrier to protect the display 18 at the edges thereof from side impacts. Of course, other manners of manufacturing the display 18 could be used and implemented to produce the dynamically flexible, attachable article or device 10.

As previously discussed, the sensors 52 may include any of various different types of sensors. In an embodiment, the sensors 52 may include one or more gyroscopes which detect movement of or the orientation of the band 12, rapid shaking of the band 12, etc. One or more of these types of movements may be considered to be a particular type of input or user input, such as a gesture to reset the device 10, to change a mode of the device 10, etc. Likewise, the output of such gyroscopes can be used by the microprocessor 42 to determine the orientation or direction of the flexible display 18 to enable the microprocessor 42, or an application 60 executed on the microprocessor 42, to determine the proper orientation of the image to be displayed on the flexible display 18. In some instances, such motion detection and position detection devices might be located in two or more of the fasteners 14 or other electronics modules 19, to enable the device 10 to more accurately determine whether the device 10 is oriented around a wrist or other circular member or whether it is instead laid out flat or oriented in some other manner. The microprocessor 42 or an application executed thereon may change functionality, behavior, and/or actions of the device 10 based on the detected orientation of the band 12.

In some cases, the sensors 52 include one or more pressure or force sensors and/or strain gauges which detect pressure, strain, or similar forces that are considered to be an input to cause the functionality, behavior, and/or actions of the device 10 to change, e.g., reset the device 10, change a mode of the device 10, change a presentation displayed on the flexible display 18 of the device 10, etc. In one example, two pressure or force sensors are positioned on or attached to the band 12 (e.g., as part of the backplane of the flexible 18 or as part of the support 16 so that when the dynamically flexible device 10 is attached to itself in a generally circular or looped configuration, the pressure or force sensors are diametrically opposed to each other.

Figure 40A:
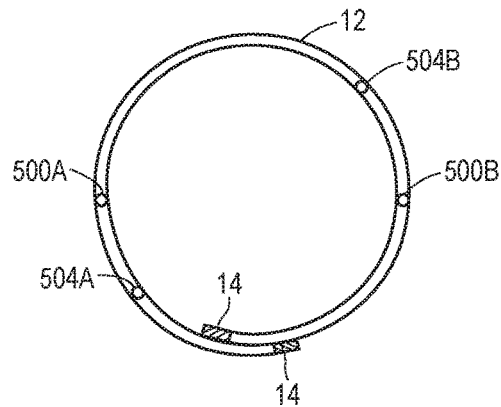
FIG. 40A is a side view of an example attachable article attached to itself in a looped configuration and including pressure sensors.
Figure 40B:
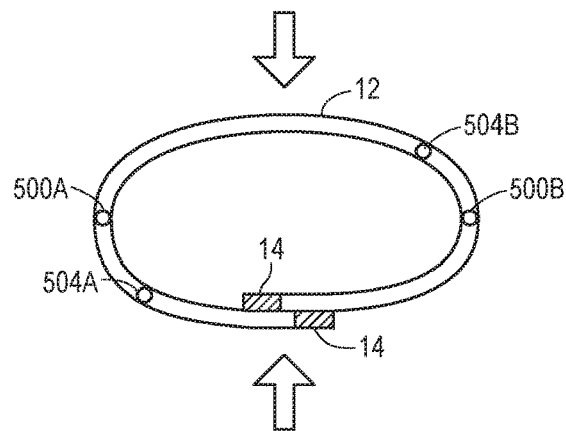
FIGS. 40B and 40C illustrate the attachable article of FIG. 49A being compressed by outside forces.
Figure 40C:
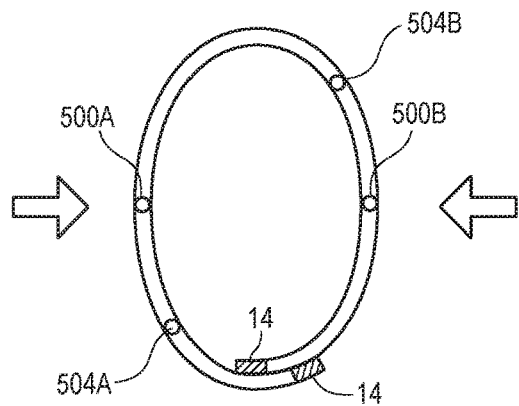

To illustrate, FIG. 40A includes an example looped configuration of a dynamically, flexible attachable device 10 including a band to which two pairs of pressure sensors 500A, 500B and 504A, 504B are attached, where the respective sensors of each pressure sensor pair 500, 504 are diametrically opposed. When a user squeezes or applies force or pressure to the band 12, for example, simultaneously at two or more points along the band 12, this action is detected by the pressure sensors 500A, 500B, 504A, 504B as an input, and the pressure sensors 500A, 500B, 504A, 504B send corresponding signals to the processor 42 (not shown in FIG. 40A-40C) in response to the detection of the input. Based on the signals received from the pressure sensors 500A, 500B, 504A, and 504B, the processor 42 determines any actions and/or behavior to be taken by the device 10 as a result of the input, and causes the resulting behavior (if any are determined) to occur, e.g., by executing one or more corresponding applications 60. FIG. 40B illustrates the band 12 of FIG. 40A being squeezed simultaneously at locations proximate to the fastener 14 and at a diametrically opposite point of the band 12, and FIG. 40C illustrates the band 12 of FIG. 40A being squeezed along an axis perpendicular to the axis of applied force in FIG. 40B.

Of course, the user may squeeze the band 12 at any two or more locations along the band 12, and by judicious placement of multiple sensors along the band 12, the location(s) along the band 12 at which the user applied the squeezing force are able to be determined by the processor 42 from the outputs of the sensors.

Different locations of squeezing along the band 12 of the flexible device 10 may correspond to different desired functionality, actions, modes and/or behaviors. For example, a detected squeeze along a first diametric axis proximate to the fastener 14 may indicate that the device 10 is to be turned off, whereas a detected squeeze along another axis may indicate that a particular application 60 stored in the memory 44 is to be launched.

In some cases, for a given axis of applied force, different signals generated by a same pressure sensor correspond to different degrees of detected force, and thus to different behaviors. For example, a squeeze of a significant force (e.g., so that both sides of the loop almost touch) that is applied over a pre-defined time duration may indicate that the device 10 is to be turned off, whereas a series of less forceful squeezes at the same location(s) may control a speaker volume. In some cases, a resulting behavior of the device 10 is based on a differential between the respective magnitudes of the forces detected at multiple sensors. For instance, if one pressure sensor detects a significantly larger force than another pressure sensor, this condition may be indicative of the device 10 being dropped rather than a user intentionally squeezing the device 10 to elicit a desired behavior or action.

In an embodiment, particular actions that are to be performed by the device 10 are based on types of squeezes or applied forces to the band 12 (e.g., particular magnitudes, locations, durations, and/or numbers of squeezes or applied forces to the band 12). The mappings between type of applied forces and desired resultant device behavior or action may be configurable. For example, the user may change one or more mappings directly at the band 12 via a user interface of the device 10, or the user may cause mapping changes to be downloaded into the memory 44 of the device 10. Of course, all detection and action recognition may be performed by appropriate software running in the processor of the device based on the signals provided by the sensors 500, 504.

Figure 41:
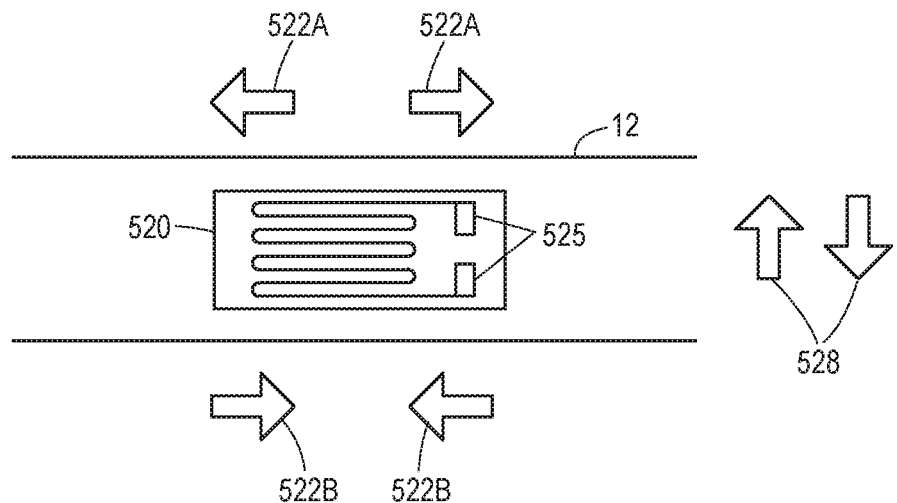
FIG. 41 is a surface view of a portion of a band of an example attachable article including a strain gauge.

FIG. 41 illustrates a surface view of a portion of an example configuration of the dynamically flexible, attachable device 10 that includes one or more strain gauges 520 attached to or included in the band 12 (e.g., on the support 16 or the backplane of the flexible display 18). In FIG. 41, the generally rectangular-shaped strain gauge 520 is oriented in parallel with the orientation of the rectangular-shaped band 12. In particular, the strain gauge 520 is positioned so that a direction or axis 522 along which forces are detected by the gauge 520 is parallel to a longitudinal axis of the band 12. Further, the strain gauge 520 is a unidirectional gauge in which forces along one dimension 522 (e.g., tension 522A or compression 522B) are detected, and signals corresponding to the detected forces (e.g., electrical signals) are transmitted via one more connection pads 525, e.g., to the processor 42 (not shown). Forces in another dimension 528 remain undetected or are ignored by the unidirectional gauge 520. In some cases, the strain gauge 520 is included in a pressure sensor included in the device 10.

Figure 42:
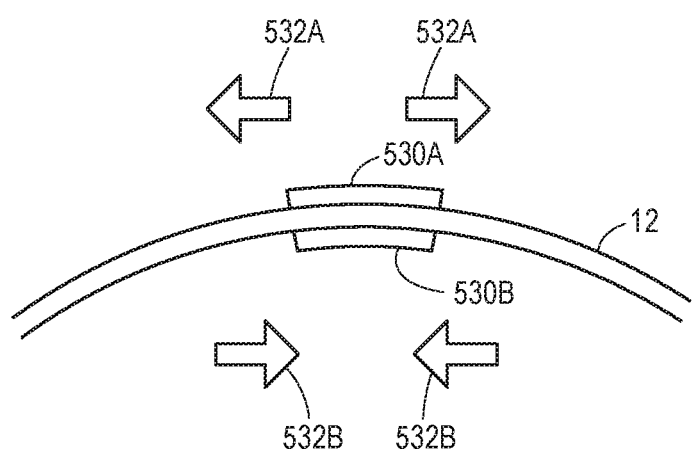
FIG. 42 is a side view of a portion of the band of an example attachable article including two strain gauges.

FIG. 42 illustrates a side view of an example configuration of the dynamically flexible, attachable device 10 that includes two strain gauges 530A, 530B positioned on opposite faces of the band 12. The example configuration of FIG.

42 may or may not be integral with the example configuration shown in FIG. 41, e.g., the gauges 530A, 530B may or may not be instances of the gauge 520. As shown in FIG. 42, the band 12 has been squeezed so that the portion of the band 12 including the strain gauges 530A, 530B is curved, and as such, gauge 530A detects tension forces 532A and gauge 530B detects compression forces 532B. The gauges 530A, 530B send signals corresponding to the magnitude of the respectively detected forces 532 to the processor 42 (not shown) so that the processor 42 may determine the appropriate action or behavior of the device 10, e.g., by executing an application 60. The device 10 may include more than one pair of gauges 530A, 530B disposed at various locations on the band 12, e.g., attached to or as part of the flexible support 16 or a substrate of the flexible display 18. In FIG. 42, the strain gauges 530A, 530B are shown as extending from the surfaces of the band 12, however, in some embodiments, the strain gauges 530A, 530B do not extend from the surfaces of the band 12, but instead are positioned within the band 12 between its surfaces.

In FIGS. 41 and 42, the strain gauges 520, 530A and 530Bb are illustrated as unidirectional strain gauges configured to detect and/or send signals corresponding to forces in only one direction. In some cases (not shown), a strain gauge included in the device 10 is a multi-directional strain gauge configured to detect multi-directional forces. In an example, if a user contorts the device 10 to a point that may not be tolerated by the flexible display 18 (e.g., by twisting the band torsionally, stretching the band in one or more directions, etc.), this contortion is detected by multidimensional strain gauges and reported to the processor 42, which then may cause a warning or other alert to be presented on the flexible display 18 or at another user interface (e.g., an auditory alert). On the other hand, a twisting or stretching the band to a tolerated but not excessive degree may correspond to yet another input detected by the multidimensional strain gauges to cause a respective action or behavior of the device 10. Of course, any number of strain gauges or other sensors may be disposed at any positions along the band 12 (and on either the upper surface or lower surface of the band 12 if desired) to detect pressures at any point along the band 12 or a multiple different points along the band 12.

In some devices, the sensors 52 may include step counters or an impact-sensor like and accelerometer, which might be used to count the number of steps a user takes over a particular period time. Alternatively or in addition, the sensors 52 may include one or more temperature sensors, which may detect the ambient temperature, the temperature of the skin of the user when the device 10 is being worn, etc. The sensors 52 could also include a blood-pressure sensor device, which might check blood pressure or heart rate using known exterior blood-pressure sensor device technology.

As will be understood, the various different electronic devices or components disposed in or shown in the electronic suite 38 of FIG. 31 may be used in conjunction with one another in various different manners to provide a whole host of functionality for the dynamically flexible, attachable article or device 10, which might be beneficial in various different uses of that article. However, only some of these uses are described in detail herein.

As will be understood, the wristband device 10 as described above can be configured and operated in many different manners to perform many different functions at the same or at different times. For example, the wristband device 10 may operate to execute any number of different types of applications including, for example, calendar applications, e-mail applications, web-browsing applications, picture, image or video display applications, stop-watch or other timing applications, alarm clock or alarming applications, location based applications including for example mapping applications, navigational applications, etc. In some cases, various different applications or functionality may be performed simultaneously, and different sections or portions of the flexible display 18 may be used to display information associated with the different applications. For example, one portion of the flexible display 18 may be used to illustrate calendar information provided by a calendar application, another portion of the flexible display 18 may be used to illustrate e-mails associated with an e-mail application and a still further portion of the flexible display 18 may be used to display a clock or stop watch associated with a timing application. Still further, the applications 60 executed on the device 10 may be executed on and display information computed solely with the electronics suite 38 of the device 10. In another case, one or more applications 60 may be executed on the processor 42 of the device 10 to interface with and display information received from external computing devices, such as a mobile phone, a laptop computer, a desktop computer, etc. In this case, the device 10 may act as a slave display device or may operate in conjunction with information received from the external computing device to provide information, graphics, etc. to a user on the flexible display 18 of the wristband 10. The wristband 10 may communicate with external devices or an external network via any desired communication hardware, software and communications protocol, including any LAN or WAN based protocol, an NFC protocol, a Bluetooth protocol, an IP protocol, an RFID protocol, etc.

FIGS. 43A-43E illustrate various different types of displays or images which may be provided on the flexible display 18 of the wristband device 10 at various different times or even at the same time. For example, in one scenario illustrated in FIG. 43A, the display 18 may depict a pattern, an artistic rendition or other image that is particularly expressive of the wearer or user, including for example, an image provided by the user, a picture or a photo, an image of a hand-drawn sketch, a team, corporate or other organizational logo, a message of some sort, or some other image that expresses some interest or personality trait of the user. Such an image might be displayed whenever the wristband device 10 is in a sleep mode, that is, when the wristband device 10 is not being actively used in other modes. Moreover, such an image could be resident on the display 18 for long periods of time whenever the display 18 is not in use, if the flexible display 18 is a bi-stable display, such as an e-ink display, which requires no power to hold the image in place once image is been formed.

Figure 43A:
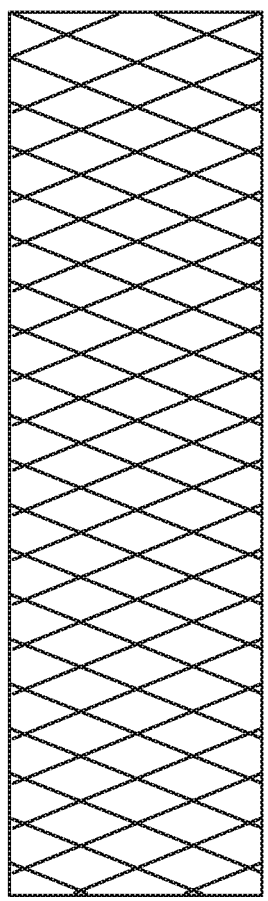
FIGS. 43A-43E illustrate various example display images that can be provided on the wristband device in different operational modes of the wristband device.
Figure 43B:
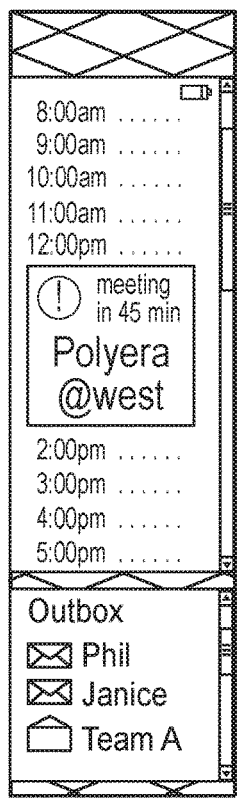

As illustrated in FIG. 43B, in another mode referred to herein as an office mode or a calendar mode, the wristband device 10 displays a calendar screen and an e-mail screen or other images associated with or set up to provide office or business related functionality. Such a mode may provide images that enable the user to easily view e-mails, calendars and to use other business related applications. Thus, for example, the display 23B may provide a calendar of events, and may also display one or more e-mail icons, text messaging icons, etc., indicating e-mails or text messages that may be available and viewable to the user.

Figure 43C:
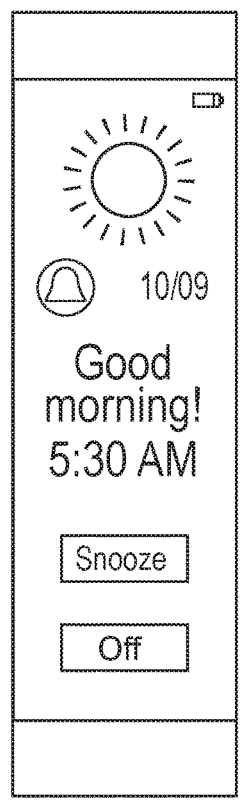
Figure 43D:

FIG. 43C illustrates the wristband device 10 in an alarm/clock mode in which the flexible display 18 provides an alarm or clock display that may be generated by an alarm or clock application. An alarm may ring by sounding a speaker (e.g., one of the electronic devices 53 of FIG. 31) at a particular time according to a preset alarm notification and/or the device 10 might use a gyroscope, accelerometer, or one or more other suitable vibrating elements 52, 53 to vibrate the device 10 to cause a vibration pattern indicating an alarm. Still further, as illustrated FIG. 43D, the wristband device 10 may be placed in an exercise or training mode in which the flexible display 18 displays a stopwatch, a distance traveled or other indications of various athletic parameters that have been met or associated with an exercise routine including, for example, use of the step counter to determine the number of steps that have been taken, to determine the number of lifts that have been performed when, for example, lifting weights, etc. Likewise, in such a mode, the display 18 may display a distance traveled by a runner or walker, the time since the beginning of a run or other exercise, etc. Still further, as illustrated in FIG. 43D, a portion of the display 18 may be used to indicate the current song that is playing via a music application implemented on the article 10. Additionally, the display 18 may include a section showing a current heart rate of the user, e.g., as detected by a heart rate monitor included on the device 10. Note that in FIG. 43D, the heart rate monitor of the display 18 is oriented so that when the device 10 is attached around the wrist of the user, the heart rate display is oriented on the inside of the user's wrist in a direction that enables the user to quickly view the information displayed thereon.

Figure 43E:
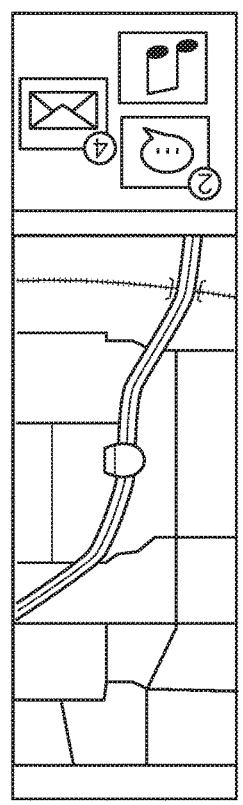

In a still further mode, illustrated in FIG. 43E, the wristband device might be a slave display to another computer device, such as a navigation device within a car, a phone, a laptop computer, an e-reader. In this case, the display 18 may display, for example, a map, a route, directions, etc. on a map as provided by a navigation device to the wristband device 10 via, for example, a Bluetooth communication module or other communication module that provides communication between the wristband device 10 and the navigation device (not shown). Such a slave display might enable the wristband device 10 to be more visible to the user in a driving situation. For example, the wristband device 10 may be attached around a person's wrist or around a stand or other support within a vehicle so that the display 18 is visible to the driver or to a passenger. Of course, other types of visuals and displays can be provided with other types of applications stored on the wristband device 10 or in other communicatively coupled computer devices, such as phones or computers, which communicate with the wristband device 10 to provide images or information for display to the user. For example, FIG. 43E includes an additional portion of the display 18 presenting thereon a slave display of other selected applications such as an email mailbox, a text messaging application, and a music application as hosted on another device (e.g., on a smartphone or other portable wireless device). In FIG. 43E, the additional portion is oriented so that when the device 10 is attached around the wrist of the user or around differently-sized in-vehicle support structures, the slave display of the application icons are oriented in a direction suitable for viewing.

Figure 44A:
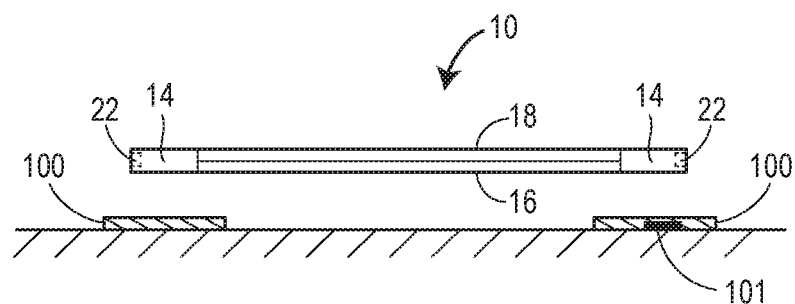
FIGS. 44A and 44B illustrate the wristband device of FIG. 1 or 3 disposed adjacent to one or more location detection strips in a straight configuration and a curved configuration, respectively, to form a wristband detection system.
Figure 44B:
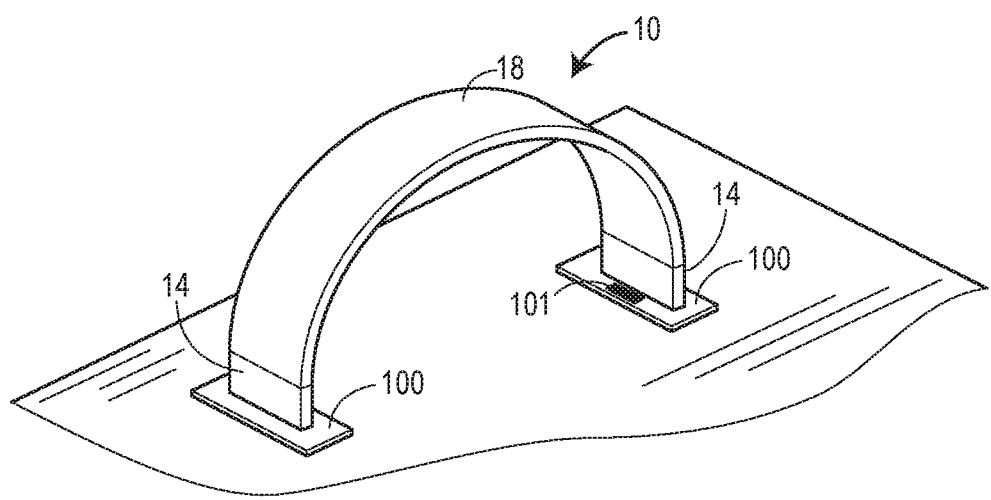

As part of one of these or other uses, the wristband device 10 may be separately connectable to magnetic strips or other exteriorly located magnetic or metallic devices to which the magnets 20 and 22 within the end pieces 14 are magnetically attracted. In this case, the strips may have communication modules therein or associated therewith that communicate with and enable the wristband device 10 to determine the location of the wristband device 10 and to thus control the default functionality of the wristband device 10. That is, the wristband device 10 may be placed around someone's wrist and used in various different modes to provide information to the user as it is wrapped around the wrist. However, the wristband device 10 might also be taken off the wrist and applied to other surfaces, such as on tables, desks, car dashboards, refrigerators, nightstands, or any other surface. In this case, the wristband device 10 may automatically operate to detect its current location and provide various default or automatic functionality based on the determined location. As an example, FIG. 44A illustrates a wristband device 10 having magnets disposed in the clasps 14, which are magnetically coupled to magnetic strips 100 which are separately disposed on a different surface or surfaces to cause the wristband device 10 to have the flexible display 18 laid out horizontally or straight along the surface. In a similar manner, FIG. 44B illustrates the wristband device 10 disposed in a curved manner between two magnetic strips 100 to create a curved display for viewing by a user.

Here, in addition to include a metal, magnet or other magnetic material, one or more of the magnetic strips 100 may include a location detection mechanism 101 therein, such as an RFID tag, a Bluetooth or near field communication module, or any other kind of passive or active communication technology that communicates with the communication module 46 within the wristband device 10, to indicate the location or a unique identifier of the strip 100 and thus the current location of the wristband device 10 when the wristband device 10 is disposed near or adjacent the strips 100. In this case, each or at least one of the strips 100 may include a unique RFID tag, Bluetooth communication identifier or other identifier that identifies itself and/or its precise location. An application executed within the wristband device 10, such as one of the applications 60 of FIG. 31, may operate to obtain, via the communication module 46 (which may be an RFID communication module, a Bluetooth communication module, an NFC module, etc.), the tag number or the identity of the strip 100 and may locate that tag number within its memory as being associated with a particular functionality. The application 60 may then configure the wristband device 10 to operate in a default manner based on the detected strip identity or location, such as by running one or more other applications 60. Of course, the strips 100 need not be magnetic in nature but could instead be any type of device having an RFID tag, a Bluetooth module (such as Bluetooth tiles) or other communication module therein that is detectable by the device 10 whenever the device 10 is in a certain range of or near the strip 100. That is, the device 10 need not be magnetically connected to the strip 100 to perform the location detection described herein.

Once the RFID tag or other identifier of the strip 100 is determined via communication with the module 101, the wristband device 10 and, in particular, the microprocessor 42 thereof, may execute a particular application indicating or providing certain functionality associated with the location or positioning of the wristband device 10 at that strip 100. Thus, the strips 100 may be placed on a refrigerator, and when so used, may disclose particular information necessary or generally associated with kitchen usage, such as a shopping list, a calorie count of particular foods that the user might be eating, a clock or other type of alarm mechanism for timing the cooking or refrigeration of certain food items, etc. On the other hand, the wristband device 10 may be removed from a strip 100 on the refrigerator, and placed next to a different strip, such as that located in bedroom, and there default to operate as alarm clock. In a still further usage, the wristband device 10 may be removed and taken to an office and, when set on or near strips associated with or pre-identified with the office, automatically display e-mail accounts or calendar information that is typically more useful and associated with an office environment. Still further, the wristband device 10 might be then taken off and put on a car dashboard having strips thereon which identifies the wristband device as being located on the car dashboard. In this case, the wristband device 10 might provide information more useful within a car, such as executing an application that interfaces with a navigation device and acts as a slave display to the navigation device, to thereby display information provided by the navigation device to a user in a more easily accessible manner up on the dashboard. The device 10 may also or instead operate as a compass and show cardinal directions, as a clock, etc.

Figure 45:
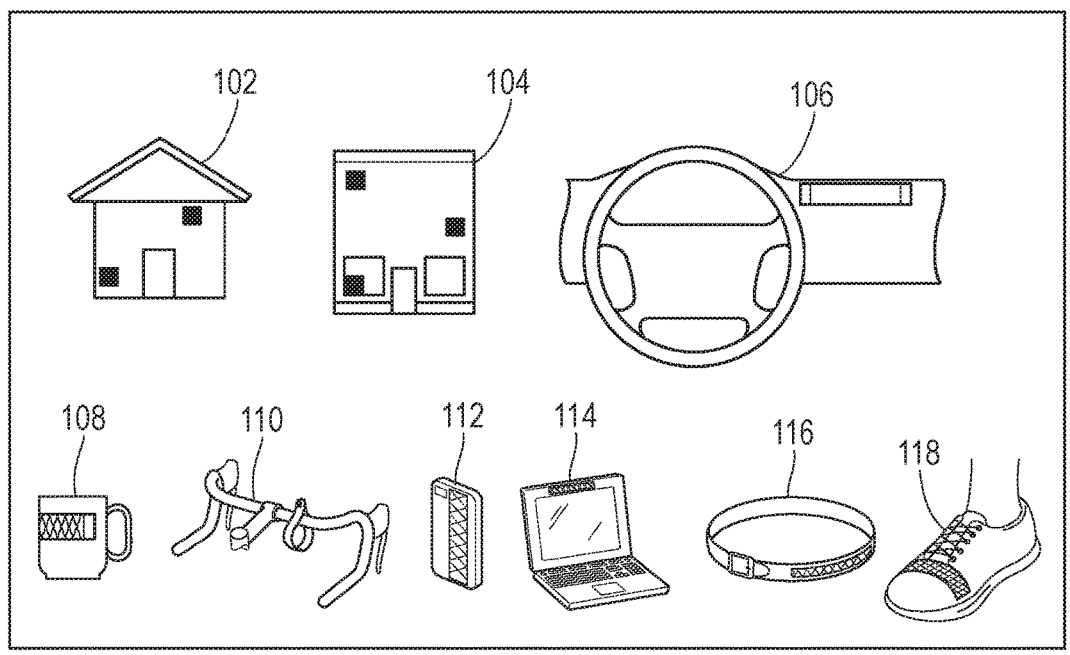
FIG. 45 illustrates the use of the wristband device detection system of FIGS. 44A and 44B in various different places or attached to various different articles to change the default functionality of the wristband device.

FIG. 45 illustrates, for example, various different environments in which the wristband 10 may be placed and associated with different strips 100 as described above, including a home environment 102, an office environment 104, and an automobile 106 to provide different automatic or default functionality of the wristband device 10. Additionally, as illustrated in FIG. 45, the attachable device 10 can be attached to any other devices such as a coffee cup or mug 108 or other drinking vessel, a bicycle handlebar 110, a phone case 112, a computer 114, a belt 116, a shoe 118, or any other device on which or near which a strip 100 having a communication module is located. Of course, the default functionality may be provided by placement of the wristband device 10 close to the strips and the identification of those strips. However, the user could still change the functionality of the wristband device 10 to other functionality associated with other applications or displays that might be necessary or desirable at the time, instead of the default functionality associated with the detected location. Moreover, different default functionality might be associated with different locations within each environment. Thus, for example, FIG. 45 illustrates two different locations within the home environment 102 and three different locations within the office environment 104, with each location having a different detectable strip 100 and thus a potential different default functionality.

Of course, it will be understood, that the use of the strips 100 and the identifiers associated with the strips 100, which might communicate via, for example, RFID, NFC, Bluetooth or any other desired communication hardware and protocols, enables the wristband device 10 to have automatic default functionality based on its location. The sensors 52 and other electronic devices 53 within the wristband device 10 may also be used to provide default functionality. For example, the gyroscopes or accelerometers may be used to detect the orientation of the wristband device 10, e.g., whether the wristband device 10 is located more horizontally or vertically, and this orientation may be used to control the manner or direction in which information is displayed on the flexible display 18. The sensors 52 and devices 53 may also detect whether the wristband device 10 is undergoing movement or acceleration, which might cause the wristband device 10 to have different functionality or to change a display in some manner.

Figure 46:
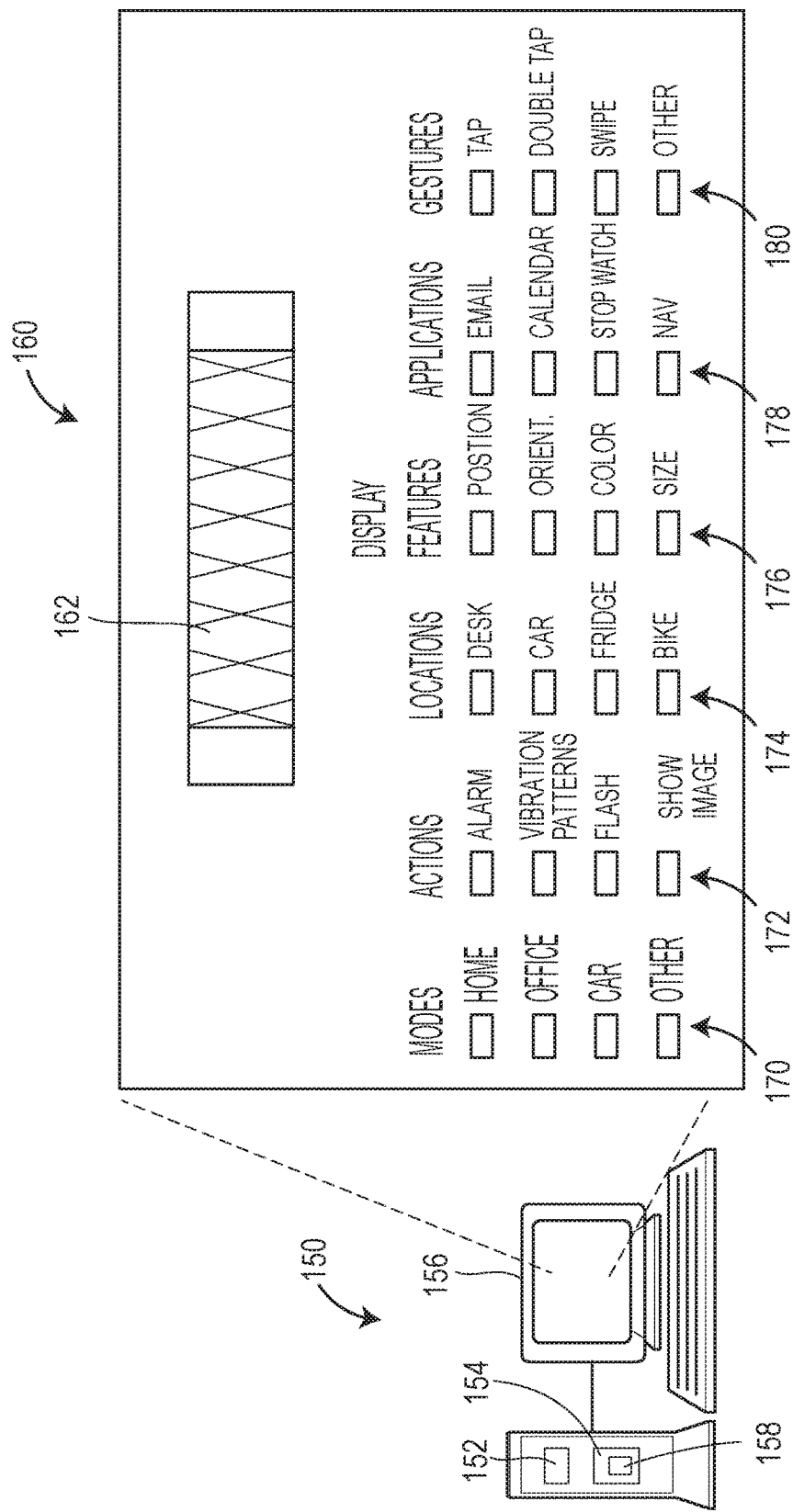
FIG. 46 illustrates an example computer system with a configuration screen that may be used to implement or specify the configuration of a wristband device having a flexible display.

The user may be able to program or configure the device 10 to operate in any desired manner, including any desired default manner, based on the detected location, position, orientation, or movement of the device 10. In this case, a configuration application may be executed in a processor of a computer device to develop or configure the operation of the wristband device 10, including the various operational modes of the device 10, the various default settings based on the mode of the device 10, the motions or actions or locations that may trigger particular modes of the device 10, inputs or gestures associated with each mode or application of the device 10 and what those inputs or gestures may mean in the context of the device 10, etc. As an example, FIG. 46 illustrates a computer 150 having a processor 152, a memory 154 and a display 156. The memory 154 stores a configuration application 158 that may execute on the processor 152 to enable a user to configure the operation of the wristband device 10. In particular, the configuration application 158, when executed, may produce a configuration screen such as the configuration screen 160 illustrated in FIG. 46. The configuration screen 160 may display an image of the wristband device 162 to illustrate what will be displayed on the display 18 of the wristband device 10 at various times, and the manner in which this information will be displayed, such as the orientation, position on the display 18, etc.

In addition, as illustrated in FIG. 46, the configuration screen 160 may present a number of boxes or drop down menus, etc. which can be used to define various modes or other operational settings of the device 10 and the default operation of the device 10 during each such mode. For example, a user may select one of a set of mode boxes 170 to define the configuration of a particular mode of the device 10. The user may select a sleep mode box, an office mode box, an exercise mode box, a home mode box, a car mode, or may select an "other" box to define a new mode for which the device 10 is to be configured. Upon selecting the appropriate mode box 170, the user may be presented with information or options about the default and other operations of the device 10 during the selected mode. For example, the user may be able to define the actions 172, locations 174, e.g., as defined by the exterior strips 100 (e.g., of FIGS. 44A-44B) that might be used to enter a particular mode. Thereafter, another set of menus or drop down boxes or windows may be used to enable a user to define the placement, content, orientation, etc. or other display features 176 of information to be displayed on the flexible display 18. Still further, the user may select one or more applications 178 to execute during a particular mode, the placement, size and area of the screen associated with the application display, the orientation of the display on the screen, the background features, borders features or other screen indicia, etc. Likewise, the user may define one or more RFID tag ids or other ids to define exterior locations that are to be associated with or that cause the wristband device 10 to enter or operate in a particular mode. In this manner, the configuration application 158 enables the wristband 10 to have default functionality based on the functions to be provided, based on the location of the device 10, based on its orientation or position around the wrist or not being connected around the wrist, based on movement of the device 10, etc.

In another case, the configuration screen 160 may enable the user to define one or more gestures 180 associated with a particular mode or a particular application on the device 10. Thus, for example, the user might define a gesture that, when detected on the touch screen interface 26 of the device 10, such as a swipe gesture, a pinch gesture, a double tap gesture, etc. causes the device 10 to operate in a certain manner, such as to switch between modes, to change orientation of the image on the display 18, to cause portions of the displayed information to move or to appear or disappear, or to cause a particular action within an application, such as to pull up new information, etc. Thus, using the configuration application screen 160, the user may define various different gestures or may preprogram various gestures to define desired device functionality, such as switching between modes, turning on and off the device or applications, switching applications, moving images or content of particular applications on the display 18, taking actions within an application, acknowledging a receipt of an incoming message, etc. As a further example, one gesture may be defined by the user to unlock the device 10 or allow operation of the device 10 such as implementing a locking or security feature. In this case, is not necessary that the device 10 display numbers or have the user pick a set of numbers but instead, gestures might enable the user to define an action that will unlock device, such as a swipe in one direction, two taps and a swipe in a particular direction, etc. Of course, the same gesture could be used for different types of operations in different modes of the device 10 or with different applications implemented by the device 10, and any combination of gestures might be used with any combination of applications or modes to enable different functionality or to enable the functionality of the device 10 be programmed in various manners. Once configured as such, the configuration data as selected by the user via the configuration application 158 on the computer 150 can be downloaded to the device 10, either wirelessly or via a wired connection, and stored in the memory 44 thereof and then be used by the operating system of the device 10 to operate. Of course, in some embodiments, at least a portion of the configuration application 158 is stored at and executed on the device 10 itself (e.g., stored on the memory 44 and executed by the processor 42 of the device 10) in addition to or as an alternative to being stored and executed on a separate computing device 150. In some configurations, the device 10 is entirely configured by the user via the local user interface of the device 10 (e.g., using the touchscreen 26).

Figure 47:
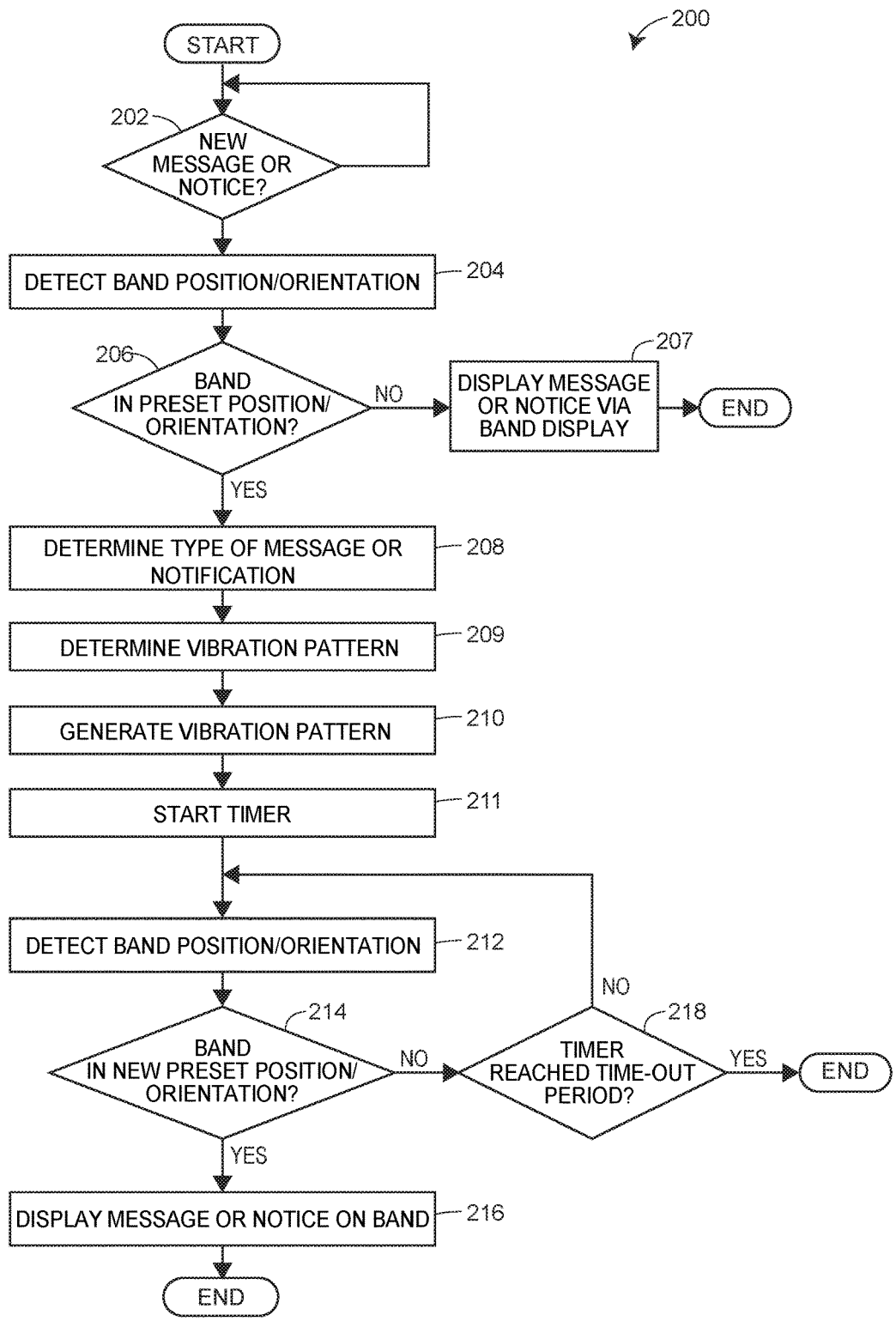
FIG. 47 illustrates a flow chart used by a processor to implement a messaging routine that selectively provides messages to a user in a discrete manner using natural movements.
Figure 48:
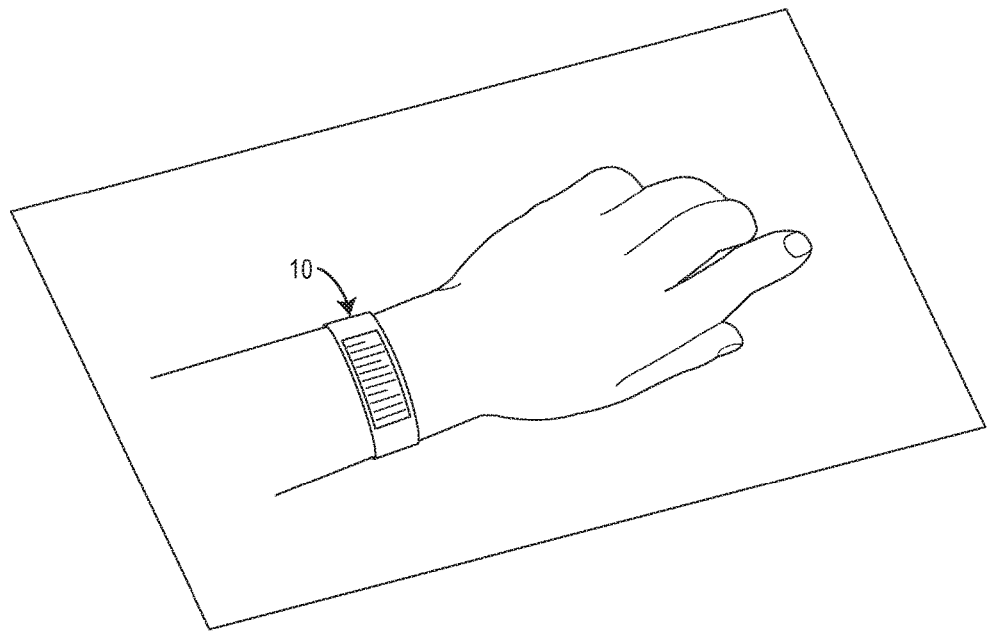
FIG. 48 illustrates a wristband device disposed on a user's wrist when the hand of the wrist is face down in conjunction with implementing the messaging routine of FIG. 47.
Figure 49:
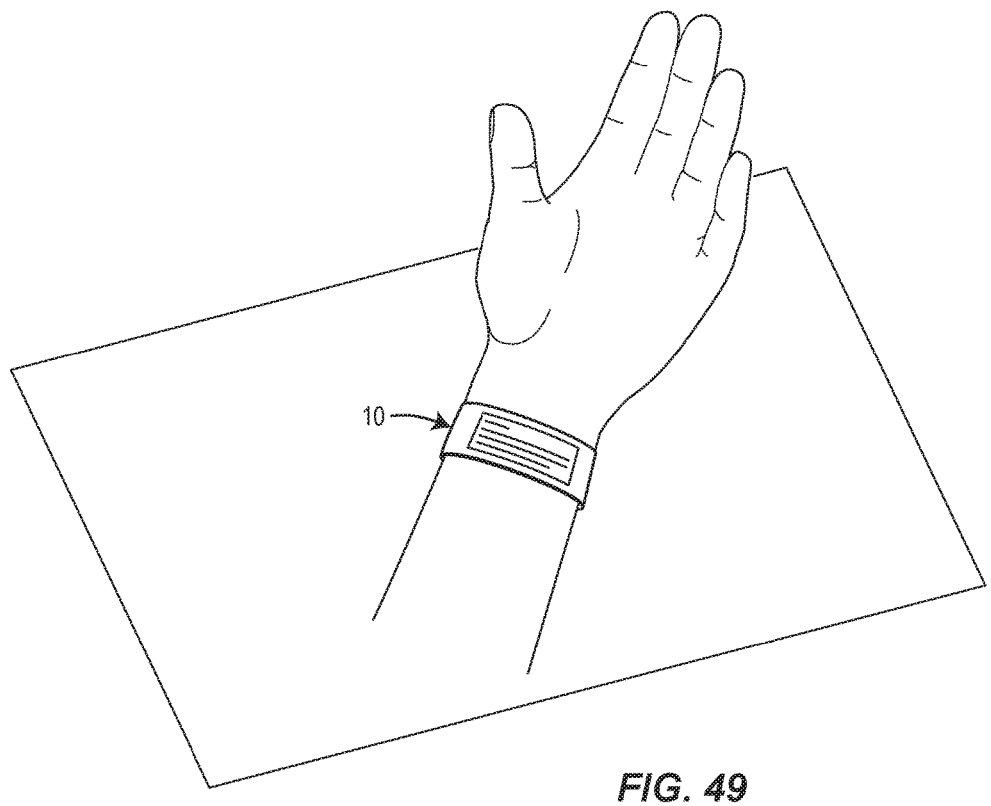
FIG. 49 illustrates the wristband device of FIG. 48 disposed on the wrist of a user's arm when the user has moved his or her hand to place the hand palm up, in conjunction with the messaging routine of FIG. 47.

One example of the manner in which the wristband device 10 could be programmed or could be manufactured to function as a default, is described in more detail with respect to FIGS. 47-49. In this case, the attachable device in the form of a wristband device 10 implements a messaging routine that enables a user of the wristband device 10 to receive, be notified of, and retrieve messages via the wristband device 10 in a very discrete manner using natural motions. Generally speaking, FIG. 47 illustrates a flowchart 200 that may be implemented on a processor of the wristband device 10 to implement a messaging routine using actions (e.g., movements of the wrist) detected by the wristband device 10, as illustrated in one example in FIGS. 48 and 49. In this case, the wristband device of FIGS. 47-49 may be any of any of those described above with respect to, for example, FIGS. 1-28 and 30, in which the device 10 may be attached to or disposed on a user's or wearer's wrist. Moreover, while the messaging routines described herein are described as being implemented on an attachable article in the form of a wristband device, they may be used in conjunction with other types of displays, such as fixed or flexible displays, disposed on other types of devices, such as articles of clothing like gloves or sleeves, belts, hats, etc., on containers such as mugs, cups, glasses, etc., on sporting equipment, such as golf clubs, baseball gloves, bats, balls, etc. Thus, while the specific example of the messaging routines described herein are described in conjunction with a wristband device worn on a user's wrist, the messaging routines are not limited to use with such devices.

Generally speaking, in one case, the processor of the wristband device 10 may be programmed to perform a messaging routine in which the processor takes a first action, such as causing one or more audio signals or tactile sensations, such as mechanical vibration actions or other haptic signals, at one or more locations on the band 10, upon receiving a message or a message notification signal, such as upon receiving an e-mail, a text message, a phone call, an alarm or an alert from a calendar application or another application, etc. Upon taking the first set of mechanical actions, such as vibrating one or more locations on the band 10, the processor of the band 10 sets or starts a timer and waits a specific amount of time, e.g., three seconds, five seconds, etc., during which the processor detects if a user or wearer of the band 10 takes a predetermined action, such as causing a particular movement of the band 10, entering a particular gesture onto the band 10 via a touch screen or other user interface on the band 10, or any combination thereof. If the processor of the band 10 detects the predetermined action (such as a predetermined gesture or movement of the band 10) within the predetermined time period, the processor of the band 10 then displays an indication of the message, e-mail, alarm, or other incoming message or displays information about a phone call or other incoming message or signal on the flexible display of the band 10 in, for example, a particular orientation and/or location on the flexible display of the band 10.

This messaging routine can be very useful in providing notifications of messages or other incoming notices to a wearer of the band 10 in a very discrete or private manner that enables the wearer to selectively retrieve and view such messages using, for example, natural motions. As a more particular example, FIG. 47 illustrates a flow chart 200 that may be used by the processor of the band 10 to implement a messaging routine as generally described above, FIG. 48 illustrates the band 10 disposed on a user's or wearer's wrist when the wearer's hand is positioned palm down, as is normally the case with a hand that is resting on a table, a lap, or otherwise, and FIG. 49 illustrates the band 10 disposed on the wrist of the wearer's arm when the wearer has moved his or her hand to place the hand palm up so as to view the display portion of the band 10 disposed on or adjacent the inner portion of the wrist.

In this particular example, and as illustrated by a block 202 of FIG. 47, the messaging routine 200 detects if the wristband device 10 has received a new message or a notification of an incoming message of some sort. The message may be, for example, a text message from a phone, an e-mail message, a calendar alarm or alert or other notification, or any other type of incoming message either from an exterior device (e.g., that was delivered using wireless communications to the band 10) or from another application executing on the processor or other element of the wristband device 10 itself. The message may also be a message that is generated by other applications such as a message or notice that is part of a gaming application. If no such message has been received at the block 202, control is returned to the block 202 for detection of a new message. However, upon receiving a new message or a notification of the availability of a new message, at a block 204 the messaging routine 200 detects the orientation and or positioning of the band device 10. For example, the messaging routine 200 determines a current orientation and or positioning of the device 10 based on one or more signals received from one or more sensors and/or detection elements 52. At a block 206 the messaging routine 200 detects if the band is in any of a number of orientations or configurations that make it desirable to continue with the messaging routine.

Generally speaking, at the block 206, the messaging routine 200 may detect whether the band 10 is in one of any number of positions and/or orientations that will cause the device 10 to take the further messaging steps described below. In particular, as one example, at the block 206, the messaging routine 200 may determine if the band 10 is connected in a circle or is disposed around an element (such that the ends of the band 10 are connected together or are disposed adjacent one another), thereby potentially indicating that the band 10 is being worn by a person or human being. Additionally or alternatively, the messaging routine 200 may determine whether or not the band is being worn based on a band orientation and/or calibration procedure or routine, for example, in a manner such as previously discussed with respect to FIGS. 28A, 28B and 29. For example, the messaging routine 200 may determine whether or not the band is being worn by a person by causing at least a portion of the band orientation detection and calibration routine 70 to be executed. Additionally or alternatively, the messaging routine 200 may determine whether or not the band is being worn based on a prior execution of at least a portion of the band orientation detection and calibration routine 70. If desired, the routine 200 may only be implemented while the band 10 is being worn by a person or human being. Also or instead, if desired, the microprocessor of the band 10 may detect if the band 10 is being worn by a person (as opposed to being, for example, hung on a bar or other inanimate object such as a bike handlebar or hook) by detecting a temperature measurement received from a temperature sensor in communicative connection with the electronics unit 38 of the band 10, wherein the temperature sensor is disposed at a location on the band 10 to detect the temperature of the skin of a user. In this case, if the temperature sensor measures a temperature in a range that would be expected (e.g., above 97 degrees Fahrenheit, for example) if the band 10 is being worn by a person, then at the block 206, the messaging routine 200 may detect the band 10 as being in the correct orientation or location. Of course, other types of sensors, such as capacitive sensors, may be disposed on the band 10 to contact the wearer's skin and these other sensors may be used to determine if the band 10 is being worn by a person.

Moreover, in addition or instead of detecting whether the band 10 is being worn on a human, at the block 206, the messaging routine 200 may determine if the band 10 is oriented in a particular direction or orientation. As an example, at the block 206, the messaging routine 200 may detect if the band 10 is disposed in an orientation indicating that the band 10 is being worn on a wrist in which the person has their palm face down, such as that illustrated in FIG. 48. For example, the messaging routine 200 may cause at least a portion of the band orientation detection and calibration routine 70 to be executed. Of course, the example orientation of FIG. 48 is but a single example of an orientation that may be detected and used for implementation of the further steps of the messaging routine 200, and a wide range of orientations and positions may be detected as being associated with a position or location or orientation that leads to the implementation the rest of the messaging routine 200 described herein. That is, the orientations of the band 10 used in this messaging routine are not limited to those of FIGS. 48 and 49. Moreover, the messaging routine 200 can be implemented without the steps of the blocks 204 and 206, meaning that the further steps of the messaging routine 200 described herein could be implemented any time that a message or signal is received.

In any event, if at the block 206 the messaging routine 200 detects that the band 10 is not in one of the predetermined orientations or positions (e.g., the band 10 is not being worn by a user or is being worn but is not in one of a set of predetermined orientations), then at a block 207, the messaging routine 200 may display the message or notice on the flexible display of the band 10 in any usual or desired manner, such as in the manner shown in any of FIGS. 43A-43E.

However, as noted above, if at the block 206 the messaging routine 200 detects that the band 10 is in a particular use and/or orientation, then, the messaging routine 200 may determine a type of the incoming message (block 208), and may determine a particular tactile or other haptic signal to use, such as a particular vibration pattern that may be indicative of the type of the incoming message (block 209). In an example, the messaging routine 200 determines type of the incoming message (block 208) based on the value of a field included in the message or included in the header of the message. As mentioned above, in an embodiment, the message type is indicative of the type of application that generated or received the incoming message, e.g., an email application, a text application, an alarm or notification application, a phone call application, a gaming application, etc. In some embodiments, the message type is indicative of a source of the incoming message, which may be an application executing on the device 10 or an external device communicating with the device 10, or which may be the sender or originator of the message (e.g., spouse, child, work email server, someone on a safe list of contacts, etc.). In some embodiments, the message type is indicative of a priority of the incoming message (e.g., high priority email messages, wake-up alarm, etc.). Message types may be distinguished by any or all of these characteristics, and/or by other desired characteristics. For example, a high priority email delivered via a work email server, a phone call or a text from a boss or supervisor may be one message type, whereas a high priority email generated by other co-workers and delivered via the work email server may be another message type.

At the block 209, the messaging routine 200 determines a particular haptic signal, in this case a vibration pattern, to use to alert a user of the message. In some (but not all) scenarios, the particular vibration pattern (or other haptic or tactile signal) is indicative of the type of the incoming message. In an embodiment, the association or correspondence between message types and indicative vibration patterns is stored at the device 10 (e.g., in the memory 44), and the processor 42 of the device 10 accesses the memory 44 to determine the particular vibration pattern (or other tactile or haptic signal/pattern). In some embodiments, the particular vibration pattern indicative of the type of the incoming message is indicated or defined within the incoming message itself, or within a header of the incoming message.

In the case of the use of a vibrational pattern, the vibration pattern may be a single vibration, a set of serial and/or simultaneous intermittent vibrations in a particular pattern (e.g., two short vibrations, a long vibration, a long vibration and two short vibrations, etc.), or any other desired pattern of one or more vibrations generated across some or all of the plurality of vibrational elements on the device 10. Moreover, the pattern of the vibration may indicate the type of message that has been received. That is, for example, one vibration pattern may indicate the receipt of an incoming e-mail, another vibration pattern may indicate the receipt of a text message and a still further vibration pattern may indicate the receipt of a calendar alert. Of course, any desired vibration pattern may be associated with any type of message.

A particular vibration pattern may be distinguished from other vibration patterns in any number of ways. For example, a total number of vibrations may differ. The set of vibrational elements over which the particular vibration pattern is generated may differ. The order or sequence in which the set of vibrational elements are activated may differ. The duration or length of any particular vibration included in the vibration pattern may differ. In some vibration patterns, multiple vibrational elements are simultaneously activated. Additionally or alternatively, in some vibration patterns, multiple vibrational elements are sequentially activated. For example, a single short vibration detected by the user at the posterior or external side of his or her wrist may indicate that a clock alarm message was received at the device 10 from an alarm or notification application, while a simultaneous short-long-long pattern of vibrations detected by the user simultaneously at both lateral sides of the wrist may indicate that a high-priority email was received at the device 10 from an email application.

Of course, as indicated above, other types of tactile or non-tactile signaling may be used or provided to the user instead of or in addition to the vibrational signaling discussed above. For example, haptic signals such as those using electrostatic signals, squeezing motions (that may be felt by the user or wearer), heat signals generated by a heating element, and even smells generated by an olfactory generation device, may be used as tactile signals to alert a user of incoming messages. In still other cases, the device may also or instead generate visual or audio cues or signals upon the receipt of a message. For example, the device may display an icon or emoticon at a location on the display, such as at a fixed location or a location that is currently facing the user based on the detection of the position of the display relative to the user, to indicate that a message has been received.

Thus, at a block 210, the messaging routine 200 generates one or more vibrational or other mechanical movements of portions of the band 10 or generates one or more other haptic, visual and/or audio cues that can be sensed by (e.g., is sensible to) the wearer to alert the wearer of the existence of a new message. In particular, at the block 210, the messaging routine 200 causes the processor 42 of the device 10 to send one or more activation signals to one or more vibrational, audio, display or other haptic elements disposed at various locations on the wristband device 10, thereby causing one or more vibrations or other haptic, audio or visual indications at the various locations of the device 10 (e.g., a vibration pattern) to be generated. The generated vibration pattern, haptic signal, audio signal, visual signal can be felt, sensed, seen, heard or otherwise detected by the wearer of the wristband device 10.

At a block 211 thereafter (or contemporaneously), the messaging routine 200 starts a clock or other timer within the electronics unit 38 of the band 10. Thereafter, at a block 212, the messaging routine 200 again determines the current location or position of the band 10 and, at a block 214, operates to detect or check for a particular predetermined action of the user via the band 10, such as particular movement or motion of the band 10, a particular sequence of gestures entered into the band 10 via a user interface on the band 10, etc. In one example case, the messaging routine 200 at the block 214 may detect a particular, e.g., natural movement of the user's wrist, such as turning the wrist over to place the palm of the hand towards the user, e.g., the motion associated with a user looking at his or her inner wrist, such as that illustrated in FIG. 49. In this case, the messaging routine 200 at the block 214 operates to detect the movement of the band 10 or the new position or orientation of the band 10 to determine if the band 10 has moved in a predetermined manner or has been moved to a predetermined position and/or orientation. Generally, the processor 42 of the electronics module 38 may determine the particular predetermined action(s) based on one or more signals received from one or more sensors 52 on the band 10 (e.g., gyroscopes, strain gauges, etc.), where the signals are indicative of a detected movement or motion of the band 10. In another embodiment, the messaging routine 200 at the block 214 could detect if a particular gesture (or, in some cases, sequence of gestures) has been entered via a user interface of the band 10, such as a tap, a swipe, a two finger pinch, a squeeze, a shake, or any other gesture. For example, the processor 42 of the electronics module 38 may receive one or more signals from one or more user interfaces on the band 10 (e.g., touch screen 26, buttons, pressure sensors, etc.), where the signals are indicative of a user input.

In still other cases, the user input may made using any other types of gestures that may be detected with the movement of the hand, wrist, body, leg, arm, etc. Moreover, different movements or gestures may be used to inform the system to display the message in a certain format/position. For example, a specific wrist rotation may be used to indicate where to place and/or in what position or orientation to display the rest of the message on the display. For example, a wrist rotation may cause the device to provide a display or to move a display from portrait top to portrait bottom format, or from a portrait top to a landscape bottom position, etc. Likewise, other gestures such as movement of an arm from a "hanging arm" position such as is a natural position of an arm when a user is walking to a raised arm position (such as placing the arm up near the chest or away from the user's side). Of course any other detectable movement may be used as the gesture to indicate that the message should be displayed. In still other examples, such as in a mug environment, movement of the mug (such as rotation of the mug from one side to another or raising the mug) may be detected as the gesture or input for detecting that the message should be displayed. If, at the block 214, the messaging routine 200 detects the predetermined movement or gesture or other action(s) by the user, then, at a block 216, the messaging routine 200 displays an indication of the message (such as the message itself) or displays a screen image provided for reading the message on a portion of the display of the band 10. In the particular example being illustrated in FIGS. 48 and 49, the message (such as a text message, a calendar notice, an e-mail, etc.) can be displayed on the display portion of the band 10 disposed on or adjacent to the inner wrist of the wearer, so that this message or notice is only viewable to the wearer when the wearer has his or her hand in the general position indicated in FIG. 49. In this case, for ease of viewing, the message or other information can be displayed in a landscape format as illustrated in FIG. 49. Of course, depending on the type of message, the message, indication thereof, or screen image provided at the block 216 could be displayed in other orientations on the flexible display 18 of the band 10, such as in a portrait view, or at an angle to the edges of the band 10, to make the message more readable to the user or wearer of the band 10 based on the actual positioning or orientation of the band 10. Similarly, depending on the type of message, the message, indication thereof, or screen image provided at the block 216 could be displayed on a particular portion of the flexible display 18 of the band 10. In an example, e-mail and text message indications are displayed on a portion of the flexible display 18 proximate to the anterior side of a user's wrist, whereas calendar or alarm clock indications are displayed on a portion of the band proximate to the posterior side of a user's wrist. In another example, all incoming messages from the wearer's spouse are displayed on the portion of the flexible display 18 proximate to the anterior side of a user's wrist, e.g., in a discreet and private location. Moreover, as noted above, the positioning or orientation of the displayed message may be selected or effected by the detected movement, such as the movement of a wrist, arm, hand, etc. Likewise, further gestures may be used or detected to change the orientation of position of the message. For example, shaking the wrist, or a quick turn of the wrist may be detected and used by the device to change the orientation of the message from portrait to landscape, from portrait top to portrait bottom, to scroll the message, etc.

In some scenarios, the particular portion of the flexible display 18 on which an incoming message, indication thereof, or screen image (e.g., as provided at the block 216) is based on the predetermined action of the user (block 214). Different predetermined actions may indicate different portions of the flexible display 18. For example, a turning of the wearer's wrist to be palm up may indicate that the incoming message, indication thereof, or screen image is to be displayed on a portion of the flexible display 18 proximate to the anterior side of a user's wrist; a tap at a particular location of the flexible display may indicate that the tapped location is the particular location on the flexible display at which the user desires to view the incoming message, indication thereof, or screen image; and a squeeze of the band 10 may indicate that the incoming message, indication thereof, or screen image is to be displayed at a predefined default location on the flexible display 18. In some cases, a sequence or plurality of predetermined actions may indicate a particular portion of the flexible display 18, e.g., a wrist rotation to generally indicate the portion of the flexible display 18 proximate to the anterior wrist side, followed by a tap to indicate a specific display location on the anterior wrist side.

On the other hand, when the messaging routine 200 at the block 214 does not determine that the predetermined action has taken place (e.g., does not determine that movement of the band 10 to a predetermined position or orientation, a gesture entered via the band 10, etc. has taken place), at a block 218 the messaging routine 200 determines if the time-out period of the timer has been reached. That is, at the block 218 the messaging routine 200 may determine if a predetermined time has elapsed since the timer was set (block 210) and if not, control is returned to the block 212 to detect the position/orientation of the band 10 (or to determine if a new gesture has been entered into the band 10). If desired, the predetermined time may be set to infinity or to a significantly long period of time so that block 214 continues to operate until the routine 200 is halted or the preset action or position, or orientation is detected. Of course, detecting the position of the band may include or be performed as detecting a transition from one position to the preset position or orientation. Of course, the loop defined by the blocks 212, 214 and 218 may repeat until the messaging routine 200 determines (e.g., at the block 218) that the time-out period has expired without the predetermined action being detected at the block 214, in which case the routine 200 may end without automatically displaying the message or notice of a message on the band 10. In this case, the user may, at a later time, interact with the band 10 to retrieve the message using any known interface application, such as an e-mail, text message, calendar or other application associated with the received message or signal.

As will be understood, the messaging routine 200 described above can be used to provide a very natural and discrete manner of receiving notifications of messages and viewing those messages. Moreover, in some cases, the messaging routine 200 can provide discrete notifications and selective viewing of messages without any direct interaction with the user interface of the band 10 by the wearer. For example, the wearer of the band 10 may be in a meeting or otherwise engaged in conversation or other activities and may receive a message, such as an e-mail, a text message, a reminder, a calendar invite or other notice, etc. In this case, the wearer's hand may be facing down or be in any of a number of other various positions or orientations. However, instead of this message automatically appearing on the display of the band 10 on the outside of the wearer's wrist, where this message may be noticeable to others due to a change in the display, the display becoming brighter, etc., the messaging routine 200 of the band 10 notifies the wearer of the existence of the message (and possibly of the type of message) by causing one or more portions the band 10 to vibrate, by providing a tactile or haptic signal, by providing an audio signal, by displaying an icon or other small indication of the message on a display, etc., which is generally detectable by the wearer but not by others. If the wearer is in a position to or wants read the message, the wearer can simply move his or her wrist to a second predetermined position, such as holding his or her hand up, with the palm facing towards the wearer's face, within the predetermined time from the onset or end of the vibration or other signaling. This particular motion is a very natural motion and does not appear out of the ordinary to others near wearer. If this motion is made within the predetermined time from the onset or completion of the vibration or the generation of another tactile, visual, or audio signal, the device 10 then displays the message or notice to the user on the flexible display of the device at, for example, only the portion of the flexible display disposed near or adjacent to the anterior portion of the wrist, which again is less viewable to others in the room than on the outside wrist portion of the band 10. However, if the user wants to ignore the message, the user can simply not make the predetermined motion within the predetermined time period, and the message will not appear on the display of the band 10 until the user takes some affirmative action to view the message, such as opening an e-mail, calendar, etc., application on the band 10 at a later time.

Of course, while the messaging content is described herein as coming from or via an application (such as an e-mail application, a text messaging application, etc.) executed on the band 10, the message could be generated by or originate from an application executed on a different device, such as the wearer's phone, computer, etc., and this message could be wirelessly sent to and displayed (or not) on the band 10 as described above. Moreover, while the messaging routine of FIG. 47 is described as being implemented in the processor of the device 10, it could be implemented in any other processor communicatively connected to the device 10, such as in the cloud, on a phone or other computer controlling or in communication with the device 10, etc.

Moreover, while not specifically illustrated in flowchart 200 of FIG. 47, the user may take, and the band 10 may detect, other actions (such as movements) made by the wearer to perform other functions in conjunction with the messaging routine 200 described above. For example, the wearer may wish to extend the time period for viewing the message by, for example, moving his or her wrist back and forth (or taking some other predetermined action). In this case, the routine 200 may detect this second type of motion and may reset the timer of the band, or may set the timer to a different time (such as by adding 10 seconds) so that, if the wearer takes the first predetermined action within that new extended time period, the message will be displayed on the inner wrist portion of the display. Still further, while the routine 200 is described herein as displaying the message on the portion of the flexible display on the inner wrist, the routine 200 could display the message on any other portion of the flexible display, including on the entire display surface of the flexible display.

Moreover, it will be understood that the actions taken by the user and detected by the band 10 may include any types of actions, including movements of the band 10, gestures or other manual inputs entered into a user interface on the band 10, a predetermined series of movements of the band 10, one or more movements of the band 10 in conjunction with a gesture or other interface interaction, etc. Still further, while the specific example of FIGS. 48-49 detects the location of a wrist with the inner wrist facing away from the user (such as that associated with a hand lying face down) as a position in which to implement the selective delayed messaging notice functions, and detects movement of the wrist to an upright position in which the inner wrist of the band faces the user as an action associated with displaying the message on the band 10, any other positions could be used as the positions associated with or detected by the method 200 at the blocks 206 and 214 of the flowchart of FIG. 47.

Indeed, in some embodiments, the user is able to configure desired associations between message types, vibration or other tactile patterns, audio or visual signals, display locations on the flexible display 18, and/or predetermined movements or actions, for example, by using the configuration screen 160 shown in FIG. 46 or another configuration screen (not shown). For example, if the user selects the "vibration patterns" box from the set of actions 172 displayed on the configuration screen 160, another configuration screen specifically for defining associations between vibration patterns, message types, display locations on the flexible display 18, and/or predetermined user-generated movements or actions may be presented to allow the user to define desired associations. Via such a vibration pattern configuration screen, the user may define an association between a particular message type and a particular vibration pattern, so that all incoming messages of the particular type are indicated by the particular vibration pattern (e.g., all alarms are indicated by a single, posterior-side vibration, and all text messages are indicated by a series of three short pulse vibrations simultaneously applied to the posterior-side and the anterior-side). Additionally or alternatively, the user may define an association between the particular message type and a particular portion of the flexible display 18, so that all messages of the particular type are indicated on the particular portion of the flexible display 18 (e.g., all incoming emails, texts, and calls from my spouse are to be indicated on the anterior side of the flexible display, and all calendar or date/time notifications are to be indicated on the posterior side of the flexible display). Further additionally or alternatively, the user may define an association between a particular vibration pattern and a particular portion of the flexible display 18 (e.g., a sequential long-short-long pattern of vibrations indicates a presentation on the anterior side, or an incoming message is presented on a portion of the flexible display proximate to the particular vibrating element that activated). Still further additionally or alternatively, the user may define an association between a set of predetermined movements, gestures and/or actions and a particular portion of the flexible display 18 (e.g., if I respond with a wrist turn, display the incoming information on the anterior side; if I respond with a tap, display the incoming information at the location of the tap; and if I respond with a shake, do not display any incoming information).

Figure 50:
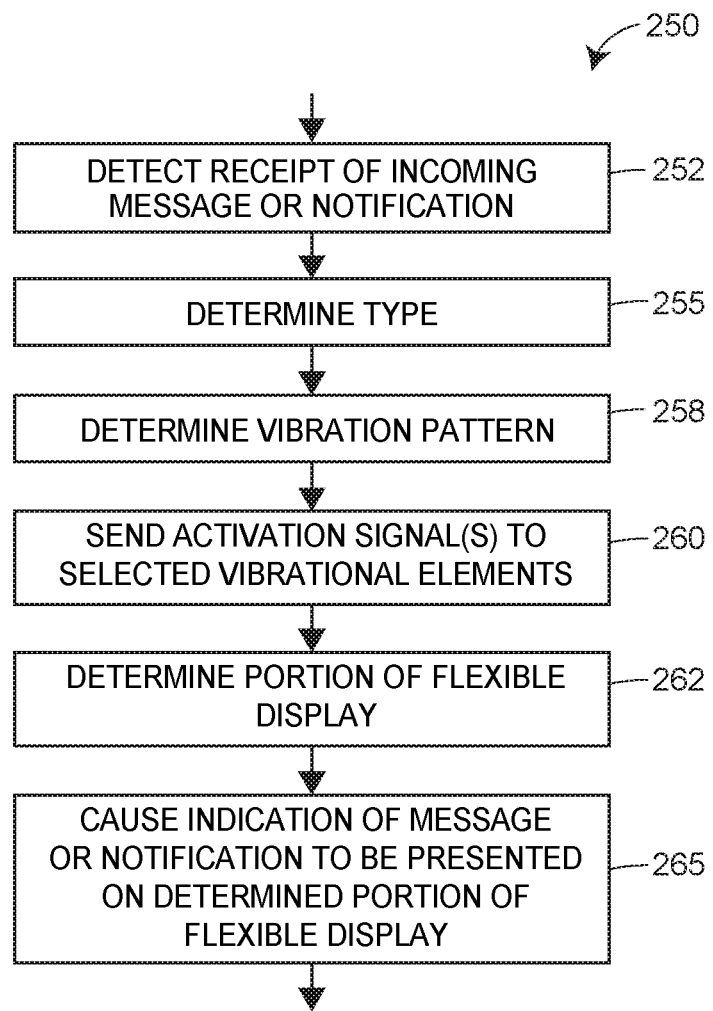
FIG. 50 illustrates a flow chart used by a processor to implement a method of providing location based vibration patterns on a wearable or attachable device, e.g., to indicate a received message.

FIG. 50 illustrates a flow chart of an example method 250 for providing location based vibration patterns on a wearable or attachable device, e.g., for indicating an incoming message. The method 250 may be performed at least in part by the attachable article or wearable device 10. For example, at least a portion of the method 250 is performed by the processor 42 of the device 10 executing computer-executable instructions stored on the memory 44 of the device 10. In some embodiments, at least a portion of the method 250 is performed in conjunction with at least a portion of the messaging routine 200 described in FIG. 47.

However, some or all of the flow chart of FIG. 50 could be implemented in a processor apart from the wearable or attachable device, such as in a processor in a communicatively connected phone or computer, a server such as a server in the cloud, etc. For example, at least a portion of the method 250 is performed by one or more processors of other devices, e.g., by one or more remote computing devices such as a master device that directs the behavior and actions of the attachable article, a server or bank of servers, a computing cloud or computing network, etc. For example, at least a portion of the method 250 may be performed by one or more processors of other devices by executing computer-executable instructions stored on one or more memories that are excluded from and remotely located from the attachable article (e.g., a remote data storage entity, a data bank, cloud data storage, etc.). Each of the one or more other devices may be in communicative connection with the attachable article via one or more wireless communication channels.

However, for clarity and ease of discussion, and not for limitation purposes, the method 250 is discussed below with respect to the device 10 of FIG. 1 and the electronics suite 38 of FIG. 31, which includes the processor 42 and the vibrational elements 53.

The wearable device 10 includes a processor 42 in communicative connection with a plurality of vibrational elements 53 disposed at different locations on the wearable device. In an example configuration, multiple vibrational elements 53 are fixedly positioned at equal or varying intervals along the length of the band 12 of the device 10. In another example configuration, at least one of the vibrational elements 53 is able to be dynamically positioned by a user so that the element 53 is disposed a desired location, e.g., a user may be able to adjust and fix a location of a particular vibrational element 53 (for example, within a provided range) so that the vibrational element 53 is aligned with the center of the top of his or her wrist. Further, the processor 42 of the device 10, in addition to being communicatively connected to the vibrational elements 53 disposed on the device 10, is also communicatively connected to a flexible display 18 that is disposed over a flexible substrate 16 of the wearable device 10. For example, referring to the device 10, the processor 42 of the device 10 is communicatively connected to one or more display drivers 48 that cause image content to be presented on the flexible display 18. Of course, other tactile or haptic signal generation elements, such as electrostatic signal generation element, heating elements, mechanical squeezing elements, etc. could be used instead of or in addition to the vibrating elements described herein.

At a block 252, the method 250 includes detecting the receipt of an incoming message at the wearable device. The incoming message may be received from another device, e.g., via a communication interface of the wearable device (such as via the wired or wireless communication interface 54 of the device 10), or the incoming message may be received from an application executing on the device 10 (such as from an application 60 stored in the memory 44 and executed by the processor 42 of the device 10).

In some scenarios, upon detecting the receipt of the incoming message (block 252), the method 250 includes determining a type of the incoming message (block 255). As previously discussed, the type of the incoming message may be determined (block 255) based on an application that generated or received the incoming message. Additionally or alternatively, the message type of the incoming message may be determined (block 255) based on a source, sender, or originator of the message, a priority of the message, and/or some other characteristic of the message. The type of the incoming message may be determined (block 255) by the value of a field of the message or of a header of the message, or the type of the incoming message may be determined by some other suitable means. For example, the type of message may be determined based on a time, a port, a channel, or other characteristic of the receipt of the message. In some embodiments of the method 250, the block 255 is omitted, for example, when the device 10 is in a state in which vibration patterns and indications of incoming messages are not determined and/or generated based on message types.

The method 250 includes determining a particular vibration pattern that is to be generated at the wearable device (block 258). For example, the processor 42 of the wearable device 10 may determine the particular vibration pattern to be generated (block 258) by accessing the memory of the wearable device 10 and/or by parsing fields of the message or of the message header to determine the particular vibration pattern from a plurality of possible vibration patterns. Further, the particular vibration pattern may be determined (block 258) based on type of the received message, a current orientation, flex state, and/or position of the wearable device, and/or one or more actions generated by the user. In some cases, an association of the particular vibration pattern (or other tactile or haptic pattern or signal) to the message type, an association of the particular vibration pattern to a particular orientation, flex state, and/or position of the device, and/or an association of the particular vibration pattern (or other tactile or haptic pattern or signal) to one or more user actions are pre-defined by the user and stored in the memory of the wearable device. Alternatively, any of these and/or other associations may be indicated in the received message and/or message header. In some cases, the user or wearer of the device may have previously defined the associations prior to the reception of the message by the wearable device, e.g., by using the configuration screen 160 of FIG. 46 or some other configuration screen. If desired, the vibrational pattern may include or vary the intensity of the vibrations instead of or in addition to the number, spacing, length, etc. of the vibrations.

At block 260, the method 250 includes sending one or more activation signals to one or more of the plurality of vibrational elements (or other tactile or haptic signal generators) of the wearable device to thereby cause the vibration pattern (or other tactile or haptic pattern or signal) to be generated by the wearable device. For example, the processor 44 of the device 10 causes one or more activation signals to be sent (block 260) to a selected set or subset of vibrational elements 54 of the device 10 in accordance with the determined vibration pattern. The one or more activation signals may be broadcast to the set or subset of the plurality of vibrational elements. In some cases, at least some of the one or more activation signals may be individually sent to respective members of the set or the subset of vibrational elements. Based on the receipt of an activation signal, a particular vibrational element generates a vibration of a particular intensity and/or of a particular length. In some embodiments, the intensity and/or the length of the vibration is indicated by the activation signal. Generally, the differences in the intensities, lengths or durations of vibrations, the locations of the vibrations along the band or device (e.g., corresponding to the locations of the particular vibrational elements), and the order of vibrations applied to the different locations of the band or device are detectable, distinguishable, or otherwise sensible by a wearer of the wearable device. As such, the one or more vibrations generated in response to the transmitted activation signal(s) are a vibration pattern generated based on the receipt of the message, and thus the vibration pattern indicates the receipt of the message to the wearer.

In some cases, after the particular vibration pattern (or other tactile or haptic pattern or signal) has been determined (block 258), a determination of whether or not the one or more activation signals corresponding to the vibration pattern (or other tactile or haptic pattern or signal) are to be generated may be made based on, e.g., the type of the received message, the current orientation, flex state, and/or position of the wearable device, and/or the one or more actions generated by the user. For example, a user may have indicated that vibration patterns are not to be generated (e.g., are to be suppressed) when the wearable device is not being worn by the user (e.g., is in a flat flex state or is disposed around an inanimate object). Thus, in situations in which the determined vibration pattern is to be suppressed, the block 260 may be omitted.

At block 262, the method 250 includes determining a particular portion of the flexible display on which an indication of the received incoming message is to be presented. The portion of the flexible display may be determined (block 262) based on one or more different factors, such as the type of the incoming message and/or one or more user inputs or actions that were entered prior to the receipt of the message and/or that were entered in response to the generated vibration pattern. For example, a previously entered user input or action may have placed the wearable device into a state in which all incoming messages received from a particular person are automatically to be indicated on the anterior wrist side of the flexible display of the wearable device. In another example, the incoming message indication is displayed on the radial wrist side of the flexible display of the wearable device only after a single squeeze is applied to the wearable device after the vibration pattern has been generated. In yet another example, the processor of the wearable device may cause an alarm message to be indicated on the posterior wrist side of the flexible display based on a previously user-defined and stored association between message type and display location.

At block 265, the method 250 includes causing an indication of the received incoming message to be presented on the determined portion of the flexible display of the wearable device. An icon, a graphic, a screen image, or the message itself may be displayed on the determined portion of the flexible display, for example, in a manner such as previously discussed with respect to the method 200.

Moreover, if desired, one or more of the applications 60 could comprise, or could implement a split display application that uses two or more display screens to present related information to a user, wherein the two (or more) display screens are configured to be, at least at some point in time, not simultaneously viewable to a user or wearer of the device. In particular, FIG. 51 illustrates a top view of the band device 10 of FIGS. 16-19 laid out in a flat orientation.

In this case, a split display application, that may be implemented on the processor 42 (FIG. 31) or in any other processor communicatively connected to the device on which the split display will appear, operates to create two display screens 700 and 702 that display related information at different parts or portions of the electronic display 18. In particular, the application 60 may display different information on the display screens 700 and 702 related as a word and a definition of and or a pronunciation of the word; a word or phrase in a first language and a translation of the word or phrase in a second language; a map of a particular geographical area at a first level of detail or zoom level and a map of the same or a portion of the same area in a second level of detail or zoom level; a notification of a message (e.g., a text message or an e-mail message) and the body or details of the message; an appointment or event notification (e.g., on a calendar) and details about the appointment or event, a first part of a message (e.g., a header, subject line, sender) and a second part of the message (e.g., a body of the message), etc. The split display application 60 may thus be implemented as part of a stand-alone microlearning application (which provides information to a user to assist the user in learning something new, such as word definitions, state or country capitals, historical facts, foreign languages, etc.), or as part of a gaming application, or may be integrated into another application, such as a calendar application, a text or e-mail messaging application, etc. to provide the dual display screen functionality. Still further, the split display application 60 may display the two display screens 700 and 702 on the same electronic display (such as the electronic display 18 of any of the band devices disclosed herein) or on two different electronic displays (which may be operated by the same or by different display drivers and/or controllers). Still further, while the split display routines described herein are described as being implemented on an attachable article in the form of a wristband device, they may be used in conjunction with other types of displays, such as fixed or flexible displays, disposed on other types of devices, such as articles of clothing like gloves or sleeves, belts, hats, etc., on containers such as mugs, cups, glasses, etc., on sporting equipment, such as golf clubs, baseball gloves, bats, balls, etc. Thus, while the specific example of the messaging routines described herein are described in conjunction with a wristband device worn on a user's wrist, the messaging routines are not limited to use with such devices.

In any event, the split display application preferably places or positions the display screens 700 and 702 at locations on the same or on different electronic displays that are not simultaneously viewable to a user at least at some time, such as when the band 10 of FIG. 51 is wrapped around a user's wrist. In this case, one of the display screens (e.g., the display screen 700) may be positioned on the top of the user's wrist as illustrated in more detail in FIG. 52, while the other of the display screens (e.g., the display screen 702) may be positioned on the bottom of the user's wrist as illustrated in more detail in FIG. 53. In this manner, user may be able to view a first part of the related information (such as a word, a phrase, a notification of a message or a calendar appointment, etc.) on the first display screen 700 without being able to see the second part of the related information on the second display screen 702. Then, when the user is ready to view the second part of the related information, the user may turn his or her wrist over (or take some other action) to view the second screen and thus view the second part of the related information (such as a definition of the word displayed in the first screen 700, a translation of the word or phrase displayed in the first screen 700, more detailed information about a message, e-mail, calendar appointment, etc. that is notified in the first screen 700, etc.) Of course, as will be understood, the use of the two part, non-simultaneously viewable display screens 700 and 702 as provided by the split display application 60 is particularly useful when used as part of a microlearning application (as this feature does not allow the user to inadvertently see the an answer to a question or other problem before the user wants to do so) or as part of a gaming application, and makes messaging and calendar routines more discrete, as this feature provides only a limited amount of information about the message, calendar appointment, etc. on the first display screen, which is generally in a position that is more easily viewable to others besides the wearer of the band 10.

Figure 54:
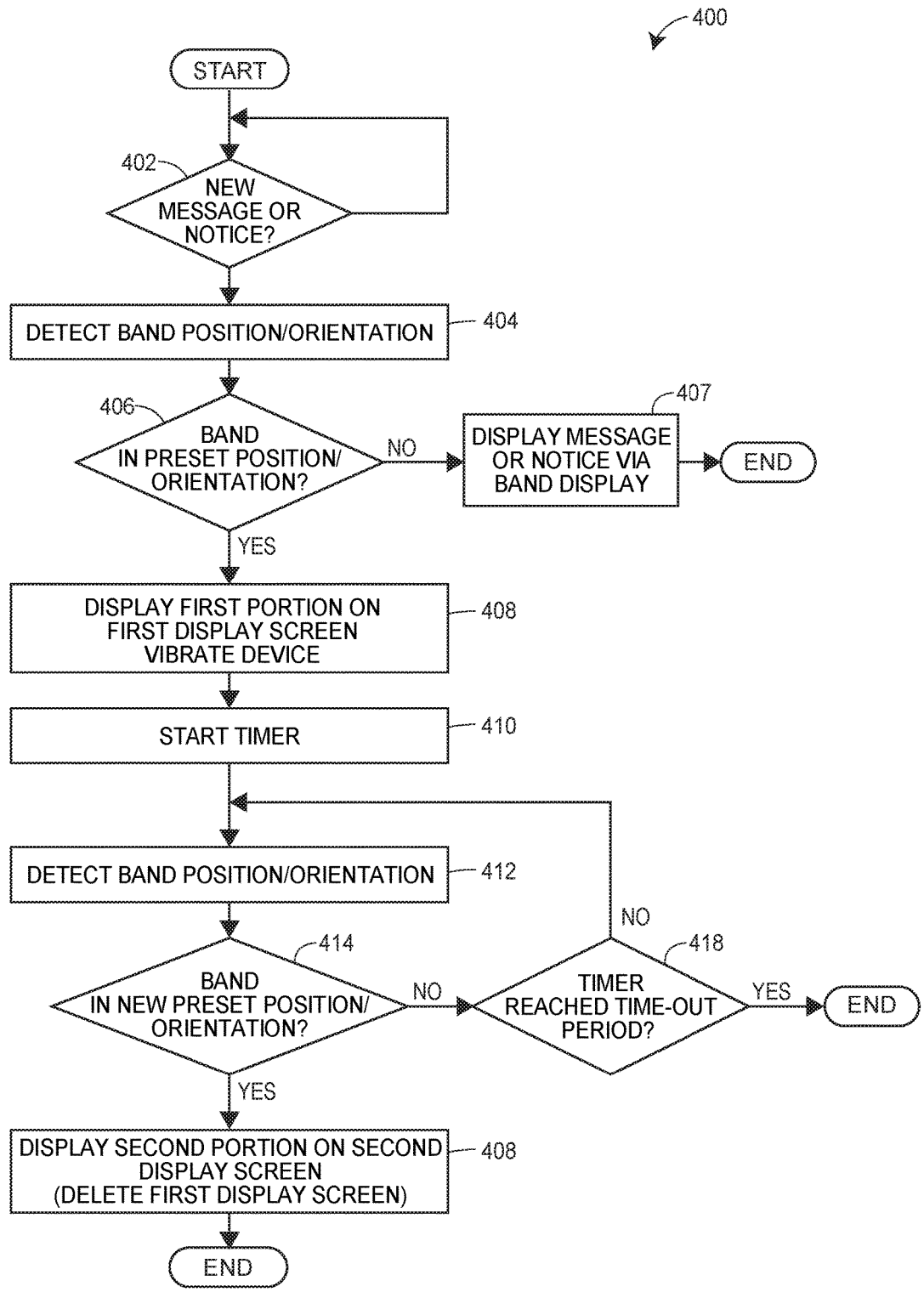
FIG. 54 illustrates a flow chart used by a processor to implement a messaging routine that provides messages to a user in a discrete manner using a split display application.
Figure 55:
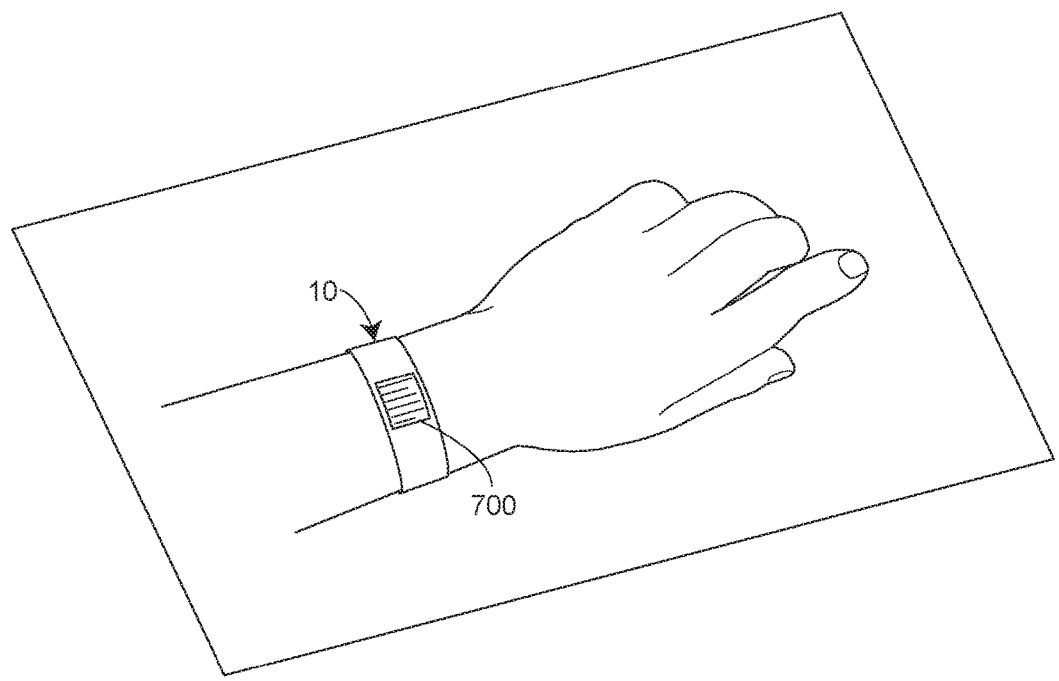
FIG. 55 illustrates a wristband device disposed on a user's wrist when the hand of the wrist is face down in conjunction with implementing the routine of FIG. 54.
Figure 56:
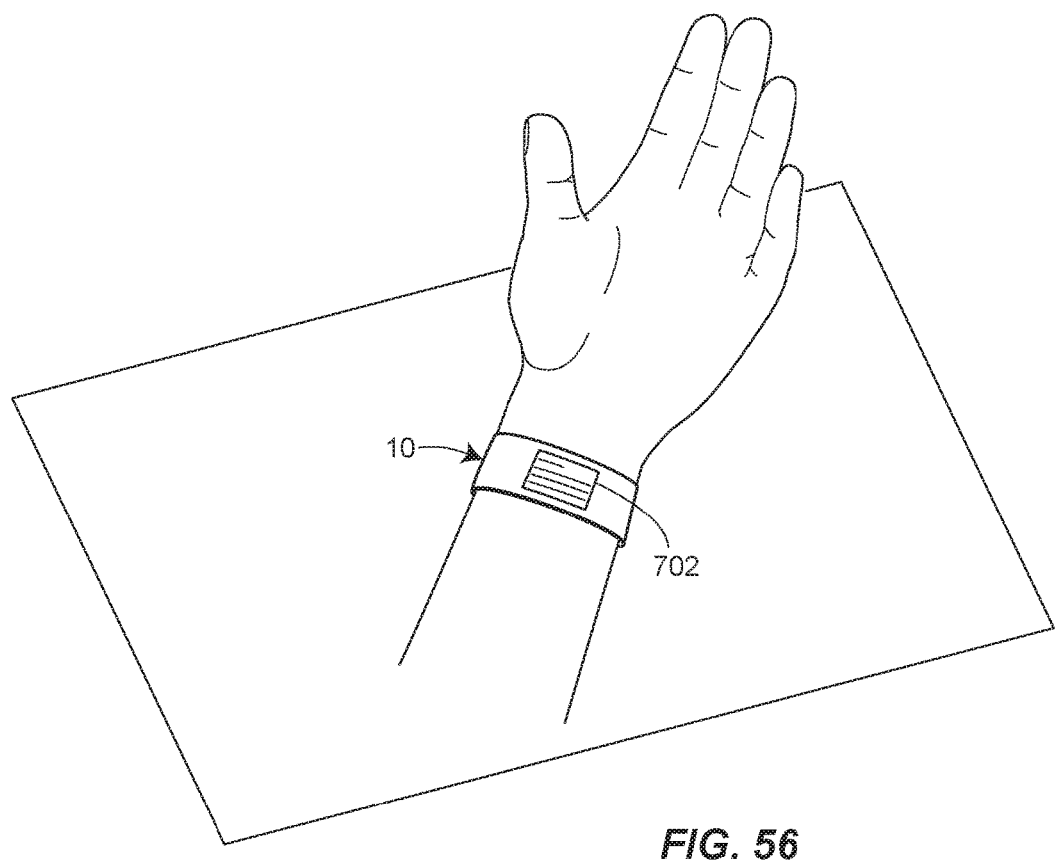
FIG. 56 illustrates the wristband device of FIG. 55 disposed on the wrist of a user's arm when the user has moved his or her hand to place the hand palm up, in conjunction with the routine of FIG. 54.

One example of the manner in which the wristband device 10 could be programmed or could be manufactured to function using a split display application as described herein, is described in more detail with respect to FIGS. 54-56. In this case, the attachable device in the form of a wristband device 10 implements a messaging routine that enables a user of the wristband device 10 to receive, be notified of, and retrieve messages or other information via the wristband device 10 using the split display screen feature, to make the message notification and retrieval more discrete and natural to the user. Generally speaking, FIG. 54 illustrates a flowchart 400 that may be executed on a processor of the wristband device 10 (or other display device) to implement split display screen functionality as part of a messaging routine using actions (e.g., movements of the wrist) detected by the wristband device 10, with the split display screens being located at different, non-simultaneously viewable locations of the band device 10, as illustrated in FIGS. 55 and 56. In this case, the wristband device of FIGS. 54-56 may be any of any of those described above, for example, in which the device 10 may be attached to or disposed on a user's or wearer's wrist. However, this same or a similar routine 400 could be used on other types of display devices having one or more electronic displays associated therewith. Still further, some or all of the flow chart of FIG. 54 could be implemented in a processor apart from the wearable or attachable device, such as in a processor in a communicatively connected phone or computer, a server such as a server in the cloud, etc.

Generally speaking, the processor of the wristband device 10 may be programmed to perform a messaging routine 400 in which the processor, upon receiving a message or a message notification signal, such as upon receiving an e-mail, a text message, a phone call, an alarm or an alert from a calendar application, a notice or information from a gaming application, such as a cloud based gaming application, etc., takes a first action via a first display screen 700, such as providing a notification of the message. After or at the same time as taking the first action, e.g., displaying a notification of the message (which may be an indication of a message sender, a calendar event title, etc.), the processor of the band 10 may display a second portion of the message or a second set of information associated with the message, such as the full text or e-mail message, more details about the message or event, etc. via a second display screen 702 on the band 10. In this case, the second display screen 702 is positioned on the band 10 at a location that is not simultaneously viewable to the user or wearer of the band 10 as the first display screen 700. If desired, the split display application may display both displays 700 and 702 simultaneously or nearly simultaneously, or may display the second display screen 702 at a time that is offset (and later)

in time from the time at which the first display screen 700 is displayed. In some cases, the second display screen 702 may be displayed only when the user takes a particular action, such as when the user causes a particular movement of the band 10, enters a particular gesture onto the band 10 via a touch screen or other user interface on the band 10, or any combination thereof. If the processor of the band 10 detects the predetermined action (such as a predetermined gesture or movement of the band 10) or other input within, for example, a predetermined time period, the processor of the band 10 then displays the second display screen 702 with the second information related to the first information in the first display screen 700, at the second location on the band 10.

This split display messaging routine 400 can be very useful in providing notifications of messages or other incoming notices to a wearer of the band 10 in a very discrete or private manner that enables the wearer to selectively retrieve and view such messages using, for example, discrete or natural motions that do not alert others to the fact that the user or wearer of the band is receiving messages. FIG. 54 illustrates a flow chart 400 used by a split display messaging routine in a specific, but non-limiting example, that may be used by the processor of the band 10 to implement a split screen messaging functionality. For this example, FIG. 55 illustrates the band 10 disposed on a user's or wearer's wrist when the wearer's hand is positioned palm down, as is normally the case with a hand that is resting on a table, a lap, or otherwise, and FIG. 56 illustrates the band 10 disposed on the wrist of the wearer's arm when the wearer has moved his or her hand to place the hand palm up so as to view the display portion of the band 10 disposed on or adjacent the bottom of the user's wrist.

In this particular example, and as illustrated by a block 402 of FIG. 54, the messaging routine 400 that uses a split display feature detects if the wristband device 10 has received a new message or a notification of an incoming message of some sort. The message may be, for example, a text message from a phone, an e-mail message, a calendar alarm or alert or other notification, or any other type of incoming message either from an exterior device (delivered using, for example, wireless communications to the band 10) or from another application on the processor or other element of the wristband device 10 itself. If no such message has been received at the block 402, control is returned to the block 402 for detection of a new message. However, upon receiving a new message or a notification of the availability of a new message, a block 404 may detect the orientation and or positioning of the band device 10 and a block 406 detects if the band 10 is in any of a number of orientations or configurations that make it desirable to continue with the messaging routine. If, the wristband device 10 is in any of a particular number of orientations, such as being disposed with the band 10 being bent around a wrist or other circular member and/or being disposed with the display being face up, as illustrated in FIG. 55 or as being disposed with the ends of the band 10 overlapping or connected, then a block 408 displays a first message portion on a first display screen (such as the display screen 700 of FIGS. 52 and 53). If desired, the block 408 may also generate a vibrational or other mechanical movement of the band 10 that can be sensed by the wearer to alert the wearer of the existence of a new message in the first display screen 700. In particular, the block 408 may send one or more signals to a vibration element on the wristband device 10 to cause a vibration of the device 10 that can be felt or detected by the wearer of the wristband device 10. The vibrational movement may be a single vibration, a series of intermittent vibrations in a particular pattern (e.g., two short vibrations, a long vibration, a long vibration and two short vibrations, etc.) or any other desired vibrational movement. Moreover, the pattern of the vibration may indicate the type of message that has been received. That is, for example, one vibrational pattern may indicate the receipt of an incoming e-mail, another vibrational pattern may indicate the receipt of a text message and a still further vibrational pattern may indicate the receipt of a calendar alert. Of course, any desired vibrational pattern may be associated with any type of message. Still further, the processor may chime, sound an alarm, or generate an acoustic alert (noise or sound) of some sort in addition to or instead of vibrating the band 10. As noted above, other notification signals besides vibrational signals may be used instead or as well. In particular, other tactile or haptic signals, such as mechanical squeezing actions, electrostatic signals, heat signals, etc. may be used. Still further, audio signals may be generated by the device to indicate a message or other information. In addition or instead, other visual signals, such as an icon or emoticon, may be displayed on a display screen to indicate the presence of a message or other incoming information.

Generally speaking, the block 406 may detect whether the band 10 is in one of any number of positions and/or orientations that will cause the device 10 to take the further messaging steps described below. In particular, as one example, the block 406 may first determine if the band 10 is connected in a circle or is disposed around an element (such that the ends of the band 10 are connected together or are disposed adjacent one another), thereby indicating that the band 10 is being worn. If desired, the routine 400 may only be implemented while the band 10 is being worn. Also or instead, if desired, the microprocessor of the band 10 may detect if the band 10 is being worn by a person (as opposed to being, for example, hung on a bar such as a bike handlebar) by detecting a temperature measurement received from a temperature sensor disposed in the electronics unit of the band 10, wherein the temperature sensor is disposed at a location on the band 10 to detect the temperature of the skin of a user. In this case, if the temperature sensor measures a temperature in a range that would be expected (e.g., above 97 degrees Fahrenheit, for example) if the band 10 is being worn by a person, then the block 406 may detect the band 10 as being in the correct orientation or location. Of course, other types of sensors, such as capacitive sensors, may be disposed on the band 10 to contact the wearer's skin and these other sensors may be used to determine if the band 10 is being worn by a person. Likewise, to implement one or more of these functions, the microprocessor may detect, by one or more detection elements, prior to generating the one or more display screens 700, 702, a flex state of the band and only generating the first image content (the first display screen 700) and/or the second digital image content (the second display screen 702) when the band is in a flexed state, which could, for example, be one of a flat state, or a curved state. In other cases, such as when the split display screen feature is used on a display mounted on a non-wearable device or on the exterior of an article of clothing, such as a sleeve, a glove, a hat, a belt, etc. the device may detect other movements, such as lifting, rotation, etc. as the cue for continuing the split display screen routine.

Moreover, in addition or instead of detecting whether the band 10 is being worn on a human, the block 406 may determine if the band 10 is oriented in a particular direction or orientation. As an example, the block 406 may detect if the band 10 is disposed in an orientation indicating that the band 10 is being worn on a wrist in which the person has their palm face down, such as that illustrated in FIG. 55. Of course, the example orientation of FIG. 55 is but a single example of an orientation that may be detected and used for implementation of the further steps of the messaging routine 400, and a wide range of orientations and positions may be detected as being associated with a position or location or orientation that leads to the implementation the rest of the messaging routine 400 described herein. That is, the orientations of the band 10 used in this messaging routine are not limited to those of FIGS. 55 and 56. Moreover, the messaging routine 400 can be implemented without the steps of the blocks 404 and 406, meaning that the further steps of the messaging routine 400 described herein could be implemented any time that a message or signal is received.

In any event, if the block 406 detects that the band 10 is not in one of the predetermined orientations or positions (e.g., the band 10 is not being worn by a user or is being worn but is not in one of a set of predetermined orientations), then a block 407 may display the entire message or notice on the flexible display of the band 10 in any usual or desired manner, such as using a single display screen. However, as noted above, if the block 406 detects that the band 10 is in a particular use and/or orientation, a block 408 then displays a first part of the message in a first display screen 500 at a first location on the band, such as adjacent to the top of the user's wrist. Moreover, the block 408 may cause the band 10 or a portion of the band 10 to vibrate in a particular pattern, such as a particular pattern associated with the type of message or incoming signal received. Of course, the block 408 may display the first screen on the portion of the band 10 that is facing the user. Thus, if the band 10 is in the position or orientation as illustrated in FIG. 56 in which the underside of the user's wrist is facing in an upward direction or orientation, then the messaging routine 400 may display the first display screen 700 on the electronic display near the underside or bottom of the user's wrist, as opposed to the portion of the electronic display near the top of the user's wrist.

A block 410 thereafter (or contemporaneously) may start a clock or other timer within the electronics unit of the band 10. Thereafter, a block 412 again determines the current location or position of the band 10 and a block 414 operates to detect or check for a particular predetermined action of the user via the band 10, such as particular movement of the band 10, a particular gesture entered into the band 10 via a user interface on the band 10, etc. In one example case, the block 414 may detect a particular, e.g., natural movement of the user's wrist, such as turning the wrist over to place the palm of the hand towards the user, e.g., the motion associated with a user looking at his or her inner wrist, such as that illustrated in FIG. 56. In this case, the block 414 operates to detect the movement of the band 10 or the new position or orientation of the band 10 to determine if the band 10 has moved in a predetermined manner or has been moved to a predetermined position. In another embodiment, the block 414 could detect if a particular gesture has been entered into the band interface, such as a tap or a swipe or a two finger pinch or any other gesture. Still further, the block 414 could detect any of a user touching the attachable article, a user squeezing the attachable article, a user stretching the attachable article, a user compressing the attachable article, a user bending the attachable article, a user shaking the attachable article, a user rotating the attachable article, a user twisting the article, or a user making a particular gesture via the attachable article (e.g., via a touchscreen on the attachable article). Moreover, any of these actions may be detected by one or more detection elements such as a strain gauge, a gyroscope, an accelerometer, a compression sensor, a tensional strain sensor, a positional sensor, a motion sensor, a pressure sensor, a vibration sensor, an orientation sensor, a gravity sensor, a light sensor, a touch sensor, a piezoelectric sensor, etc. Still further, in certain instances, the device may detect, as an input, certain muscle movements. For example, the movement of muscles used in closing a first may be detected via known sensors and may be used as an input for the split display screen. In one example, a treasure chest icon may appears on the outside of the band (on the outside of the wrist), while the user's first is somewhat closed. As the user turns his or her palm up and opens his or her hand, the band detects this muscle movement. In response, the second portion of a message or information associated with the game may be display on the second display screen area. As another example, the user touching a finger to the inside of his or her palm could also be detected as an input to the device which can be used for any of the input signals described herein generally.

If the block 414 detects the predetermined movement or gesture or other action by the user, then a block 416 displays the second portion of the message in a second display screen 702 at the second location on the band 10 that is not simultaneously viewable with the first location. In the particular example being illustrated in FIGS. 55 and 56, the second part of the message (such as a text message, a calendar entry, an e-mail, etc.) can be displayed on the display portion of the band 10 disposed on or adjacent to the inner wrist of the wearer, so that this portion of the message is only viewable to the wearer when the wearer has his or her hand in the general position indicated in FIG. 56. In this case, for ease of viewing, the message or other information can be displayed in a landscape format as illustrated in FIG. 56. Of course, depending on the type of message, the message or screen image provided by the block 416 could be displayed in other orientations on the flexible display of the band 10, such as in a portrait view, or at an angle with respect to the edges of the band 10, to make the message more readable to the user or wearer of the band 10 based on the actual positioning or orientation of the band 10. Still further, the transition from the first display to the second display may occur in any desired manner and/or at any desired location. That is, the first and second displays may be separated by being in any combination of different locations including in any combination of a top, a bottom or any side of a device. (That is, the first display can be in any of the top, bottom or side of a device while the second display can be in any other of the top, bottom or any side of the device). Moreover, the transitions from the first display to the second display may be made in any desired manner, e.g., from a side to a top, a top to a side, a top to a bottom, a bottom to a side, a side to a bottom, or any other combination of different locations. Still further, the orientations of the display associated with the first and second displays may take any form, such a landscape, portrait, diagonal, etc., or any desired size. Again, the specific gesture that the user makes in response to the display at the first location may determine or effect the manner in which the information is displayed at the second display or even the location of the second display screen. Thus, a particular wrist rotation may be detected by the device and used to cause the transition from a portrait top to a portrait bottom display (as opposed to a portrait top to a landscape bottom, for example), or a movement from a "hanging arm" to a raised arm may be used to effect the transition between the first and second display locations in any manner. In one case, the second display area may change based on the particular movement detected. For example, movement of an arm to a level position with the shoulder may cause the second display to be located on the inside wrist portion of the band, while movement of the arm higher or above the head may cause the second display to be located under the wrist on the band.

On the other hand, when the block 414 does not determine that the predetermined action has taken place (e.g., movement of the band 10 to a predetermined position or orientation, a gesture entered via the band 10, etc.), a block 418 determines if the time-out period of the timer has been reached. That is, the block 418 may determine if a predetermined time has elapsed since the block 410 set the timer and if not, control is returned to the block 412 to detect the position/orientation of the band 10 (or to determine if a new gesture has been entered into the band 10). If desired, the predetermined time may be set to infinity or to a significantly long period of time so that block 214 continues to operate until the routine 200 is halted or the preset action or position, or orientation is detected. To implement this feature, the routine 400 may skip or not perform the block 418 but may simply loop back to the block 412 if the preset position or orientation is not detected by the block 414. Of course, detecting the position of the band may include or be performed as detecting a transition from some position to the preset position or orientation. Of course, the loop defined by the blocks 412, 414 and 418 may repeat until the block 418 determines that the time-out period has expired without the predetermined action being detected at the block 414, in which case the routine 400 may end without automatically displaying the second portion of the message on the band 10 and may delete or remove the first portion of the message in the first display screen 700 if so desired. In this case, the user may, at a later time, interact with the band 10 to retrieve the message using any known interface application, such as an e-mail, text message, calendar or other application associated with the received message or signal. Of course, if desired, the functionality of any or all of the blocks 404, 406, 410, 412, 414, and 418 may be removed, so that the messaging routine 400 displays the first and second display screens and thus the first and second portions of the message or information associated with the message simultaneously via the first and second display screens 700 and 702.

As will be understood, the messaging routine 400 described above can be used to provide a very natural and discrete manner of receiving notifications of messages and viewing those messages. Moreover, in some cases, the messaging routine 400 can provide discrete notifications and selective viewing of messages without any direct interaction with the user interface of the band 10 by the wearer. For example, the wearer of the band 10 may be in a meeting or otherwise engaged in conversation or other activities and may receive a message, such as an e-mail, a text message, a reminder, a calendar invite or other notice, etc. In this case, the wearer's hand may be facing down or be in any of a number of other various positions or orientations. However, instead of the full message automatically appearing on the display of the band 10 on the outside of the wearer's wrist, where this message may be noticeable to others due to a change in the display, the display becoming brighter, etc., the messaging routine 400 of the band 10 notifies the wearer of the existence of the message (and possibly of the type of message) by causing the band 10 to display the first and limited portion of the message, such as a notification of the message at a first location on the band 10 via the first display screen 700, and may cause the band 10 to vibrate, which is generally detectable by the wearer but not others. If the wearer is in a position to or wants read the message, the wearer can simply move his or her wrist to a second predetermined position, such as holding his or her hand up, with the palm facing towards the wearer's face, within the predetermined time from the onset or end of the vibration or the initial display of the first display screen 700. This particular motion is a very natural motion and does not appear out of the ordinary to others near wearer. If this motion is made within the predetermined time from the onset or completion of the vibration, the device 10 then displays the full message or other information related to the first portion of the message on the flexible display of the device via a display screen 702 located at, for example, only the portion of the flexible display disposed near or adjacent to the inner portion of the wrist, which again is less viewable to others in the room than on the outside wrist portion of the band 10. At the same time, the routine 400 may remove the first message or first display screen 700 that includes the first portion of the message, so that this display screen 700 is not viewable to others. This feature provides an additional level of privacy. However, if the user wants to ignore the message, the user can simply not make the predetermined motion within the predetermined time period, and the message will not appear on the display of the band 10 until the user takes some affirmative action to view the message, such as opening an e-mail, calendar, etc., application on the band 10 at a later time.

Of course, while the messaging content is described herein as coming from or via an application (such as an e-mail application, a text messaging application, etc.) executed on the band 10, the message could be generated by or originate from an application executed on a different device, such as the wearer's phone, computer, etc., and this message could be wirelessly sent to and displayed (or not) on the band 10 as described above.

Moreover, while not specifically illustrated in flowchart 400 of FIG. 54, the user may take, and the band 10 may detect other actions (such as movements) made by the wearer of the band 10 to perform other functions in conjunction with the messaging routine 400 described above. For example, the wearer may wish to extend the time period for viewing the entire message on the second display screen 702 by, for example, moving his or her wrist back and forth (or taking some other predetermined action). In this case, the routine 400 may detect this second type of motion and may reset the timer of the band 10, or may set the timer to a different time (such as by adding 10 seconds) so that, if the wearer takes the first predetermined action within that new extended time period, the full message will be displayed on the underside of the wrist portion of the display (e.g., on the second display screen 702). Still further, while the routine 400 is described herein as displaying the first part of the message on a first display screen 700 located on the upper wrist portion of the flexible display and the full message on the second display screen 702 on the lower or underside of the wrist portion of the flexible display, the routine 400 could display the two parts of the message on any other portions of the flexible display, and thus could locate the first and second display screens 700 and 702 at different parts of the flexible display.

Moreover, it will be understood that the actions taken by the user and detected by the band 10 may include any types of actions, including movements of the band 10, gestures or other manual inputs entered into a user interface on the band 10, a predetermined series of movements of the band 10, one or more movements of the band 10 in conjunction with a gesture or other interface interaction, etc. Still further, while the specific example application of FIGS. 55-56 detects the location of a wrist with the underside or the inner wrist facing away from the user (such as that associated with a palm of a hand facing down) as a position in which to implement the two part messaging notice functions, and detects movement of the wrist to an upright position in which the underside of the wrist of the band faces the user as an action associated with displaying the full message on the second display screen 702 on the band 10, any other positions could be used as the positions associated with or detected by the blocks 406 and 414 of the flowchart of FIG. 54. Still further, while the routine 400 has been described as using a split display functionality for a messaging function, the routine 400 could instead provide this functionality as being associated with a microlearning application. In this case, the routine 400 may periodically or randomly display new words, phrases, information, questions, etc., on the first display screen 700 and display the definitions, translations, answers, etc., on the second display screen 702 using the features or functions similar to that described with respect to the flowchart of FIG. 54. Moreover, the split display application or functionally can be provided using a single application (such as a messaging or microlearning application) or could be used by multiple different application such that the first and second viewable content are provided by different applications, including, for example, one or more of an email application, a calendar application, an Internet application, an alarm clock application, a music-playing application, a video application, an e-reading application, a navigational application, an imaging application, a mapping application, etc.

Figure 57A:
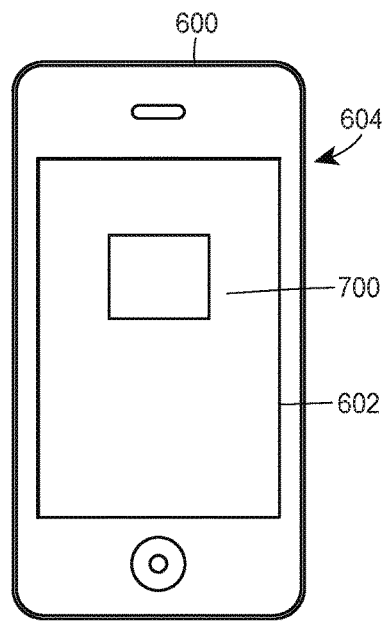
FIGS. 57A and 57B illustrate front and back perspective views of a phone or other portable electronic device having multiple electronic displays on opposite sides thereof upon which the split display routine or application described herein can be implemented.
Figure 57B:
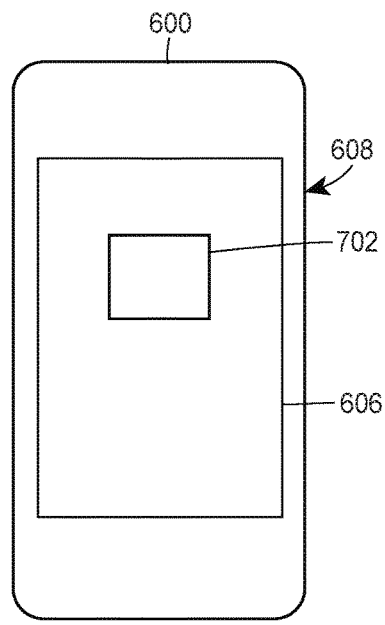

Likewise, while the split display application is described herein as being used on a band device having various portions of a single electronic display used to display the first and second display screens, the split display application may be used on other types of display devices that have the same or different display screens that are configurable so as not to be simultaneously viewable to a user. For example, the split display application may be used on a phone, an e-book or e-reader, or any other electronic device having multiple electronic displays. FIGS. 57A and 57B, for example illustrate different sides of a phone 600 having an electronic display 602 on the front side 604 (illustrated in FIG. 57A) and an electronic display 606 on the back side 608 (illustrated in FIG. 57B). A messaging application, a microlearning application or other application may use the split display application or functionality as described herein on the phone 600 of FIGS. 57A and 57B by displaying the first display screen 700 on the electronic display 602 of the phone 600 (see FIG. 57A) and by displaying the second display screen 702 on the electronic display 606 on the back side 608 of the phone 600 (see FIG. 57B). Of course, any of the display timing and functionality described above with respect to FIGS. 54-56 may be used in this context.

Figure 58A:
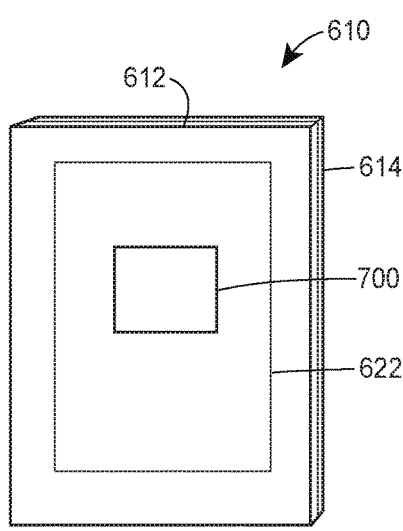
FIGS. 58A and 58B illustrate different perspective views of an electronic book or other portable electronic device having multiple foldable or rotatable electronic displays upon which the split display routine described herein can be implemented.
Figure 58B:
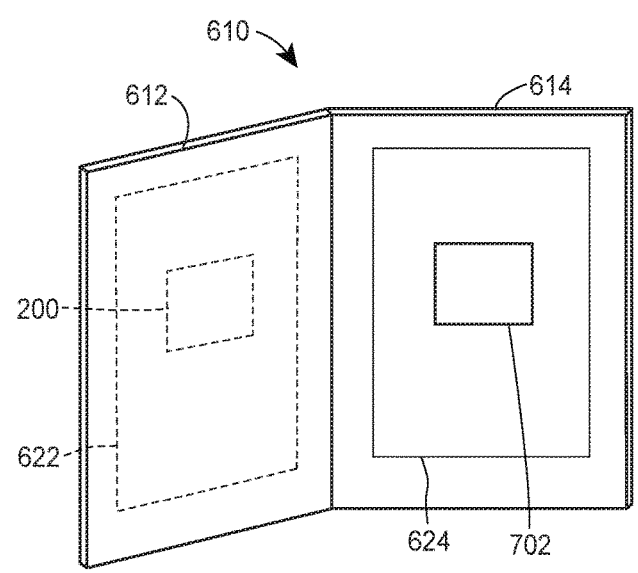

Still further, FIGS. 58A and 58B illustrate an e-book or e-reader 610 that has multiple foldable components that open up to display different electronic displays on which various different display screens can be displayed. As an example, the e-book 610 includes a front component 612 that is rotatably connected to a back component 614. In this case a first electronic display 622 is disposed on a front side of the front component 612 and a second electronic display 624 is disposed on the front side of the back component 614. In this example, a split display application may display the first display screen 700 on the first electronic display 622 and the second display screen 702 on the second electronic display 624, so that the user may open up the book (rotate the first and second components 612 and 614 with respect to one another to make the second electronic display 624 visible) to see the second display screen 702. In the examples of FIGS. 57 and 58, the different electronic displays, while not be contiguous or continuous in nature, may still be driven by the same display driver and/or processor, or may be driven by different display drivers and/or processors when implementing the split display functionality. Of course, other types of devices with electronic displays that are not simultaneously viewable (at least in some configurations) may be used to implement the split display application or functionality described herein.

Figure 59A:
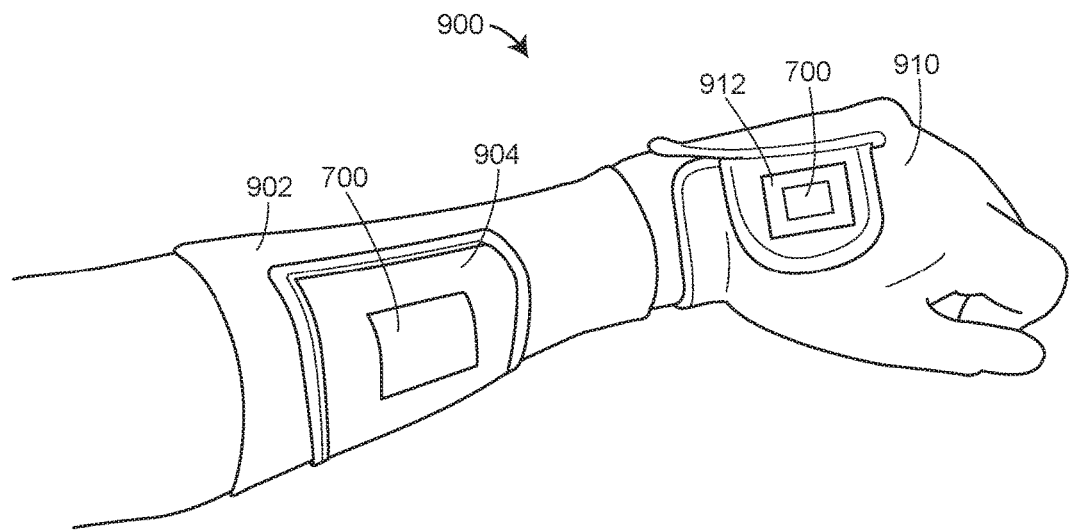
FIGS. 59A and 59B illustrate perspective views of a glove/sleeve device having one or more flexible electronic displays disposed thereon in which the split display, tactile messaging and natural messaging routines described herein can be implemented.
Figure 59B:
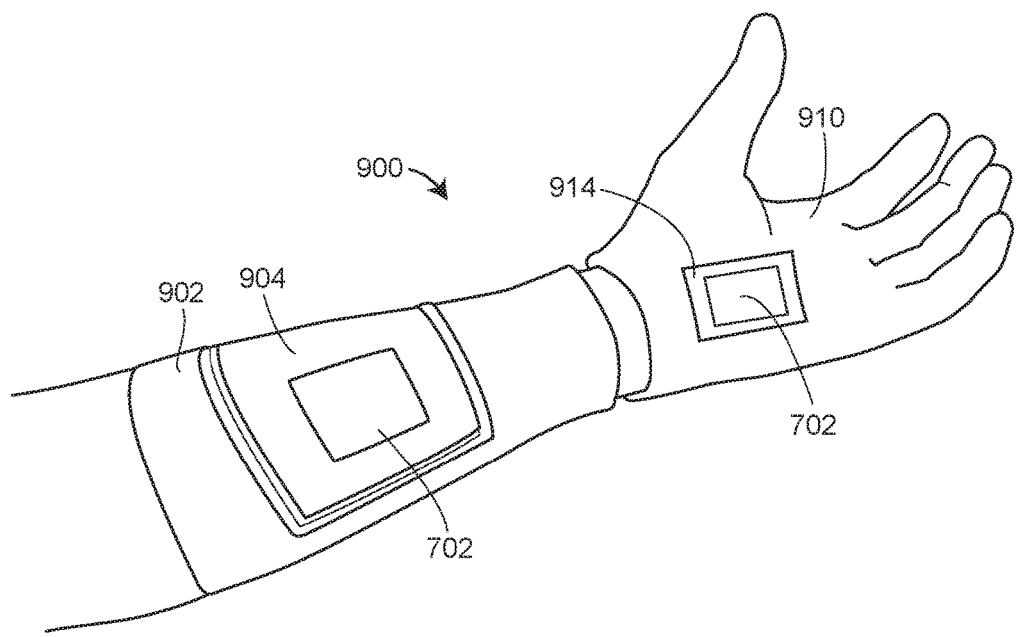

Still further, FIGS. 59A and 59B illustrate a sleeve and glove implementation 900 that include various displays that can be used to implement any or all of the split screen, vibrational or natural messaging routines described herein. In particular, a sleeve 902 of FIGS. 59A and 59B includes a single flexible display 904 mounted thereon that covers multiple sides of the sleeve 902. As indicated in FIGS. 59A and 59B, first and second display screens 700 and 702 can be located at different portions on the display 904 and the sleeve device 902 (which may include an electronics module similar to that described above for the band device) may operate to implement the split display and/or the vibrational or other tactile or haptic signaling and messaging routines described above using the display screens 700 and 702. As a further example, the implementation 900 includes a glove 910 having to different or separated flexible displays 912 (FIG. 59A) and 914 (FIG. 59B) mounted on opposite sides thereof. In a similar manner, the glove device 910 (which may include an electronics module similar to that described above for the band device) may operate to implement any of the split display and/or the vibrational or other tactile or haptic signaling and natural messaging routines described above using display screens 700 and 702 on the displays 912 and 914. If desired, the processors of the sleeve 902 and the glove 910 may communicate with one another to provide or implement the split display, natural messaging or vibrational or other tactile messaging routines described herein on the various displays 904, 912, 914 or on the screens 700 and 702 associated therewith so that the first and second messages or portions of the messages or the vibrational or other tactile signaling may be provided across or using both of the sleeve 902 and the glove 904 in a coordinated manner. In a similar manner, a single processor may drive both of these devices 902 and 904 or the displays or vibrational or other tactile generating elements thereof in a coordinated manner using any of the routines described herein. In one case, such a single processor may be on one of the sleeve 902 or the glove 904, or the processor may be located at a different device (such as on a server in the cloud, on a phone or other computer) communicatively coupled to the sleeve 902 and glove 910 devices via communication modules on these devices. Such communication modules may be any of the types of wireless communication modules described herein, including for example, WiFi, Bluetooth, RFID, etc. modules.

Figure 60A:
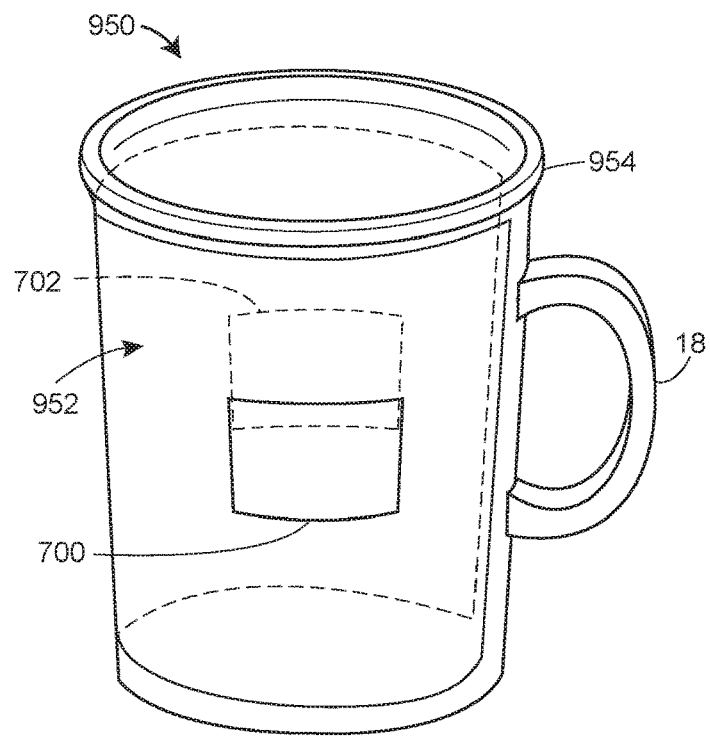
FIGS. 60A and 60B illustrate perspective views of a mug having one or more flexible electronic displays disposed thereon in which the split display, tactile messaging and natural messaging routines described herein can be implemented.
Figure 60B:
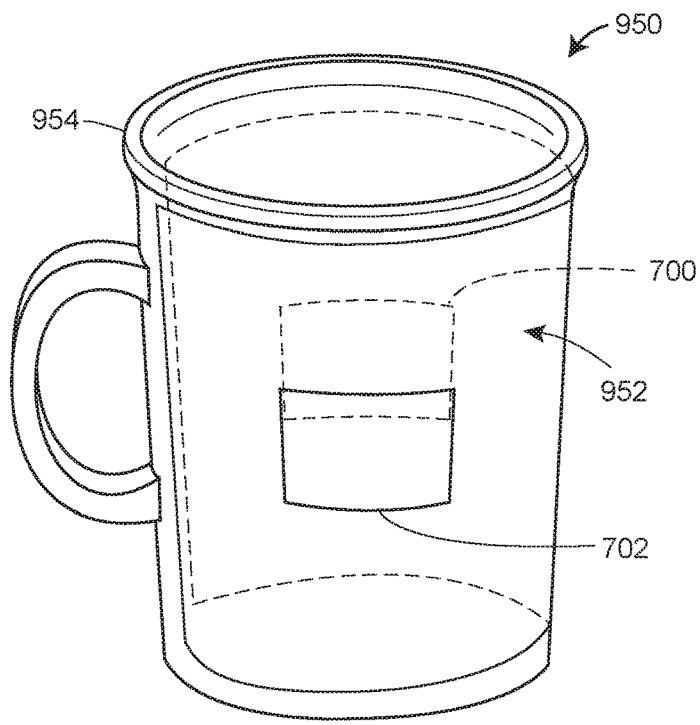

As yet another example, FIGS. 60A and 60B illustrate a mug or container device 950 that includes a continuous flexible display 952 mounted on a mug 954 that can be used to implement the split screen, vibrational or natural messaging routines described herein. In particular, the single flexible display 952 wraps around multiple sides of the mug 954. As indicated in FIGS. 60A and 60B, a first display screen 700 (best illustrated in FIG. 60A) and a second display screen 702 (best illustrated in FIG. 60B) can be located at different portions of or sides of the display 954. The mug device 950 (which may include an electronics module similar to that described above for the band device) may operate to implement the split display and/or the vibrational or other tactile or haptic signaling and messaging routines described above using the display screens 700 and 702 and other elements similar to those described above for the band device.

In the examples of FIGS. 59 and 60, the different electronic displays, while not necessarily being contiguous or continuous in nature, may still be driven by the same display driver and/or processor, or may be driven by different display drivers and/or processors when implementing the split display, tactile and natural messaging functionality described herein. Such processors may be within the same device including the one or more displays or may be in different devices, such as in a server in the cloud, on a phone, watch or other computing device communicatively coupled to the display devices. Of course, the sleeve, glove and mug devices of FIGS. 59 and 60 can include any of the other elements described above for the band device to perform tactile, vibrational and natural messaging using any number of screens on any number of displays, such as flexible or fixed displays.

Still further, while the natural messaging and split display screen routines have been described herein as using or providing two different displays screens that are not simultaneously viewable, these routines could perform the same or similar functionality using three or more different display screens on the same or different (i.e., continuous or non-continuous) electronic displays wherein each of the screens are not simultaneously viewable with one another or at least one other screen.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Modules and units may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for implementing display features via a flexible electronic display on an attachable article as disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

The invention claimed is:

1. A display system, comprising:
   an article having a substrate and a flexible display disposed over a portion of the substrate;
   a display driver electronically connected to the flexible display for providing image content to the flexible display;
   a user signaling element disposed on the article;
   a processor coupled to the display driver;
   a memory that stores a messaging routine that, when executed on the processor, operates to:
   detect receipt of an incoming message,
   upon detecting receipt of the incoming message, send an activation signal to the user signaling element to generate a user signal sensible by a user,
   initiate a first detection iteration to detect whether a first predetermined action has been taken by the user, with respect to the article, within a predetermined period of time after generating the user signal,
   display an indication of the incoming message on a portion of the flexible display of the article when the first predetermined action is detected within the predetermined period of time,
   initiate a second detection iteration to detect whether a second predetermined action has been taken by the user, with respect to the article, and
   modify the predetermined period of time when the second predetermined action is detected; and
   one or more sensors, wherein the messaging routine uses said one or more sensors to:
   detect the first predetermined action by detecting one or more of a first motion of the article, a positioning of the article in a first predetermined position, or a change of an orientation of the article to a first predetermined orientation; and/or
   detect the second predetermined action by detecting one or more of a second motion of the article, a positioning of the article in a second predetermined position, or a change of an orientation of the article to a second predetermined orientation.

2. The display system of claim 1, wherein the first predetermined position or the second predetermined position is a position associated with the article being disposed on a wrist of a hand of a wearer with the palm of the hand facing towards the wearer of the article.

3. The display system of claim 1, wherein the messaging routine uses the one or more sensors to further determine a position or an orientation of the article to determine whether to send the activation signal to the user signaling element to cause the generation of the user signal.

4. The display system of claim 3, wherein the messaging routine determines the position or the orientation of the article by determining whether the article is disposed on a wrist of a hand of a wearer with the palm of the hand facing away from the wearer of the article, or disposed around another member by determining whether first and second ends of the flexible substrate are connected or are disposed adjacent to one another.

5. The display system of claim 1, wherein the article is a wristband and wherein the messaging routine displays the message on a portion of the flexible display disposed adjacent the inner wrist of the wearer if the first predetermined action is detected within the predetermined period of time.

6. The display system of claim 1, further including a user interface and wherein the messaging routine detects the first predetermined action by detecting a first predetermined interaction of the user with the user interface and/or detects the second predetermined action by detecting a second predetermined interaction of the user with the user interface.

7. The display system of claim 6, wherein the messaging routine detects the first predetermined interaction or the second predetermined interaction of the user with the user interface by detecting a predetermined gesture entered by the user via the user interface.

8. The display system of claim 1, wherein the user signaling element comprises at least one of a vibrator and an audio signal generator, and the messaging routine sends an activation signal to the user signaling element so as to cause the vibrator to create a vibration pattern and/or the audio signal generator to create an audio signal indicative of a specific type of incoming message to be displayed.

9. The display system of claim 1, wherein the user signaling element is a visual signal generator, and the messaging routine sends an activation signal to the visual signal generator so as to cause the visual signal generator to create a visual signal indicative of a specific type of incoming message to be displayed, wherein the visual signal is one of an icon, a light, or a display image.

10. The display system of claim 1, wherein the messaging routine detects the receipt of the incoming message by detecting the receipt of one of an e-mail message, a text message, a phone call, or a calendar alert.

11. The display system of claim 1,
wherein the user signaling element comprises a plurality of tactile signal generating elements, each tactile signal generating element disposed at a respective different location on the article and
wherein upon detecting the receipt of the incoming message, the messaging routine sends one or more activation signals to the tactile signal generating elements to cause a tactile signal to be generated in a manner sensible by the user,
wherein the incoming message is one of a plurality of message types, and each message type of the plurality of message types corresponds to a different tactile signal.

12. The display system of claim 11, wherein the different tactile signals are vibration patterns distinguishable by at least one of:
a total number of vibrations,
a set of selected vibrational elements that are activated to generate the vibration pattern,
a sequence of activation of members of the set of selected vibrational elements,
a duration of one or more particular vibrations, or
an intensity of vibration.

13. The display system of claim 11, wherein:
the tactile signal is indicative of a particular portion of the flexible display at which an indication of the incoming message is to be presented; and
the messaging routine, when executed by the processor, further operates to cause the indication of the incoming message to be presented on the particular portion of the flexible display.

14. The display system of claim 13, wherein one or more of an association of the message type of the incoming message and the particular portion of the flexible display, an association of the particular tactile signal and the particular portion of the flexible display, or an association of the message type of the incoming message and the tactile signal is configurable by the user.

15. The display system of claim 11, wherein the message type of the incoming message corresponds to at least one of: an application executed by the processor of the article, a source of the incoming message, or a priority of the incoming message.

16. The display system of claim 1, wherein the portion of the flexible display on which the indication of the message is displayed is selected based on at least one of: a type of the incoming message, the first predetermined action, the second predetermined action, or the predetermined period of time.

17. The display system of claim 1, wherein modifying the predetermined period of time comprises: resetting the predetermined period of time, extending the predetermined period of time, or setting the predetermined period of time to a different period of time than the predetermined period of time.

18. A display system, comprising:
an article having a substrate and a flexible display disposed over a portion of the substrate;
a display driver electronically connected to the flexible display for providing image content to the flexible display;
a user signaling element disposed on the article;
a processor coupled to the display driver;
a memory that stores a messaging routine that, when executed on the processor, operates to:
detect receipt of an incoming message,
upon detecting receipt of the incoming message, send an activation signal to the user signaling element to generate a user signal sensible by a user,
initiate a first detection iteration to detect whether a first predetermined action has been taken by the user, with respect to the article, within a predetermined period of time after generating the user signal,
display an indication of the incoming message on a portion of the flexible display of the article when the first predetermined action is detected within the predetermined period of time,
initiate a second detection iteration to detect whether a second predetermined action has been taken by the user, with respect to the article, and
modify the predetermined period of time when the second predetermined action is detected,
wherein the first predetermined action comprises one or more of: positioning of the article in a first predetermined position, changing an orientation of the article to a first predetermined orientation, a first user input entered via a user interface of the article, or a plurality of first predetermined actions by the user via the article, and the second predetermined action comprises one or more of: positioning of the article in a second predetermined position, changing an orientation of the article to a second predetermined orientation, a second user input entered via the user interface of the article, or a plurality of second predetermined actions by the user via the article.

19. The display system of claim 18, wherein modifying the predetermined period of time comprises: resetting the predetermined period of time, extending the predetermined period of time, or setting the predetermined period of time to a different period of time than the predetermined period of time.

* * * * *